(12) United States Patent
Konno et al.

(10) Patent No.: US 6,529,289 B1
(45) Date of Patent: Mar. 4, 2003

(54) IMAGE PROCESSING APPARATUS

(75) Inventors: Kazuhito Konno, Ebina (JP); Kenji Takeuchi, Ebina (JP); Yukio Masubuchi, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/510,528

(22) Filed: Feb. 22, 2000

(30) Foreign Application Priority Data

Feb. 22, 1999 (JP) .......................................... 11-042658

(51) Int. Cl.⁷ .............................................. G06H 15/00
(52) U.S. Cl. ..................................................... 358/1.17
(58) Field of Search ........................ 358/1.4, 1.1, 1.9, 358/1.17, 1.16, 443, 444, 1.12; 345/629, 589, 592, 530, 532, 536, 545, 549, 550

(56) References Cited

U.S. PATENT DOCUMENTS 5,701,402 A * 12/1997 Miyamoto et al. ......... 358/1.14
5,995,717 A * 11/1999 Tanaka ....................... 347/116

FOREIGN PATENT DOCUMENTS

| JP | A-6-214555 | 8/1994 |
| JP | A-10-151815 | 6/1998 |

\* cited by examiner

*Primary Examiner*—Arthur G Evans
(74) *Attorney, Agent, or Firm*—Oliff & Berridge, PLC

(57) ABSTRACT

There will be provided an image processing apparatus made available irrespective of the mechanism and the like of an output device to be connected thereto. A configuration control unit sets connection patterns and output systems of a first to a fourth output control units depending upon configuration, a connecting method and image data to be inputted of an output device. Also, a processing order control unit is interlocked with this configuration control unit, and constitutes data for each band from image data inputted so as to have sequence responsive to configuration of a first to a fourth rendering processors controlled by the configuration control unit. Thus, data for each band is controlled so as to be inputted into the first to fourth rendering processors in accordance with the processing order. In this way, it is possible to cope with any case where various output devices are connected.

12 Claims, 44 Drawing Sheets

IMAGE PROCESSING APPARATUS

BACKGROUND OF THE INVENTION

1. Technical Field of the Invention

The present invention relates to an image processing apparatus for subjecting input image data to image processing to output to an output device.

2. Description of the Prior Art

In recent years, various systems of output devices have been developed, and image processing apparatuses for performing image processing corresponding to those output devices have also been developed in accordance with each output device. As an example of the output device, a color laser beam printer will be taken up and concretely described here.

The color laser beam printer is capable of printing in various colors using toner amounts of four colors: cyan (hereinafter, C-color), magenta (hereinafter, M-color), yellow (hereinafter, Y-color) and black (hereinafter, k-color). As a representative mechanism for a high-speed color laser beam printer, there are a 4-cycle color printer and a 4-tandem color printer. Also, there is a 2-tandem color printer obtained by fusing the 4-cycle color printer and 4-tandem color printer mechanisms.

FIG. 29 is an explanatory view for illustrating the basic mechanism of the 4-cycle color printer. In FIG. 29, a reference numeral 1 designates a 4-cycle color printer; 2, a tray; 3, sheets; 4, a front roll; 5, a rear roll; 6, a belt; 7, a fixer; 8, a YMCK cleaner; 9, a YMCK drum; 10, a YMCK polygon mirror; 11, a YMCK toner selection box; 12, a Y-toner box; 13; a M-toner box; 14, a C-toner box; and 15, a K-toner box.

In the tray 2, there are stored sheets 3, and a sheet 3 fed from this tray 2 is conveyed through the belt 6. The belt 6 is driven by the front roll 4 and the rear roll 5.

The YMCK toner selection box 11 is provided with the Y-toner box 12 in which Y-color toner is stored, the M-toner box 13 in which M-color toner is stored, the C-toner box 14 in which C-color toner is stored, and the K-toner box 15 in which go K-color toner is stored, and selectively controls any of them.

The surface of the YMCK drum 9 is constructed of photoreceptor, and irradiates light from a light source such as a laser (not shown) onto a writing position on the YMCK drum 9 by the YMCK polygon mirror 10. A portion to which the light has been irradiated becomes charged to form a latent image. The latent image is developed by toner of a color selected by the YMCK toner selection box 11. Thus, the toner is transferred onto the sheet 3. The fixer 7 applies heat to the toner transferred onto the sheet 3 to fix it to the sheet 3. Also, the toner, which has not been transferred onto the sheet 3, but remained on the surface of the YMCK drum 9, and the charge are removed by the YMCK cleaner 8.

Next, a description will be made of the operation of the 4-cycle color printer. FIG. 30 is an explanatory view illustrating the sheet conveying direction, main scanning direction and sub-scanning direction; FIG. 31 is an explanatory view illustrating an example of a method of transmitting image data onto the 4-cycle colorprinter; and FIG. 32 is an explanatory view illuminating an example of timing of transmission and transference of image data onto the 4-cycle color printer. As shown in FIG. 31, plane sequential data of Y-color, M-color, C-color and K-color bit maps are sequentially transmitted to the 4-cycle color printer 1. Generally, one pixel is designated by 8 bits (32 bits of YMCK) each color, and 256 levels of gray can be expressed for each color. Since color is expressed by combinations of Y-color, M-color and C-color, approximately 16,780,000 colors (cube of 256) can be expressed. In this respect, K-color is used to complement the density of Y-color, M-color and C-color. Information of 1 pixel expressed by 8 bits is converted into the irradiation width of laser light. When the maximum width of one pixel is assumed to be., for example, Nmm, in a pixel, to which w (w=0 to 255) has been designated, the laser turns ON between (w/255) and Nmm.

As shown in FIG. 31, of the first page data, an image Y1 is first transmitted to the 4-cycle color printer 1 in the plane sequence. The data of 8-bit each pixel transmitted is converted into irradiation width of laser light. The YMCK polygon mirror 10 irradiates laser light onto the surface of the YMCK drum 9 so that an irradiation position of the laser light moves in the main scanning direction shown in FIG. 30, that is, in a direction perpendicular to the conveying direction of the sheet 3. When the laser turns ON, a portion of the YMCK drum 9, onto which the laser light is irradiated, becomes charged. This charge forms a line of latent image in the main scanning direction.

When a fixed length is outputted in the main scanning direction, the irradiation position of the laser light returns to the starting point of the next line to output one line. The YMCK drum 9 is rotating, and output for each line is repeatedly performed, whereby each line is formed in the sub-scanning direction shown in FIG. 30 to form a two-dimensional latent image on the surface of the YMCK drum 9. Thus, the YMCK toner selection box 11 sets the Y-toner box 12 in advance, whereby Y-color toner adheres to a charged portion of the YMCK drum 9.

Similarly, data of an image M1, an image C1 and an image K1, each of which is data constituting the first page, are fed to the 4-cycle color printer 1 in the plane sequence. At this time, the YMCK toner selection box 11 sets the M-toner box 13, the C-toner box 14 and the K-toner box 15 respectively to cause the M-color toner, the C-color toner and the K-color toner to adhere to the YMCK drum 9.

After data of the image K1 is fed and the K-color toner starts adhering to the YMCK drum 9, the sheet 3 is fed from the tray 2 and is conveyed through the belt 6. Four-color toner adhered to the YMCK drum 9 is transferred onto the sheet 3.

FIG. 32 shows relationship between output timing of images Y1, M1, C1 and K1 on the first page, each of which is image data, and timing transfer 1 in which the image on the first page is transferred onto the sheet 3. This figure shows that timing, at which the image K1, which is the final image data of the first page, is being fed to the 4-cycle color printer 1 overlaps with transfer 1, which is timing at which transfer is being made onto the sheet 3. During this lapping, the data of the image K1 is converted into irradiation width of laser light, the laser light is irradiated onto the YMCK drum 9 from the YMCK polygon mirror 10, and the K-color toner adheres to the YMCK drum 9. Thus, toner of four colors is transferred onto the sheet 3.

Also, after the completion of the transfer of toner onto the sheet 3, it is necessary to clear any remaining toner, which remained on the YMCK drum 9 and could not be transferred onto the sheet, and the charged portion. This treatment is performed by the YMCK cleaner 8. At timing at which feeding out of the image K1 and the transfer 1 overlap, the clearing treatment using the YMCK cleaner 8 is also being partially performed at the same time. At timing at which the image K1 is not transmitted, but only the transfer 1 takes place, only the transfer onto the sheet 3 and clearing treatment using the YMCK cleaner 8 are performed.

After the image data of the first page is transmitted, image Y2 data, which is data constituting the second page, is fed to the 4-cycle color printer 1 in the plane sequence. In this respect, in FIG. 32, at timing at which the transfer 1 and the image Y2 are overlapping, the image Y2 data is converted into irradiation width of laser light while the clearing treatment using the YMCK cleaner 8 is being partially performed, and laser is irradiated onto the YMCK drum 9 from the YMCK polygon mirror 10 for charging, and Y-color toner adheres.

After one-page image data is all transmitted onto the 4-cycle color printer 1 to transfer four colors of toner onto the sheet 3, the fixer 7 applies heat to the sheet 3 and toner transferred onto the sheet 3 to fix the toner. When fixing of the toner onto the sheet 3 is completed, a recording operation on the first page is terminated. Similarly, the second page is also processed. By repeatedly performing such a process, images are formed on plural pages.

FIG. 33 is an explanatory view illustrating a basic mechanism for a 4-tandem color printer. In FIG. 33, components equivalent to those in FIG. 29 are represented by the same reference numbers. A reference numeral 21 designates the 4-tandem color printer; 22, a Y-cleaner; 23, a Y-drum; 24, a Y-polygon mirror; 25, a Y-toner box; 26, an M-cleaner; 27, an M-drum; 28, an M-polygon mirror; 29, an M-toner box; 30, a C-cleaner; 31, a C-drum; 32, a C-polygon mirror; 33, a C-toner box; 34, a K-cleaner; 35, a K-drum; 36, a K-polygon mirror; and 37, a K-toner box.

The 4-tandem color printer 21 is configured by providing a group of the drum, the polygon mirror, the toner box and the cleaner for toner of each color on a conveying path of a sheet. Four groups for each of the Y-color, the M-color, the C-color and the K-color are provided here.

The surface of the Y drum 23 is constructed of a photoreceptor, and irradiates light from a light source such as a laser (not shown) onto a writing position on the Y drum 23 through the Y polygon mirror 24. A portion to which the light has been irradiated becomes charged to form a latent image. The latent image is developed by toner of Y-color in the Y-toner box 25. Thus, the Y-toner is transferred onto the sheet 3. The toner, which has not been transferred onto the sheet 3, but remained on the surface of the Y-drum 23, and the charge are removed by the Y-cleaner 22.

Similarly, the surface of the M-drum 27 is constructed of photoreceptor, and irradiates light from a light source such as a laser (not shown) onto a writing position on the M drum 27 through the M polygon mirror 28. A portion to which the light has been irradiated becomes charged to form a latent image. The latent image is developed by toner of M-color in the M-toner box 29. Thus, the M-toner is transferred onto the sheet 3. The toner, which has not been transferred onto the sheet 3 but remained on the surface of the M-drum 27, and the charge are removed by the M-cleaner 26.

The surface of the C-drum 31 is also similarly constructed of a photoreceptor, and irradiates light from a light source such as a laser (not shown) onto a writing position on the C-drum 31 through the C polygon mirror 32. A portion to which the light has been irradiated becomes charged to form a latent image. The latent image is developed by toner of C-color in the C-toner box 33. Thus, the C-toner is transferred onto the sheet 3. The toner, which has not been transferred onto the sheet 3 but remained on the surface of the C-drum 31, and the charge are removed by the C-cleaner 30.

The surface of the K-drum 35 is also similarly constructed of a photoreceptor, and irradiates light from a light source such as a laser (not shown) onto a writing position on the K-drum 35 through the K polygon mirror 36. A portion to which the light has been irradiated becomes charged to form a latent image. The latent image is developed by toner of K-color in the K-toner box 37. Thus, the K-toner is transferred onto the sheet 3. The toner, which has not been transferred onto the sheet 3 but remained on the surface of the K-drum 37, and the charge are removed by the K-cleaner 34.

In the tray 2, there are stored sheets 3, and a sheet 3 fed from this tray 2 is conveyed through the belt 6. The belt 6 is driven by the front roll 4 and the rear roll 5. In the course of process, in which the sheet 3 is conveyed through the belt 6, Y-toner is transferred from the Y-drum 23, M-toner is transferred from the M-drum 27, C-toner is transferred from the C-drum 31, and K-toner is transferred from the K-drum 35. Thus, the fixer 7 applies heat to toner of four colors transferred onto the sheet 3 to fix onto the sheet.

Next, a description will be made of the operation of the 4-tandem color printer 21. FIG. 34 is an explanatory view illustrating an example of a method of transmitting image data onto the 4-tandem color printer; and FIG. 35 is an explanatory view illustrating an example of timing of transmission and transference of image data onto the 4-tandem color printer. To the 4-tandem color printer 21, plane sequence data of Y-color, M-color, C-color and K-color bit maps are transmitted in parallel with somewhat timing drift as shown in FIG. 34.

The image Y1, which is data of the first page, is transmitted to the 4-tandem color printer 21 in the plane sequence. The data of the image Y1 of 8-bit each pixel transmitted is converted to width when the laser turns ON. The Y-polygon mirror 24 outputs one line of image data in the main scanning direction of the sheet 3. When the Y-drum 23 is rotating and a fixed length is outputted in the main scanning direction, the irradiating position of the laser light returns to the starting point of the next line to output one-line. A portion of the Y-drum 23 which has received light when the laser turns ON becomes charged to form a latent image. The Y-toner box 25 causes Y-color toner to adhere to the latent image portion charged.

Data of an image M1, an image C1 and an image K1, which is data constituting one page similarly, are transmitted to the 4-tandem color printer 21 in the plane sequence, and M-color toner, C-color toner and K-color toner adhere to the M-drum 27, the C-drum 31 and the K-drum 35 respectively depending on the image data as the image Y1 has been processed. The toner adhered to each drum is transferred onto the sheet 3.

FIG. 35 shows timing in this process. When printing of the first page is started, data of the image Y1 is first transmitted to the 4-tandem color printer 21, is converted into irradiation width of laser light to charge the Y-drum 23 with electricity, and the Y-toner box 25 causes Y-color toner to adhere to the Y-drum 23. On the other hand, the sheet 3 is fed from the tray 2, is conveyed through the belt 6 and Y-color toner adhered to the Y-drum 23 is transferred onto the sheet 3. The Y-color toner, which has not been transferred onto the sheet 3 but remained on the Y-drum 23, and the charged portion are cleared by the Y-cleaner 22. At this time, the charging with electricity by laser, adhesion of the Y-color toner, transference onto the sheet 3 and the clearing treatment by the Y-cleaner 22 take place on the Y-drum 23 at the same time. The same things take place on the image M1, the image C1, and the image K1 with temporal drift as shown in FIG. 35. After the completion of transference of Y-color toner, M-color toner, C-color toner and K-color toner onto the sheet 3, the fixer 7 applies heat to the toner to fix to the sheet 3. Thus, when the sheet 3 is discharged from the printer, the recording operation for the first page is completed. The operations for the second page and after will be performed in the same way to complete a series of recording operations.

FIG. 36 is an explanatory view illustrating a basic mechanism for a 2-tandem color printer. In FIG. 36, components equivalent to those in FIG. 29 are represented by the same reference numbers. A reference numeral 41 designates the 2-tandem color printer; 42, a YM-cleaner; 43, a YM-drum; 44, a YM-polygon mirror; 45, a YM-toner selection box; 46, a Y-toner box; 47, an M-toner box; 48, a CK-cleaner; 49, a CK-drum; 50, a CK-polygon mirror; 51, a CK-toner selection box; 52, a C-toner box; and 53, a K-toner box.

The 2-tandem color printer 41 is configured by providing two groups; each group including the drum, the polygon mirror, the toner selection box including a two-color toner box and the cleaner, for toner of each color on a conveying path of a sheet. The configuration is arranged here so that either Y-color and M-color, or C-color and K-color are selectively used.

The surface of the YM drum 43 is constructed of a photoreceptor, and irradiates light from a light source such as a laser (not shown) onto a writing position on the YM drum 43 through the YM-polygon mirror 44. A portion to which the light has been irradiated becomes charged to form a latent image. The YM toner selection box 45 is provided with the Y-toner box 46 and the M-toner box 47, either of which is selected. A latent image formed on the YM-drum 43 is developed by the use of toner of a color selected by the YM-toner selection box 45.

The surface of the CK drum 49 is similarly constructed of a photoreceptor, and irradiates light from a light source such as a laser (not shown) onto a writing position on the CK drum 49 through the CK polygon mirror 50. A portion to which the light has been irradiated becomes charged to form a latent image. The CK toner selection box 51 is provided with the C-toner box 52 and the K-toner box 53, either of which is selected. A latent image formed on the CK-drum 49 is developed by the use of toner of a color selected by the CK-toner selection box 51.

In the tray 2, there are stored sheets 3, and a sheet 3 fed from this tray 2 is conveyed through the belt 6. The belt 6 is driven by the front roll 4 and the rear roll 5. In the course of process, in which the sheet 3 is conveyed through the belt 6, Y-toner and M-toner are transferred from the YM-drum 43, and C-toner and K-toner are transferred from the CK-drum 49. Thus, the fixer 7 applies heat to toner of four colors transferred onto the sheet 3 to fix onto the sheet. In this respect, the toner, which has not been transferred onto the sheet 3 but remained on the surface of the YM-drum 43, and the charge are removed by the YM-cleaner 42. Also, the toner, which has not been transferred onto the sheet 3 but remained on the surface of the CK-drum 49, and the charge are removed by the CK-cleaner 48.

Next, a description will be made of the operation of the 2-tandem color printer 41. FIG. 37 is an explanatory view illustrating an example of a method of transmitting image data to the 2-tandem color printer; and FIG. 38 is an explanatory view illustrating an example of timing of transmission and transference of image data onto the 2-tandem color printer. To the 2-tandem color printer 41, Y-color and M-color are in sequence transmitted, and C-color and K-color are in sequence transmitted as plane sequence data of bit maps as shown in FIG. 37.

The image Y1, which is data of the first page, is transmitted to the 2-tandem color printer 41 in the plane sequence. The data of the image Y1 of 8-bit each pixel transmitted is converted to the irradiation width of laser light. The YM-polygon mirror 44 outputs one line of image data in the main scanning direction. When the YM-drum 43 is rotating and a fixed length is outputted in the main scanning direction, the irradiating position of the laser light returns to the starting point of the next line to output one line. A portion of the YM-drum 43, which has been irradiated with laser light, is charged with electricity. The YM-toner selection box 45 has set the Y-toner box 46 and Y-color toner adheres to the portion charged.

When the processing of the image Y1 is completed, the YM toner selection box 45 sets the M-toner box 47, and the image M1 is transmitted to the 2-tandem color printer 41. The image M1 causes the YM-polygon mirror 44 to irradiate the YM-drum 43 with laser light for charging, and causes M-color toner to adhere. After the transmission of the image M1 is started, the sheet 3 is fed from the tray 2, is conveyed through the belt 6, and Y-color toner and M-color toner are transferred onto the sheet 3. The Y-color toner and M-color toner, which have not been transferred onto the sheet 3 but remained on the YM-drum 43, and the charged portion are cleared by the YM-cleaner 42.

In this course, on the YM-drum 43, there are performed the charging by laser light, adhesion of the M-color toner, transference of Y-color toner and M-color toner onto the sheet 3 and the clearing treatment by the YM-cleaner 42 at the same time.

As shown in FIG. 38, images C1 and K1 are also subjected to the same processing, with temporal drift, as the processing on the images Y1 and M1 described above. After Y-color toner and M-color toner are transferred onto the sheet 3 to be conveyed, the sheet 3 is further conveyed and C-color toner and K-color toner are transferred onto it. After the completion of transference of Y-color toner, M-color toner, C-color toner and K-color toner onto the sheet 3, the fixer 7 applies heat to the toner to fix to the sheet 3. Thus, when the sheet 3 is discharged from the printer, the printing operation for the first page is completed. The similar operation will be performed on the second page and after to complete a series of recording operations.

Next, a description will be made of an image processing apparatus for outputting data to such a 4-cycle color printer 1, a 4-tandem color printer 21 and a 2-tandem color printer 41 as described above. In the image processing apparatus, a PDL (language obtained by describing data to be outputted from a printer), which is transmitted from a personal computer, a work station or the like for printing, is converted into an intermediate language which can be processed by internal hardware. Thus, at a speed capable of following a data output speed to a printer at the time of outputting to a color printer, the intermediate language is converted into bit map data for outputting to the color printer.

The capacity of memory required for rendering and storing bit map data on outputting to the color printer is approximately 140 MB (mega byte) at resolution of 600 DPI and at 8-bit each color of YMCK using A4 in sheet size. Also, in order to continuously feed bit map data to the color printer, memory for storing data in the print and memory for rendering data of the next page are required, and therefore, memory of approximately 280 MB will be required.

Although memory of such large capacity may, of course, be mounted, it becomes very expensive as a system. Therefore, in order to implement a low-priced system, a system using an intermediate language and a band buffer has been worked out. FIG. 39 is an explanatory view illustrating an example of a recording operation using the intermediate language and the band buffer. In FIG. 39, a reference numeral 61 designates PDL; 62 to 65, intermediate languages; 66 and 67, band buffers; and 68, a formed image. FIG. 39 shows an operation in a system having two band buffers, each band buffer having a size obtained by dividing data of one page into four. A PDL 61 is transmitted from a personal computer, a work station or the like. Here, it is assumed as an example that instructions for rendering a Circle, a Character "A" and a Rectangle have been described in the PDL 61.

The information of the PDL 61 is converted into intermediate languages in units of bands divided into four. As the first band, an intermediate language 62 of band 1, which is an intermediate language for rendering a circle, is generated. As the next band 2, an intermediate language 63 of band 2, which is an intermediate language for rendering a character "A", is generated. As the next band 3, an intermediate language 64 of band 3 for rendering R1, which is a portion of a rectangle, is generated. As the last band 4, an intermediate language 65 of band 4 for rendering R2, which is a portion of a rectangle, is generated.

The band buffer is constructed of two band buffers 66 and 67, each of which has a size obtained by dividing one page into four. When printing is performed by a color printer, the intermediate language 62 of band 1 is rendered on the band buffer 66 as bit map data, and output to the printer is started after completion of the rendering. The intermediate language 63 of band 2 is rendered on the band buffer 67 as bit map data while data of the band buffer 66 is being outputted to the printer, and after the completion of the rendering, there is a wait till the output of the band buffer 66 to the color printer is completed.

After the completion of the output of the band buffer 66, the bit map data is subsequently outputted from the band buffer 67. At the same time, the band buffer 66 is cleared (background color is written on the entire surface), the intermediate language 64 of band 3 is rendered on the band buffer 66 as bit map data, and after the completion of the rendering, there is a wait till the output of the band buffer 67 to the color printer is completed.

After the completion of the output of the band buffer 67, the bit map data is subsequently outputted from the band buffer 66. At the same time, the band buffer 67 is cleared (background color is written on the entire surface), the intermediate language 65 of band 4 is rendered on the band buffer 67 as bit map data, and after the completion of the rendering, there is a wait till the output of the band buffer 66 to the color printer is completed.

After the completion of the output of the band buffer 66, the bit map data is subsequently outputted from the band buffer 67. After the completion of the data output from the band buffer 67, data output of one page is completed to complete the printing.

The memory for use in this way is band buffers 66 and 67, each of which has capacity of one quarter of one page. In other words, memory for printing requires a half of the memory required for rendering one page. In a case where one page is divided into 32, it is possible to implement a system capable of printing with memory of one sixteenth.

FIG. 40 is a block diagram showing an example of an image processing apparatus corresponding to the 4-cycle color printer. In FIG. 40, a reference numeral 71 designates an image processing apparatus corresponding to the 4-cycle color printer; 72, a CPU; 73, a bus bridge; 74, system memory; 75, a PDL; 76, an intermediate language; 77, a YMCK rendering processor; 78, a YMCK band buffer; 79, a YMCK output control unit; and 80, a bus. In this respect, the configuration of the 4-cycle color printer 1 is as shown in FIG. 29, and components equivalent to those in FIG. 29 are represented by the same reference numbers.

The image processing apparatus 71 corresponding to the 4-cycle color printer has a CPU 72, a system memory 74, a YMCK rendering processor 77, a YMCK output control unit 79 and the like, and the CPU 72, the system memory 74 and the bus 80 are connected together through the bus bridge 73. The CPU 72 controls the image processing apparatus 71 corresponding to the 4-cycle color printer, and performs a process of converting the PDL 75 into the intermediate language 76. The system memory 74 stores the PDL 75 and the intermediate language 76. The YMCK rendering processor 77 converts the intermediate language 76 into bit map data. The YMCK rendering processor 77 has the YMCK band buffer 78, in which bit map data for at least two bands can be written. The YMCK output control unit 79 outputs bit map data rendered on the YMCK band buffer 78 to the 4-cycle color printer 1.

A description will be made of a basic operation of the image processing apparatus 71 corresponding to the 4-cycle color printer. When an instruction to print is issued to the 4-cycle color printer 1 from a personal computer, a work station or the like, the PDL 75 is generated and is transmitted to the image processing apparatus 71 corresponding to the 4-cycle color printer. At this time, the CPU 72 performs communication processing with the personal computer, the work station or the like. The PDL 75 transmitted is stored in the system memory 74. The CPU 72 performs a process of converting the PDL 75 into an intermediate language 76 which can be processed by the YMCK rendering processor 77. After the completion of the conversion process into the intermediate language 76, the CPU 72 issues an instruction to start printing to the YMCK rendering processor 77.

The YMCK band buffer 78 within the YMCK rendering processor 77 is divided into two, and when one is outputting bit map data to the 4-cycle color printer 1, the other is used for processing to render the bit map data from the intermediate language 76. On the receipt of an instruction to start printing, the YMCK rendering processor 77 automatically reads the intermediate language 76 existing on the system memory 74 to generate Y-color bit map data to the YMCK band buffer 78. When the Y-color bit map data is generated, the YMCK output control unit 79 starts data output to the 4-cycle color printer 1. The YMCK rendering processor 79 renders the next band while outputting the data to the 4-cycle color printer 1, to generate bit map data. By the use of the YMCK band buffer 78 divided into two, all the bands are rendered to complete the output of the Y-color bit map data.

Similarly, M-color bit map data, C-color bit map data and K-color bit map data are sequentially outputted to the 4-cycle color printer 1 to complete the printing of one page.

FIG. 41 is a block diagram showing an example of an image processing apparatus corresponding to the 4-tandem color printer. In FIG. 41, components equivalent to those in FIG. 40 are represented by the same reference numbers, and a description thereof will be omitted. A reference numeral 81 designates an image processing apparatus corresponding to the 4-tandem color printer; 82, a Y-rendering processor; 83, a Y-band buffer; 84, a Y-output control unit; 85, an M-rendering processor; 86, an M-band buffer; 87, an M-output control unit; 88, a C-rendering processor; 89, a C-band buffer; 90, a C-output control unit; 91, a K-rendering processor; 92, a K-band buffer; and 93, a K-output control unit. In this respect, the configuration of the 4-tandem color printer 1 is as shown in FIG. 33, and components equivalent to those in FIG. 33 are represented by the same reference numbers.

The image processing apparatus 81 corresponding to the 4-tandem color printer has a CPU 72, a system memory.74, the Y-rendering processor 82, the Y-output control unit 84, the M-rendering processor 85, the M-output control unit 87, the C-rendering processor 88, the C-output control unit 90, the K-rendering processor 91, the Y-output control unit 93 and the like. Also, the CPU 72, the system memory 74 and the bus 80 are connected together through the bus bridge 73.

The Y-rendering processor 82 converts the intermediate language 76 into Y-color bit map data. The Y-rendering processor 82 has the Y-band buffer 83, in which Y-color bit map data for at least two bands can be written. The Y-output control unit 84 outputs bit map data rendered on the Y-band buffer 83 to the 4-tandem color printer 21.

The M-rendering processor 85 converts the intermediate language 76 into M-color bit map data. The M-rendering processor 85 has the M-band buffer 86, in which M-color bit map data for at least two bands can be written. The M-output control unit 87 outputs bit map data rendered on the M-band buffer 86 to the 4-tandem color printer 21.

The C-rendering processor 88 converts the intermediate language 76 into C-color bit map data. The C-rendering processor 88 has the C-band buffer 89, in which C-color bit map data for at least two bands can be written. The C-output control unit 90 outputs bit map data rendered on the C-band buffer 89 to the 4-tandem color printer 21.

The K-rendering processor 91 converts the intermediate language 76 into K-color bit map data. The K-rendering processor 91 has the K-band buffer 92, in which K-color bit map data for at least two bands can be written. The K-output control unit 93 outputs bit map data rendered on the K-band buffer 92 to the 4-tandem color printer 21.

A description will be made of a basic operation of the image processing apparatus 81 corresponding to the 4-tandem color printer. When an instruction to print is issued to the 4-tandem color printer 21 from a personal computer, a work station or the like, the PDL 75 is generated and is transmitted to the image processing apparatus 81 corresponding to the 4-tandem color printer. At this time, the CPU 72 performs communication processing with the personal computer, the work station or the like. The PDL 75 transmitted is stored in the system memory 74. The CPU 72 performs a process of converting the PDL 75 into an intermediate language 76 which can be processed by the Y-rendering processor 82, the M-rendering processor 85, the C-rendering processor 88, and the K-rendering processor 91. After the completion of the conversion process into the intermediate language 76, the CPU 72 issues an instruction to start printing to the Y-rendering processor 82, the M-rendering processor 85, the C-rendering processor 88, and the K-rendering processor 91.

The Y-band buffer 83 is divided into two, and when one is outputting bit map data to the 4-tandem color printer 21, the other is used for processing to render the bit map data from the intermediate language 76. On the receipt of an instruction to start printing, the Y-rendering processor 82 automatically reads the intermediate language 76 existing on the system memory 74 to generate Y-color bit map data to the Y band buffer 83.

When the Y-color bit map data is generated, the Y-output control unit 84 starts data output to the 4-tandem color printer 21. The Y-rendering processor 82 renders the next band while outputting bit map data to the 4-tandem color printer 21 through the Y-output control unit 84, to generate bit map data. By the use of the Y-band buffer 83 divided into two, all the bands are rendered and the data thus rendered is outputted to complete the output of the Y-color bit map data.

When the Y-output control unit 84 starts to transmit bit map data to the 4-tandem color printer 21, the M-rendering processor 85 automatically reads the intermediate language 76 to start generation of M-color bit map data in the M-band buffer 86. On receipt of a request from the 4-tandem color printer 21 to transmit the M-color bit map data, the M-output control unit 87 starts output of the M-color bit map data. While outputting bit map data to the 4-tandem color printer 21 through M-output control unit 87, the M-rendering processor 85 renders the next band to generate bit map data. By the use of the M-band buffer 86 divided into two, all the bands are rendered and the data thus rendered is outputted to complete the output of the M-color bit map data.

When the M-output control unit 87 starts to transmit bit map data to the 4-tandem color printer 21, the C-rendering processor 88 automatically reads the intermediate language 76 to start generation of C-color bit map data in the C-band buffer 89. On receipt of a request from the 4-tandem color printer 21 to transmit the C-color bit map data, the C-output control unit 90 starts output of the C-color bit map data. While outputting the data to the 4-tandem color printer 21 through C-output control unit 90, the C-rendering processor 88 renders the next band to generate bit map data. By the use of the C-band buffer 89 divided into two, all the bands are rendered and the bit map data thus rendered is outputted to complete the output of the C-color bit map data.

When the C-output control unit 90 starts to transmit bit map data to the 4-tandem color printer 21, the K-rendering processor 91 automatically reads the intermediate language 76 to start generation of K-color bit map data in the K-band buffer 92. On receipt of a request from the 4-tandem color printer 21 to transmit the K-color bit map data, the K-output control unit 93 starts output of the K-color bit map data. While outputting the bit map data to the 4-tandem color-printer 21 through K-output control unit 93, the K-rendering processor 91 renders the next band to generate bit map data. By the use of the K-band buffer 92 divided into two, all the bands are rendered and the bit map data thus rendered is outputted to complete the output of the K-color bit map data. The above-described processing completes printing of one page.

FIG. 42 is a block diagram showing an example of an image processing apparatus corresponding to the 2-tandem color printer. In FIG. 42, components equivalent to those in FIG. 40 are represented by the same reference numbers, and a description thereof will be omitted. A reference numeral 101 designates an image processing apparatus corresponding to the 2-tandem color printer; 102, a YM-rendering processor; 103, a YM-band buffer; 104, a YM-output control unit; 105, a CK-rendering processor; 106, a CK-band buffer; and 107, a CK-output control unit. In this respect, the configuration of the 2-tandem color printer 41 is as shown in FIG. 36, and components equivalent to those in FIG. 36 are represented by the same reference numbers.

The image processing apparatus 101 corresponding to the 2-tandem color printer has a CPU 72, a system memory 74, a YM-rendering processor 102, a YM-output control unit 104, a CK-rendering processor 105, a CK-output control unit 107 and the like. Also, the CPU 72, the system memory 74 and the bus 80 are connected together through the bus bridge 73.

The YM-rendering processor 102 converts the intermediate language 76 into bit map data of Y-color and M-color. The YM-rendering processor 102 has the YM-band buffer 103, in which bit map data of Y-color and M-color for at least two bands can be written. The YM-output control unit 104 outputs bit map data rendered on the YM-band buffer 103 to the 2-tandem color printer 41.

The CK-rendering processor 105 converts the intermediate language 76 into bit map data of C-color and K-color. The CK-rendering processor 105 has the CK-band buffer 106, in which bit map data of C-color and K-color for at least two bands can be written. The CK-output control unit 107 outputs bit map data rendered on the CK-band buffer 106 to the 2-tandem color printer 41.

A description will be made of a basic operation of the image processing apparatus 101 corresponding to the 2-tandem color printer. When an instruction to print is issued to the 2-tandem color printer 41 from a personal computer, a work station or the like, the PDL 75 is generated and is transmitted to the image processing apparatus 101 corresponding to the 2-tandem color printer. At this time, the CPU 72 performs communication processing with the personal computer, the work station or the like. The PDL 75 transmitted is stored in the system memory 74. The CPU 72 performs a process of converting the PDL 75 into an intermediate language 76 which can be processed by the YM-rendering processor 102 and the CK-rendering processor 105. After the completion of the conversion process into the intermediate language 76, the CPU 72 issues an instruction to start printing to the YM-rendering processor 102 and the CK-rendering processor 105.

The YM-band buffer 103 is divided into two, and when one is outputting bit map data to the 2-tandem color printer 41, the other is used for processing to render the bit map data from the intermediate language 76. On the receipt of an instruction to start printing, the YM-rendering processor 102 automatically reads the intermediate language 76 existing on the system memory 74 to generate Y-color bit map data to the YM-band buffer 103. When the Y-color bit map data is generated, the YM-output control unit 104 starts output of bit map data to the 2-tandem color printer 41. The YM-rendering processor 102 renders the next band while outputting bit map data to the 2-tandem color printer 41 through the YM-output control unit 104, to generate bit map data. By the use of the YM-band buffer 103 divided into two, all the bands are rendered and the data thus rendered is outputted to complete the output of the Y-color bit map data.

Subsequently, the YM-rendering processor 102 starts generation of M-color bit map data. It automatically reads the intermediate language 76 existing on the system memory 74 to generate M-color bit map data in the YM band buffer 103. When the M-color bit map data is generated, the YM output control unit 104 starts output of bit map data to the 2-tandem color printer 41. While outputting the bit map data to the 2-tandem color printer 41 through YM-output control unit 104, the YM-rendering processor 102 renders the next band to generate bit map data. By the use of the YM-band buffer 103 divided into two, all the bands are rendered and the bit map data thus rendered is outputted to complete the output of the M-color bit map data.

When the YM-output control unit 104 starts to transmit the bit map data to the 2-tandem color printer 41, the CK-rendering processor 105 automatically reads the intermediate language 76 to start generation of C-color bit map data in the CK-band buffer 106. On receipt of a request from the 2-tandem color printer 41 to transmit the C-color bit map data, the CK-output control unit 107 starts output of the C-color bit map data. While outputting the bit map data to the 2-tandem color printer 41 through CK-output control unit 107, the CK-rendering processor 105 renders the next band to generate bit map data. By the use of the CK-band buffer 106 divided into two, all the bands are rendered and the bit map data thus rendered is outputted to complete the output of the C-color bit map data.

Subsequently, the CK-rendering processor 105 generates K-color bit map data. It automatically reads the intermediate language 76 existing on the system memory 74 to generate K-color bit map data in the CK band buffer 106. When the K-color bit map data is generated, the CK output control unit 107 starts output of bit map data to the 2-tandem color printer 41. While outputting the bit map data to the 2-tandem color printer 41 through CK-output control unit 107, the CK-rendering processor 105 renders the next band to generate bit map data. By the use of the CK-band buffer 106 divided into two, all the bands are rendered and the bit map data thus rendered is outputted to complete the output of the K-color bit map data.

As described above, the color printer has different configuration of an image processing apparatus for generating bit map data to be outputted to the color printer depending upon its mechanism. In the above-described description, the description has been made focusing attention to the configuration of the image processing apparatus, but not only the configuration but also the throughput capacity required differs. Hereinafter, a description will be made of the throughput capacity required for the image processing apparatus in each color printer.

FIG. 43 is an explanatory view illustrating a concrete example of record processing using a band buffer having a size of one eighth of one page; and FIG. 44 is likewise an explanatory view illustrating relationship between a band management unit and intermediate languages for each band to be managed. In FIGS. 43 and 44, a reference numeral 111 designates a PDL; 112, images indicated by the PDL 111; 113, 121 to 128, band data; 114, a band management unit; and 115, an intermediate language group. Here, as an example, it is assumed that the PDL 111 describing the image 112 is inputted into the image processing apparatus as shown in FIG. 43 and is converted into intermediate languages divided for each band having a size of one eighth of one page. Although the band data 113 is actually not bit-map-expanded, an image bit-map-expanded is shown for the sake of clarity. The intermediate language group 115 divided for each band in this way is managed by the band management unit 114 respectively as shown in FIG. 44.

Let us consider a case where the PDL 111 as shown in FIG. 43 is printed by a 4-cycle color printer 1, a 4-tandem color printer 21 and a 2-tandem color printer 41 having a printing speed of NPPM (Page Per Minute: a number of pages which can be printed a minute) by the use of a conventional image processing apparatus 71 corresponding to the 4-cycle color printer, an image processing apparatus 81 corresponding to the 4-tandem color printer, and an image processing apparatus 101 corresponding to the 2-tandem color printer. In this respect, image 112 shown in FIG. 43 can be obtained by printing by each color printer.

In the image processing apparatus 71 corresponding to the 4-cycle color printer, the image processing apparatus 81 corresponding to the 4-tandem color printer, and the image processing apparatus 101 corresponding to the 2-tandem color printer, the PDL 111 is converted into the intermediate language group 115, is further converted into bit map data by the use of band buffers divided into eight, and is outputted to the 4-cycle color printer 1, the 4-tandem color printer 21 and the 2-tandem color printer 41.

FIG. 45 is a timing chart when bit map data for each band is transmitted onto the 4-cycle color printer in the conventional image processing apparatus corresponding to the 4-cycle color printer. Here, there are shown the operations of the YMCK rendering processor 77 for rendering (generating) bit map data from the intermediate language and the YMCK output control unit 79 for controlling the output to the 4-cycle color printer 1 in the image processing apparatus 71 corresponding to the 4-cycle color printer.

Also, FIG. 46 is a timing chart when bit map data for each band is transmitted onto the 4-tandem color printer in the conventional image processing apparatus corresponding to the 4-tandem color printer. Here, in the image processing apparatus 81 corresponding to the 4-tandem color printer, there are shown the operations of the Y-rendering processor 82, the M-rendering processor 85, the C-rendering processor 88, and the K-rendering processor 91, which render (generate) bit map data from the intermediate language, and the Y-output control unit 84, the M-output control unit 87, the C-output control unit 90 and the K-output control unit 93, which control the output to the 4-tandem color printer 21.

Further, FIG. 47 is a timing chart when bit map data for each band is transmitted onto the 2-tandem color printer in the conventional image processing apparatus corresponding to the 2-tandem color printer. Here, in the image processing apparatus 101 corresponding to the 2-tandem color printer, there are shown the operations of the YM-rendering processor 102 and the CK-rendering processor 105, which render (generate) bit map data from the intermediate language, and the YM-output control unit 104 and the CK-output control unit 107, which control the output to the 2-tandem color printer 41. In this respect, in FIGS. 45 to 47, (1) to (8) correspond to bands (1) to (8) divided into eight.

Here, attention is focused on the rendering processor in the image processing apparatus. When time given to process one band is assumed to be T seconds in the YMCK rendering processor 77 of the image processing apparatus 71 corresponding to the 4-cycle color printer, the time is approximately 4T seconds in the Y-rendering processor 82, the M-rendering processor 85, the C-rendering processor 88, and the K-rendering processor 91 in the image processing apparatus 81 corresponding to the 4-tandem color printer. Further, the time becomes approximately 2T seconds in the YM-rendering processor 102 and the CK-rendering processor 105 of the image processing apparatus 101 corresponding to the 2-tandem color printer. More specifically, when rendering performance of the Y-rendering processor 82, the M-rendering processor 85, the C-rendering processor 88, and the K-rendering processor 91 in the image processing apparatus 81 corresponding to the 4-tandem color printer is assumed to be 1, the performance twice as good is required for the YM-rendering processor 102 and the CK-rendering processor 105 in the image processing apparatus 101 corresponding to the 2-tandem color printer. Further, the performance four times as good is required for the YMCK rendering processor 77 in the image processing apparatus 71 corresponding to the 4-cycle color printer.

When developing an image processing apparatus for controlling a color printer, the development is preferably performed with less expenses. In this case, it can be conceived that the YMCK rendering processor 77 and the YMCK output control unit 79, for which the highest performance is required, are developed as one 4-cycle ASIC, and in the image processing apparatus 71 corresponding to the 4-cycle color printer, the system is constructed of one piece of this 4-cycle ASIC. Also, it can be conceived that in the image processing apparatus 101 corresponding to the 2-tandem color printer, the system is constructed of two pieces of the 4-cycle ASIC, and that in the image processing apparatus 81 corresponding to the 4-tandem color printer, the system is constructed of four pieces of the 4-cycle ASIC.

In the image processing apparatus 81 corresponding to the 4-tandem color printer, however, it becomes very excessive in specification and the cost is increased because it is possible to output to the color printer with performance of a quarter of the 4-cycle ASIC. Also, since four pieces of 4-cycle ASIC are connected to the bus, the substrate also becomes larger, and the cost is increased. Further, since a number of devices are connected to the bus, there arises a limit to increasing the clock speed. Even in the image processing apparatus 101 corresponding to the 2-tandem color printer, there arises a similar problem although it is not so serious as in the image processing apparatus 81 corresponding to the 4-tandem color printer.

Next, when the development is performed with particular emphasis on the image processing apparatus 81 corresponding to the 4-tandem color printer, there can be conceived a case where the development is performed with the Y-rendering processor 82, the M-rendering processor 85, the C-rendering processor 88, the K-rendering processor 91, the Y-output control unit 84, the M-output control unit 87, the C-output control unit 90, and the K-output control unit 93 as one 4-tandem ASIC. This 4-tandem ASIC may operate with a quarter of the performance of the 4-cycle ASIC, and can be implemented by the use of a package a little larger than the 4-cycle ASIC. For this reason, when the cost of the 4-cycle ASIC is assumed to be 1, the 4-tandem ASIC can be implemented at a cost of approximately 1.5 times as high as it. In the case of designing the image processing apparatus 81 corresponding to the 4-tandem color printer, the cost of the ASIC when one piece of the 4-tandem ASIC is used becomes approximately one third the cost when four pieces of 4-cycle ASIC are used, and it can be packaged on a small substrate, and therefore, it becomes possible to implement it on a low-priced substrate.

However, when the 4-tandem ASIC is used on designing the image processing apparatus 71 corresponding to the 4-cycle color printer, it is possible to design with one piece of 4-tandem ASIC, but it can be connected only to a 4-cycle color printer 1 having the one-quarter performance. Similarly, when the 4-tandem ASIC is used on designing the image processing apparatus 101 corresponding to the 2-tandem color printer, it is possible to design with two pieces of 4-tandem ASIC, but it can only be connected to a 2-tandem color printer 41 having the half performance.

When the performance and the system cost are optimized, it is necessary to individually develop the ASIC in accordance with each of the image processing apparatus 71 corresponding to the 4-cycle color printer, the image processing apparatus 81 corresponding to the 4-tandem color printer and the image processing apparatus 101 corresponding to the 2-tandem color printer, and the development expense and design man-hour increase three times. Also, the configuration of the color printer can be conceived in addition to the 4-cycle color printer 1, the 4-tandem color printer 21 and the 2-tandem color printer 41, and the performance is also advancing day by day. Therefore, there was the problem that the development expense and design man-hour would be enormous if individually developed.

In the above description, there has been shown a case of image processing for converting PDL into bit map data, and there has arisen the similar problem not only in such image processing, but also in various image processing such as a case of outputting to a printer while decoding, for example, bit map data encoded.

In the image processing apparatus 81 corresponding to the 4-tandem color printer and the image processing apparatus 101 corresponding to the 2-tandem color printer, plural rendering processors are provided to perform the processing in parallel. However, all the rendering processors in these image processing apparatuses process images having different colors in the same band. On the other hand, among conventional image processing apparatuses, some apparatuses, which process different bands in plural rendering processors, have also been developed. In an image processing apparatus described in, for example, Japanese Published Unexamined Patent Application No. Hei 6-214555, plural rendering modules are provided to process respectively-different rendering commands. Also, printing equipment described in Japanese Published Unexamined Patent Application No. Hei 10-151815 has plural expansion processors to expand into bit map data in respectively-different bands. In the technique described in these literatures, however, speedup due to parallel processing can be attempted, but no consideration has been given to the mechanism of an output device such as a printer. Therefore, in the case of outputting to such an output device having various mechanisms as described above, an output control unit suitable for the mechanism of the respective output devices must be separately designed. Also, the throughput capacity suitable for each mechanism as described above will be required, but such control as to perform processing corresponding to such throughput capacity has not been taken into consideration.

SUMMARY OF THE INVENTION

The present invention has been made in view of the above circumstances and provides an image processing apparatus made available irrespective of the mechanism of an output device to be connected thereto.

According to the present invention, there is provided an image processing apparatus for processing image data inputted to output to an output device, characterized by having plural image processing parts for processing image data inputted; a configuration control part for controlling configuration of plural image processing parts in accordance with a mechanism of the output device; a processing order control part for controlling image data to be inputted into plural image processing parts in accordance with the configuration of the image processing parts controlled by the configuration control part; and an output control part for controlling the output to the output device from the image processing parts in accordance with the configuration of the plural image processing parts controlled by the configuration control part.

If the output device is, for example, the above 4-cycle color printer, four image processing parts are used, the configuration control part controls so that the four image processing parts are configured so as to perform sequential processing in parallel, the processing order control part inputs image data to be sequentially outputted to the output device respectively into the four image processing parts, and the output control parts transmit output data to be outputted from the respective image processing parts to the output part in order. Thus, the four image processing parts are capable of processing, for example, Y-color, M-color, C-color and K-color in parallel respectively, and outputting in order. At this time, since respective image processing parts process in parallel, one quarter of the conventional throughput capacity will suffice.

In a case where the above 4-tandem color printer is used as an output device by the use of the same image processing apparatus, the four image processing parts are likewise used, the configuration control part controls so that the four image processing parts are configured so as to perform the processing in parallel, the processing order control part inputs image data to be outputted to the output device in parallel respectively into the four image processing parts, and the output control parts transmit output data to be outputted from the respective image processing parts to the output parts in parallel respectively. Thus, the four image processing parts are capable of processing, for example, Y-color, M-color, C-color and K-color in parallel respectively, and outputting in parallel.

Even when the output device is a 2-tandem color printer, it is, of course, possible to cope with. The configuration control part can control the four image processing parts so that they are constructed of two groups, which perform parallel processing, the processing order control part can input image data to be outputted in parallel to the output device into each of groups of image processing parts, and the output control part can control so that the output data from the group of image processing parts are transmitted in parallel to the output parts, and that the output data to be outputted from two image processing parts within the group are transmitted to the output part in order.

As described above, an image processing apparatus according to the present invention enables output devices having different mechanisms, various output devices such as a 4-cycle color printer, a 4-tandem color printer and a 2-tandem color printer, which are different in, for example, configuration at performance of NPPM, to be connected thereto, and it becomes possible to improve the performance by the use of plural image processing apparatuses even if the performance of the color printer exceeds NPPM.

BRIEF DESCRIPTION OF THE DRAWINGS

Preferred embodiments of the present invention will be described in detail based on the followings, wherein.

DETAILED DESCRIPTION OF THE PREFERRED EMBODIMENTS

Figure 1:
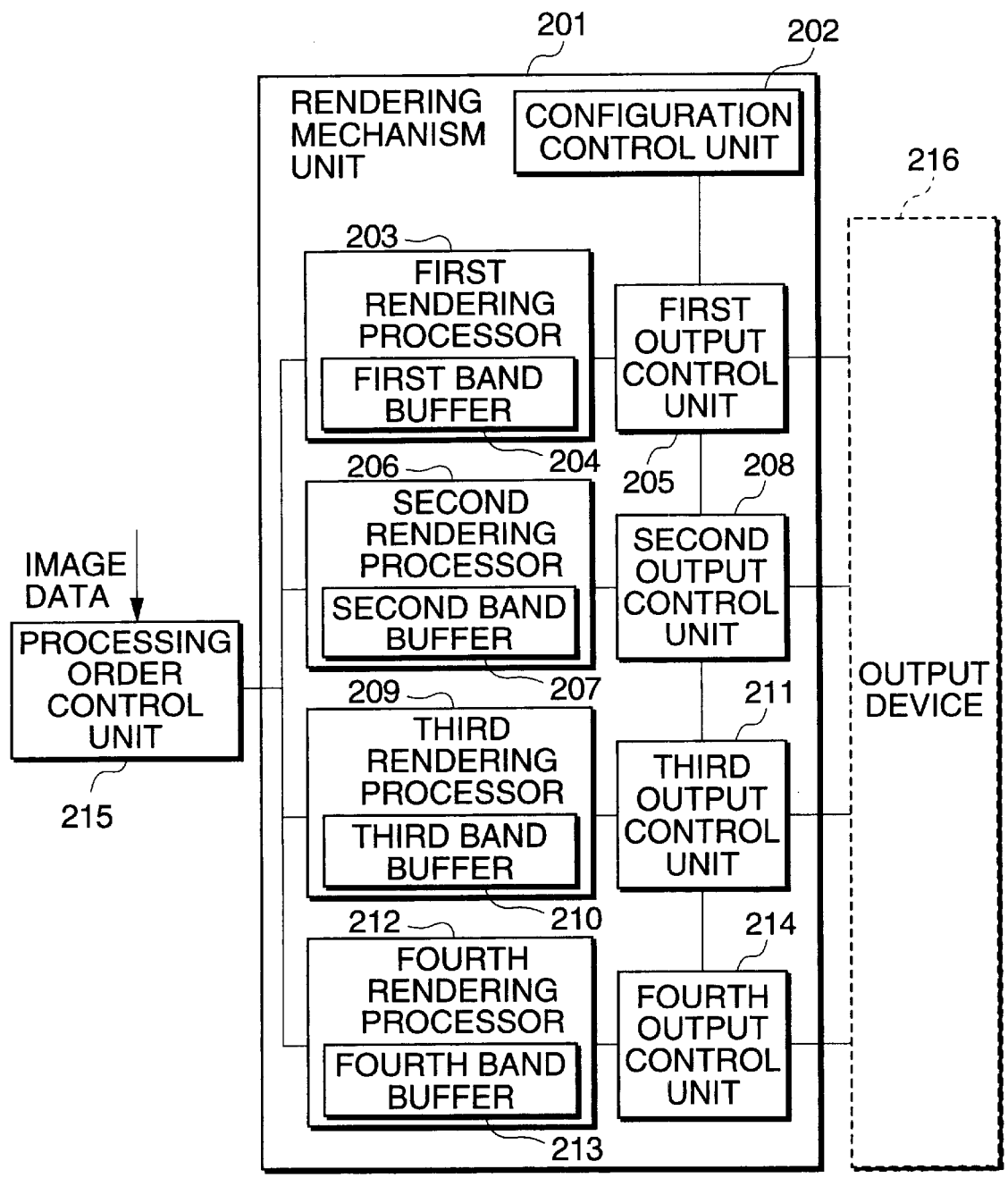
FIG. 1 is a block diagram showing a first embodiment of an image processing apparatus according to the present invention.

FIG. 1 is a block diagram showing a first embodiment of an image processing apparatus according to the present invention. In FIG. 1, a reference numeral 201 designates a rendering mechanism unit; 202, a configuration control unit; 203, a first rendering processor; 204, a first band buffer; 205, a first output control unit; 206, a second rendering processor; 207, a second band buffer; 208, a second output control unit; 209, a third rendering processor; 210, a third band buffer; 211, a third output control unit; 212, a fourth rendering processor; 213, a fourth band buffer; 214, a fourth output control unit; 215, a processing order control unit; and 216, an output device. The present embodiment shows an example in which there are provided the first to fourth rendering processors as plural image processing parts and each rendering processor forms bit map data from the intermediate language to output to the output device 216.

The rendering mechanism unit 201 has the configuration control unit 202, the first rendering processor 203, the second rendering processor 206, the third rendering processor 209, the fourth rendering processor 212, the first output control unit 205, the second output control unit 208, the third output control unit 211, the fourth output control unit 214 and the like.

The first rendering processor 203, the second rendering processor 206, the third rendering processor 209 and the fourth rendering processor 212 convert the intermediate language into bit map data of a color designated. The first rendering processor 203, the second rendering processor 206, the third rendering processor 209 and the fourth rendering processor 212 have the first band buffer 204, the second band buffer 207, the third band buffer 210 and the fourth band buffer 213 in which bit map data for at least two bands can be written respectively.

The first output control unit 205, the second output control unit 208, the third output control unit 211 and the fourth output control unit 214 control on outputting, to the output device 216, bit map data rendered on the first band buffer 204, the second band buffer 207, the third band buffer 210 and the fourth band buffer 213 respectively in accordance with the configuration of the first to fourth rendering processors 203, 206, 209 and 212, which have been controlled by the configuration control unit 202.

The configuration control unit 202 sets connection patterns and output systems of the first to fourth output control units 205, 208, 211 and 214 depending upon the configuration, connection method and a PDL to be printed of the output device 216. Also, the configuration control unit 202 is also interlocked with the processing order control unit 215.

The processing order control unit 215 receives image data described by, for example, a PDL or the like from outside to generate an intermediate language for each band. At this time, the intermediate languages are restructured so as to follow the sequence based on the configuration of the first to fourth rendering processors 203, 206, 209 and 212 controlled by the configuration control unit 202, and the intermediate languages are controlled in such a manner that they are inputted into the first to fourth rendering processors 203, 206, 209 and 212 in accordance with the processing order.

Figure 43:
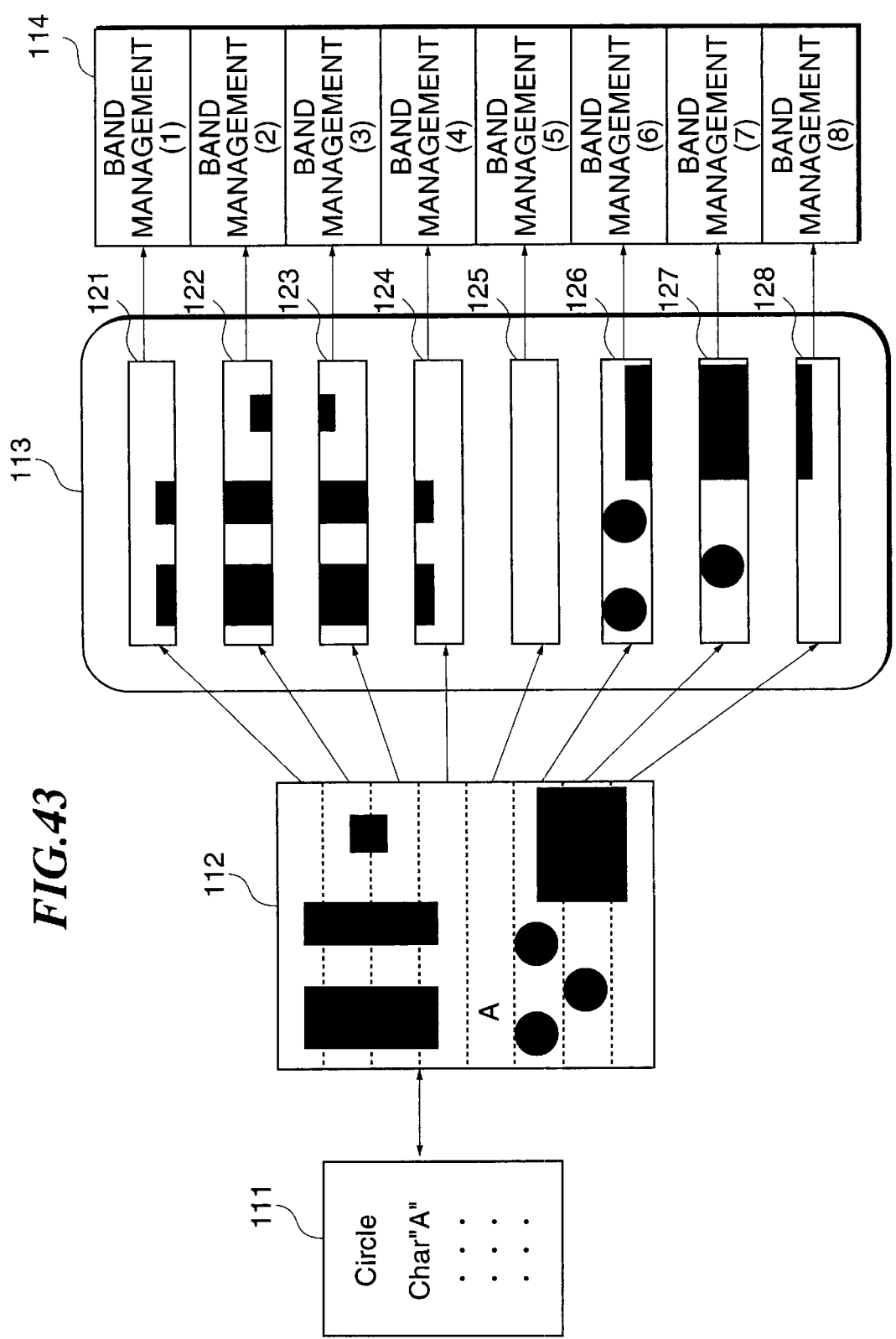
FIG. 43 is an explanatory view illustrating a concrete example of recording processing using a band buffer having a size of one eighth of,one page.
Figure 44:
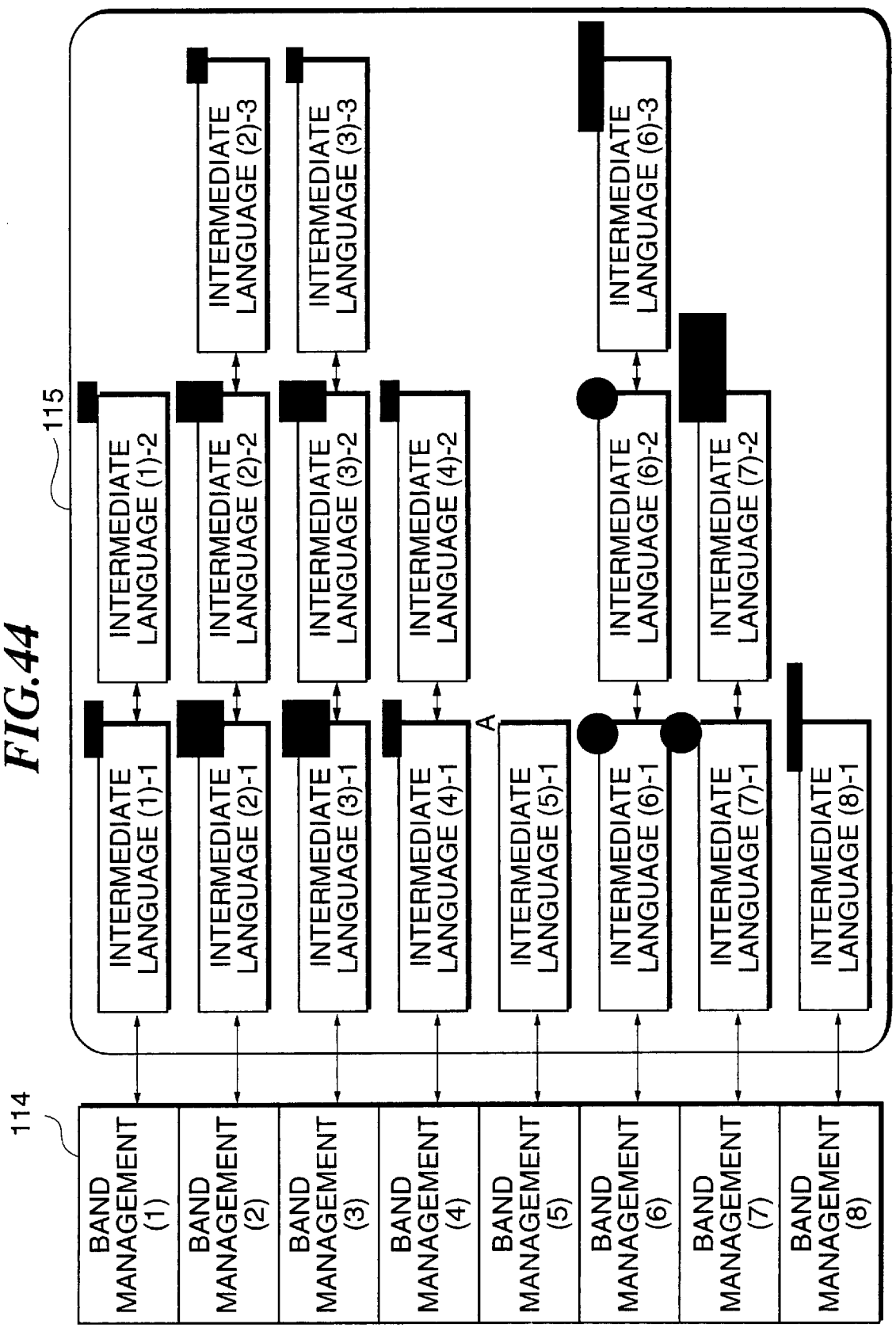
FIG. 44 is an explanatory view illustrating relationship between a band management unit and an intermediate language for each band to be controlled when a band buffer having size of one eighth of one page is used.

In the following description in this first embodiment, the example shown in FIGS. 43 and 44 is used as a concrete example. In the FIGS. 43 and 44, when the PDL 111, which is a language for rendering, is printed, it is assumed that output corresponding to the image 112 is performed. The same intermediate language as when the image 112 is divided into eight is generated from the PDL 111. Band data 121 is represented by an intermediate language (1) -1 and an intermediate language (1) -2 as shown in FIG. 44, and is managed as data belonging to band management (1). In a similar way hereinafter, band data 122 is represented by an intermediate language (2) -1, an intermediate language (2) -2, an intermediate language (2) -3, and is managed as data belonging to band management (2). Band data 123 is represented by an intermediate language (3) -1, an intermediate language (3) -2 and an intermediate language (3) -3, and is managed as data belonging to band management (3). Band data 124 is represented by an intermediate language (4) -1 and an intermediate language (4) -2, and is managed as data belonging to band management (4). Band data 125 is represented by an intermediate language (5) -1, and is managed as data belonging to band management (5). Band data 126 is represented by an intermediate language (6) -1, an intermediate language (6) -2 and an intermediate language (6) -3, and is managed as data belonging to band management (6). Band data 127 is represented by an intermediate language (7) -1 and an intermediate language (7) -2, and is managed as data belonging to band management (7). Band data 128 is represented by an intermediate language (8) -1, and is managed as data belonging to band management(8). A collection of band management (1) to band management (8) is called a band management unit 114, and the intermediate language (1) -1 to the intermediate language (8) -1 are called an intermediate language group 115.

Figure 2:
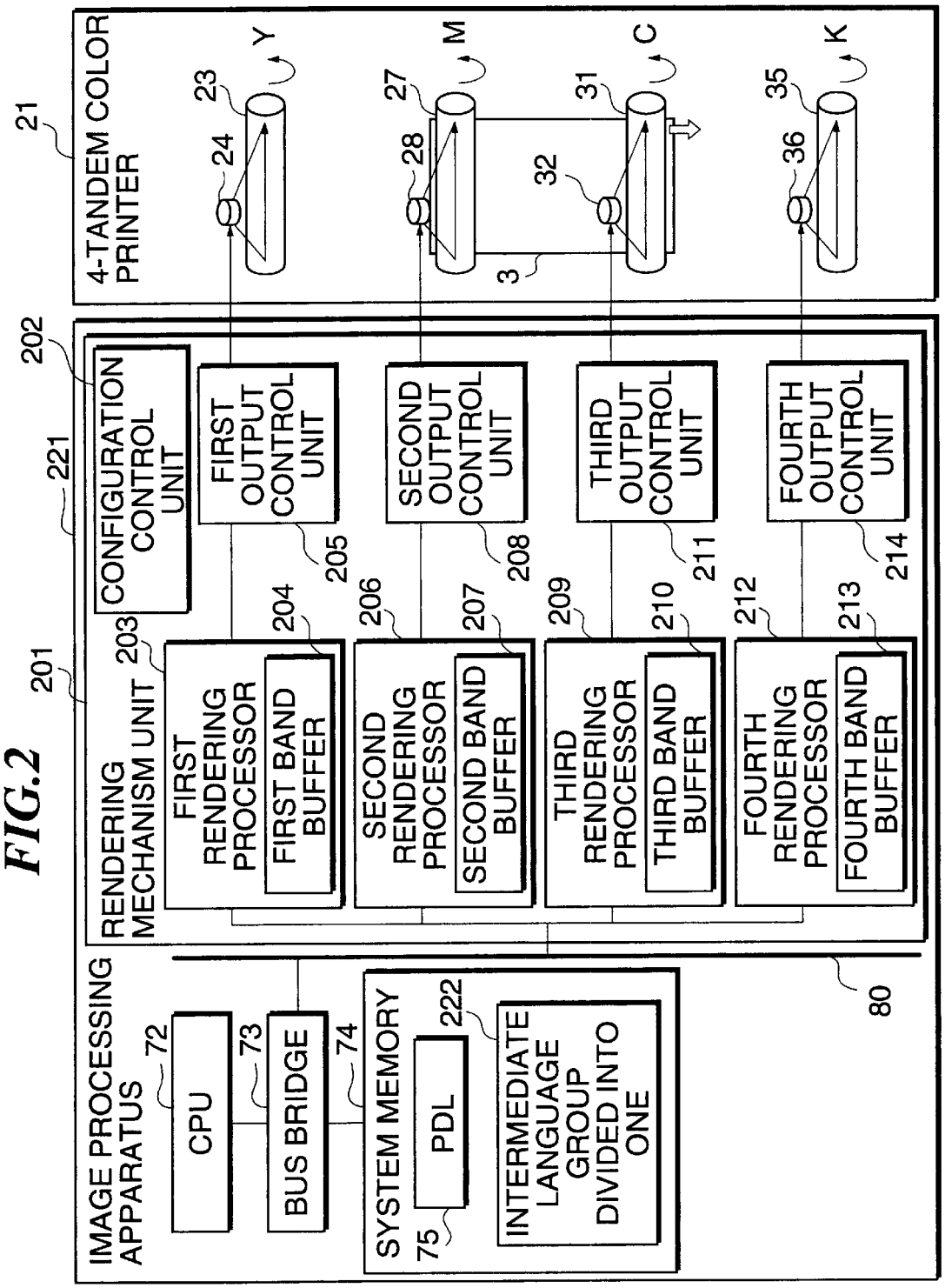
FIG. 2 is a block diagram showing a structural example when a 4-tandem color printer is connected as an output device in the first embodiment of an image processing apparatus according to the present invention.
Figure 3:
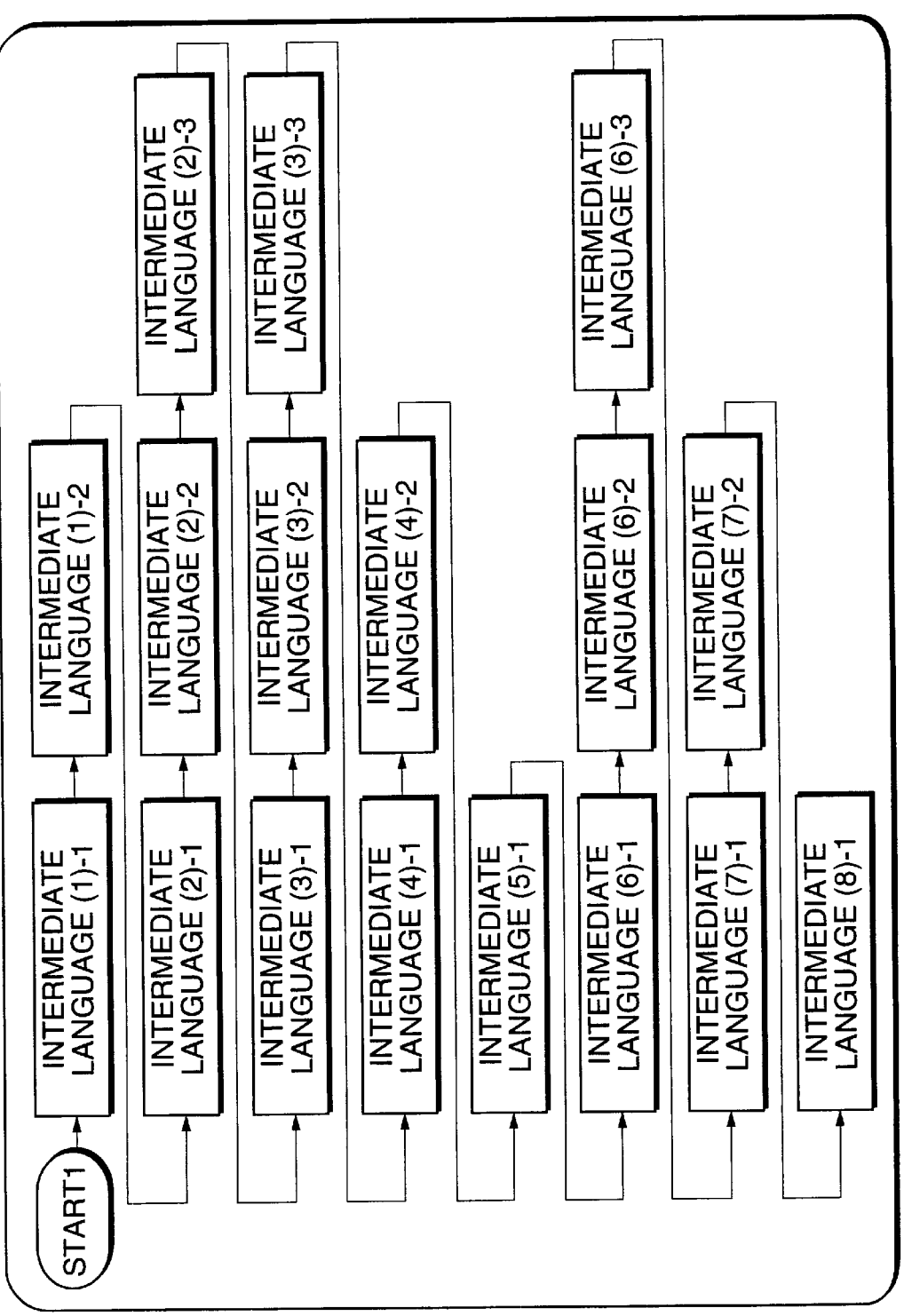
FIG. 3 is an explanatory view illustrating an example of intermediate language group divided into one when a 4-tandem color printer is connected as an output device in the first embodiment of an image processing apparatus according to the present invention.
Figure 33:
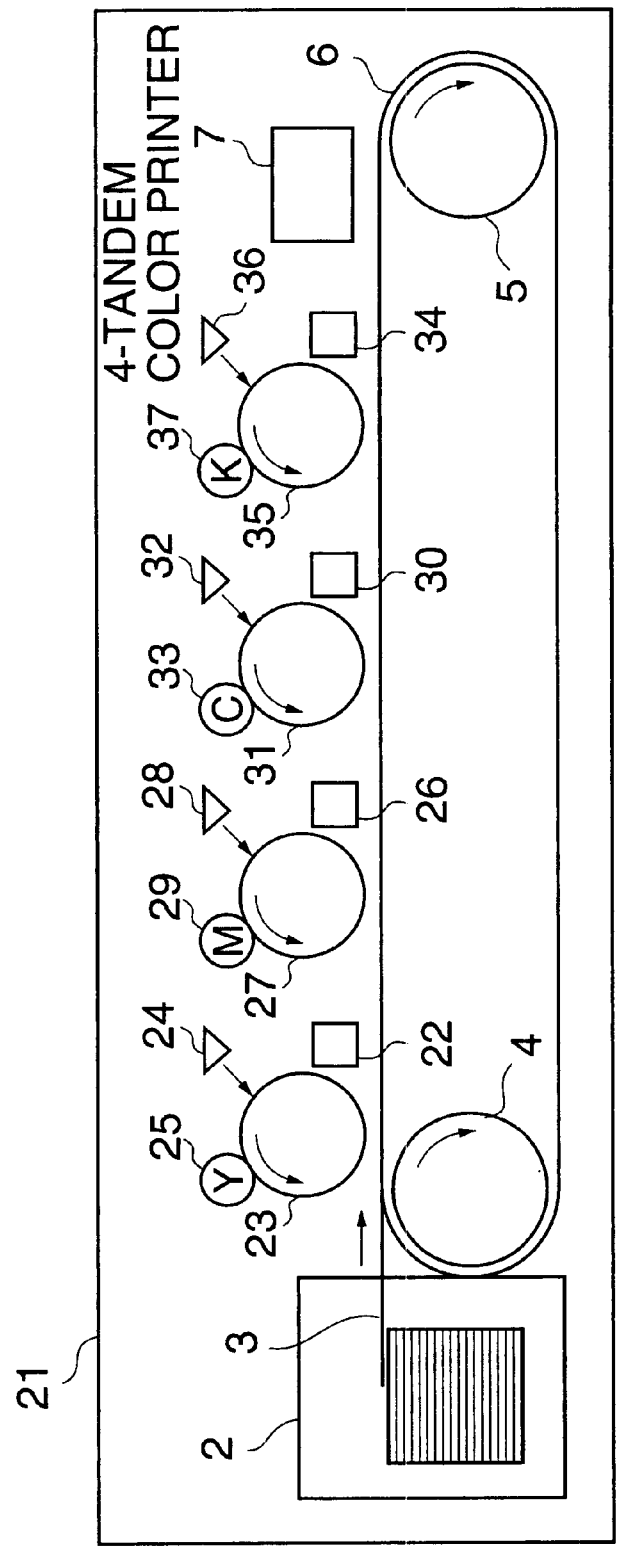
FIG. 33 is an explanatory view illustrating a basic mechanism of the 4-tandem color printer.
Figure 34:
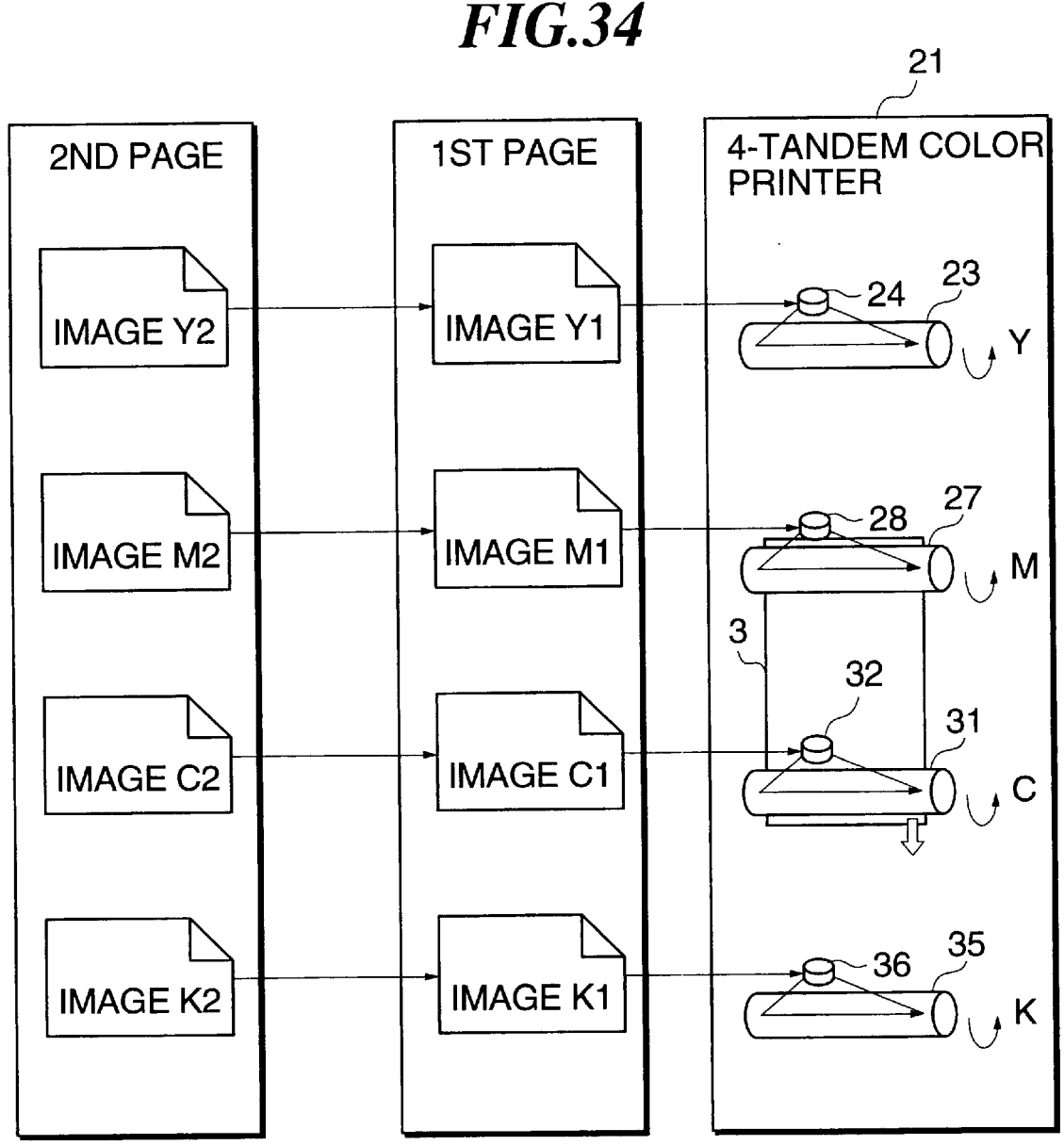
FIG. 34 is an explanatory view illustrating an example of a method of transmitting image data to the 4-tandem color printer.
Figure 41:
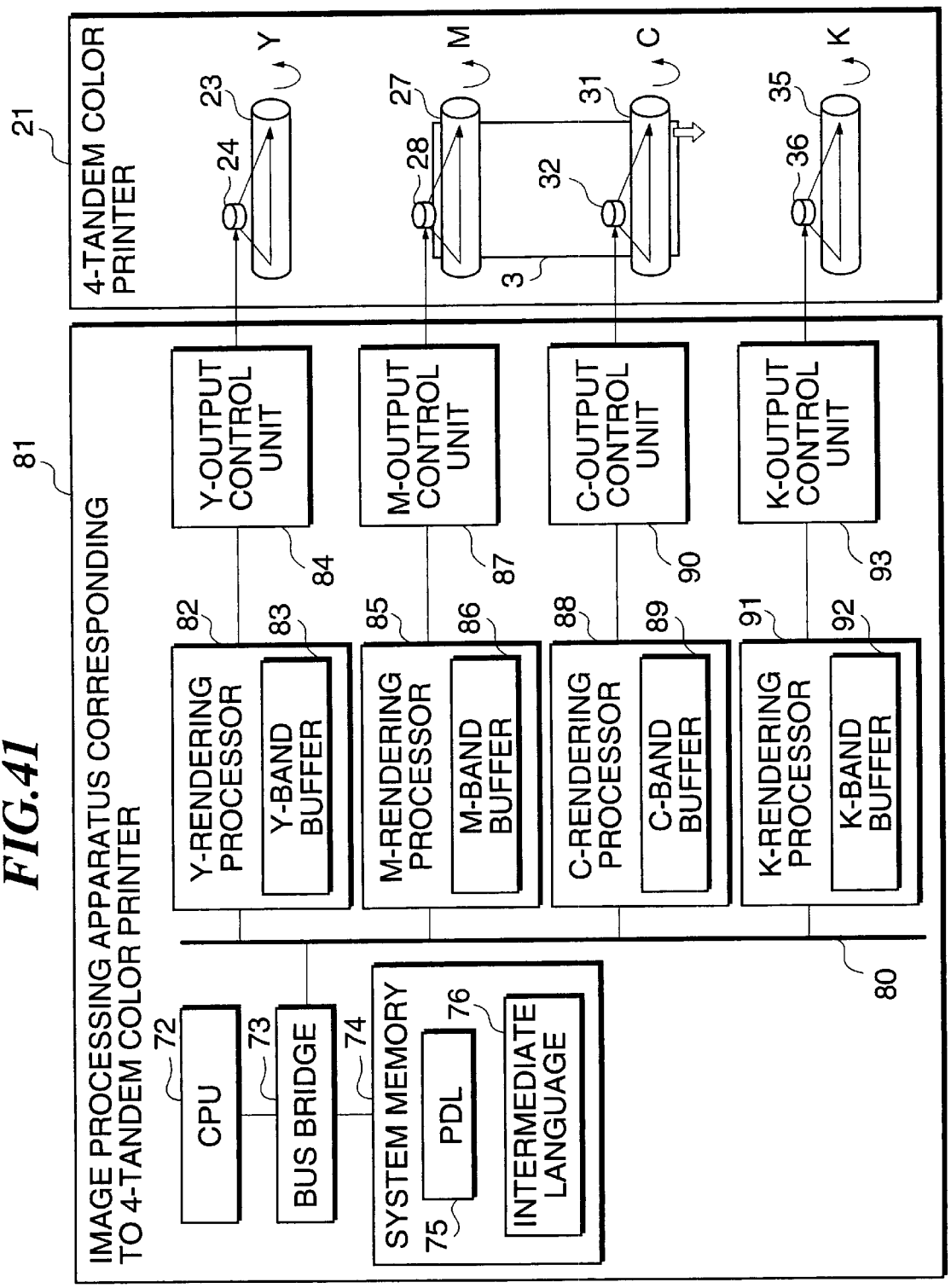
FIG. 41 is a block diagram showing an example of an image processing apparatus corresponding to a 4-tandem color printer.

FIG. 2 is a block diagram showing a structural example when a 4-tandem color printer is connected as an output device in the first embodiment of the image processing apparatus according to the present invention. FIG. 3 is likewise an explanatory view illustrating an example of an intermediate language group divided into one. In FIGS. 2 and 3, components equivalent to those in FIGS. 33 and 41 are represented by the same reference numbers, and a description thereof will be omitted. A reference numeral 221 designates an image processing apparatus; and 222, an intermediate language group divided into one. This shows an example in which such a 4-tandem color printer 21 as shown in FIG. 33 is connected as an output device 216. In this respect, in this example, the function of the processing order control unit 215 is implemented by the CPU 72.

In a case where the output device 216 is a 4-tandem color printer 21, the configuration control unit 202 performs the following setting and control. The first rendering processor 203 generates Y-colorbit map data from the intermediate language within the intermediate language group 222 divided into one to render on the first band buffer 204, and then outputs it to the 4-tandem color printer 21 as Y-color bit map data under the control of the first output control unit 205. The second rendering processor 206 generates M-color bit map data from the intermediate language within the intermediate language group 222 divided into one to render on the second band buffer 207, and then outputs it to the 4-tandem color printer 21 as M-color bit map data under the control of the second output control unit 208. The third rendering processor 209 generates C-color bit map data from the intermediate language within the intermediate language group 222 divided into one to render on the third band buffer 210, and then outputs it to the 4-tandem color printer 21 as C-color bit map data under the control of the third output control unit 211. The fourth rendering processor 212 generates K-color bit map data from the intermediate language within the intermediate language group 222 divided into one to render on the fourth band buffer 213, and then outputs it to the 4-tandem color printer 21 as K-color bit map data under the control of the fourth output control unit 214.

Also, the intermediate language group 115 as shown in FIG. 44, generated from the PDL 75 by the CPU 72 is separated from the band management unit 114, and an intermediate language group 222 divided into one as shown in FIG. 3 having new connecting relationship is synthesized in accordance with the setting of the configuration control unit 202. The intermediate language group 222 divided into one is obtained by sequentially connecting together the intermediate languages from the band management (1) to the band management (8) with the head address of the intermediate language (1) -1 as "Start 1", which are connected in the order of an intermediate language (1) -1, an intermediate language (1) -2, an intermediate language (2) -1, an intermediate language (2) -2, an intermediate language (2) -3, an intermediate language (3) -1, an intermediate language (3) -2, an intermediate language (3) -3, an intermediate language (4) -1, an intermediate language (4) -2, an intermediate diate language (5) -1, an intermediate language (6) -1, an intermediate language (6) -2, an intermediate language (6) -3, an intermediate language (7) -1, an intermediate language (7) -2, and an intermediate language (8) -1. In this respect, this intermediate language group 222 divided into one is retained within the system memory 74 in the image processing apparatus 221.

Before issuing an instruction to start printing to the 4-tandem color printer 21, the image processing apparatus 221 sets the "Start 1" address of the intermediate language group 222 divided into one in the first rendering processor 203, the second rendering processor 206, the third rendering processor 209 and the fourth rendering processor 212 to issue an instruction to start rendering. The first rendering processor 203, the second rendering processor 206, the third rendering processor 209 and the fourth rendering processor 212 access the intermediate language group 222 divided into one within the system memory 74 by the use of, for example, DMA or the like for starting rendering.

When Y-color bit map data is generated within the first band buffer 204 by the first rendering processor 203, the image processing apparatus 221 issues an instruction to start printing to the 4-tandem color printer 21, and the first output control unit 205 starts outputting Y-color bit map data to the 4-tandem color printer 21. The first rendering processor 203 renders the next band while outputting bit map data to the 4-tandem color printer 21 through the first output control unit 205, and generates bit map data. By the use of the first band buffer 204 divided into two, the first rendering processor 203 renders all the bands by the generation and output of the bit map to complete the output of the Y-color bit map data.

The second rendering processor 206 also accesses the intermediate language group 222 divided into one by the use of, for example, DMA or the like to render the M-color bit map data on the second band buffer 207. On the receipt of a request from the 4-tandem color printer 21 to transmit the M-color bit map data, the second output control unit 208 starts outputting the M-color bit map data. The second rendering processor 206 renders the next band while outputting M-color bit map data to the 4-tandem color printer 21 through the second output control unit 208, and generates bit map data. By the use of the second band buffer 207 divided into two, the second rendering processor 206 renders all the bands by the generation and output of the bit map to complete the output of the M-color bit map data.

The third rendering processor 209 also accesses the intermediate language group 222 divided into one by the use of, for example, DMA or the like to render C-color bit map data on the third band buffer 210. On the receipt of a request from the 4-tandem color printer 21 to transmit the C-color bit map data, the third output control unit 211 starts outputting the C-color bit map data. The third rendering processor 209 renders the next band while outputting C-color bit map data to the 4-tandem color printer 21 through the third output control unit 211, and generates bit map data. By the use of the third band buffer 210 divided into two, the third rendering processor 209 renders all the bands by the generation and output of the bit map to complete the output of the C-color bit map data.

The fourth rendering processor 212 also accesses the intermediate language group 222 divided into one by the use of, for example, DMA or the like to render K-color bit map data on the fourth band buffer 213. On the receipt of a request from the 4-tandem color printer 21 to transmit the K-color bit map data, the fourth output control unit 214 starts outputting the K-color bit map data. The fourth rendering processor 212 renders the next band while outputting K-color bit map data to the 4-tandem color printer 21 through the fourth output control unit 214, and generates bit map data. By the use of the fourth band buffer 213 divided into two, the fourth rendering processor 212 renders all the bands by the generation and output of the bit map to complete the output of the K-color bit map data.

Figure 4:
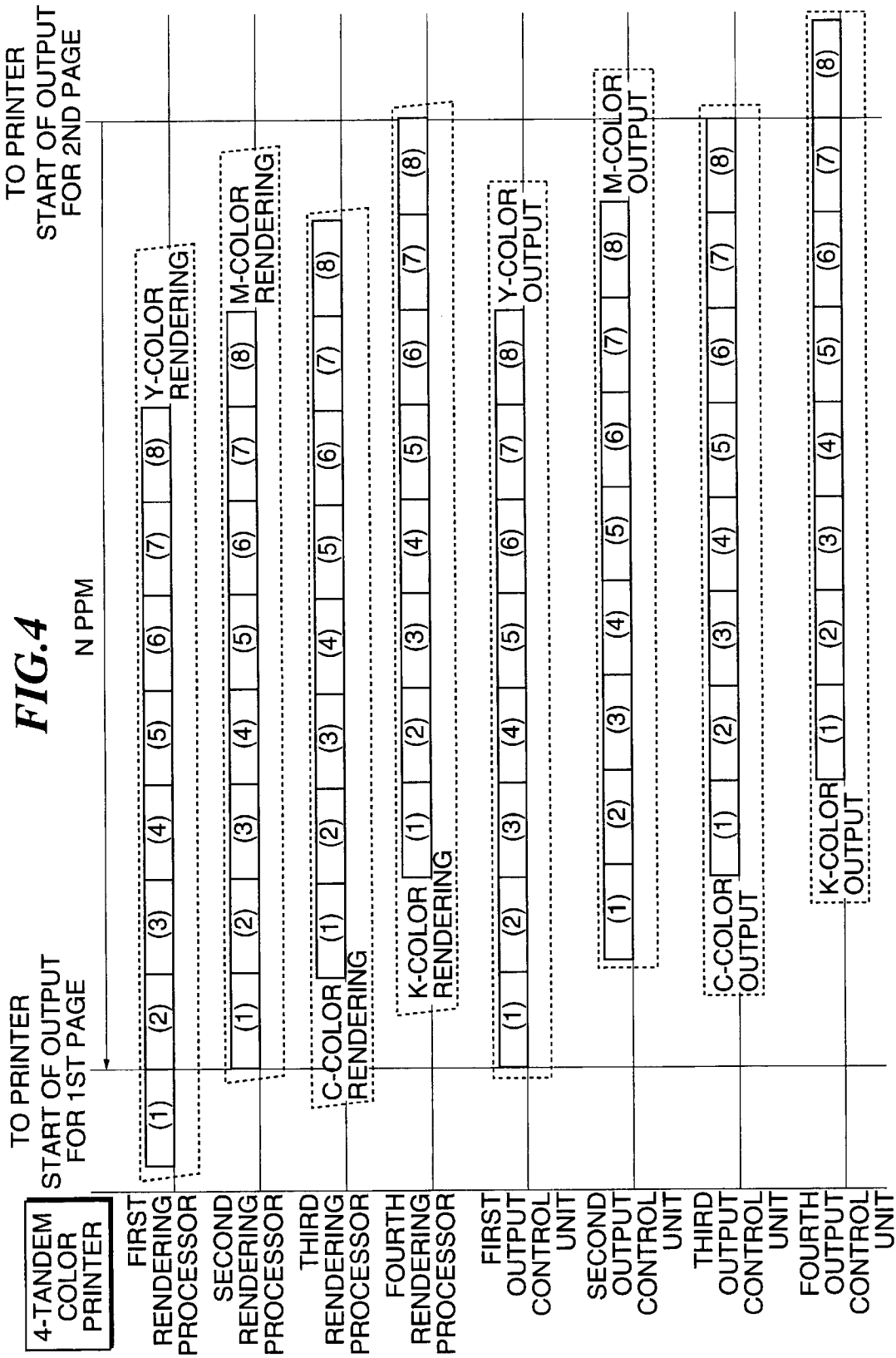
FIG. 4 is a timing chart showing an example of each rendering processor and data output in the case of outputting to a 4-tandem color printer in the first embodiment of an image processing apparatus according to the present invention.
Figure 35:
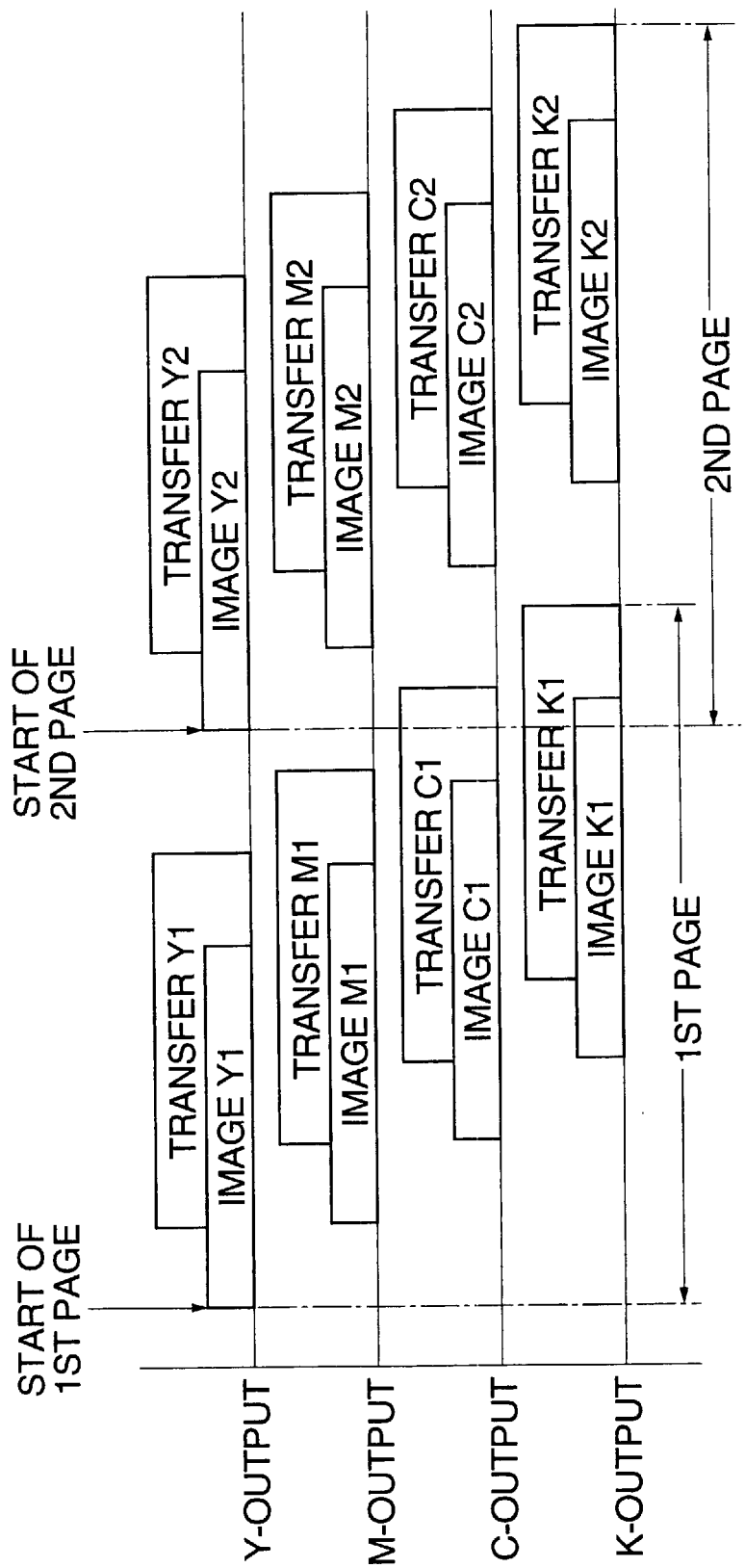
FIG. 35 is an explanatory view illustrating an example of timing in transmitting and transferring image data to the 4-tandem color printer.

The above processing completes printing of one page. In this respect, output timings of the above Y-output, M-output, C-output and K-output are as shown in, for example, FIG. 35. FIG. 4 is a timing chart showing an example of each rendering processor and data output in the case of outputting to a 4-tandem color printer in the first embodiment of an image processing apparatus according to the present invention. Here, in a case where printing is performed at a speed of NPPM as in the case of FIGS. 45 to 47, there are shown timings, at which rendering is performed in the first rendering processor 203, the second rendering processor 206, the third rendering processor 209 and the fourth rendering processor 212, and timings of Y-color output, M-color output, C-color output and K-color output to be outputted from the first output control unit 205, the second output control unit 208, the third output control unit 211 and the fourth output control unit 214 respectively during printing. The processing can be performed at the substantially same timing as in FIG. 46.

Figure 5:
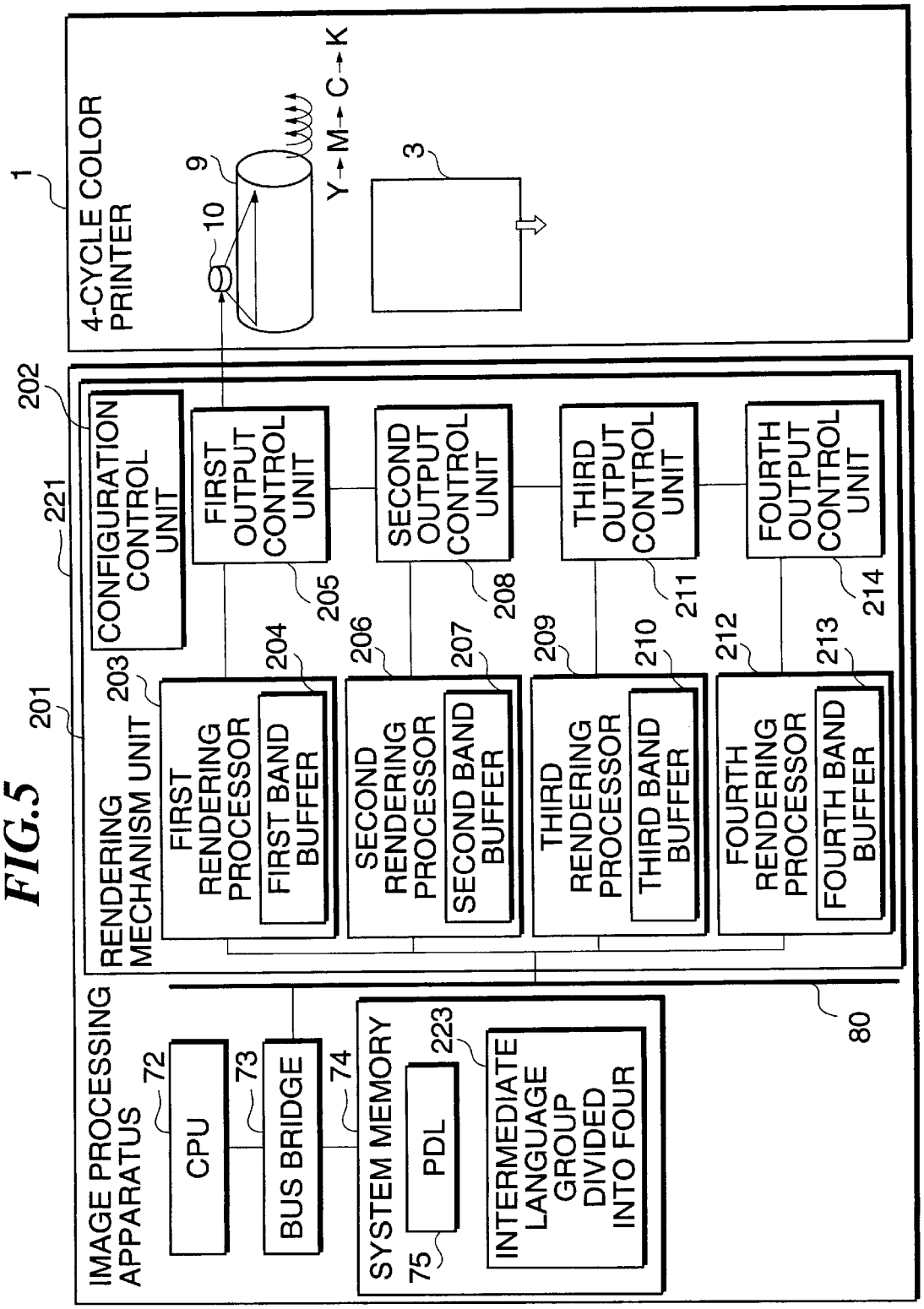
FIG. 5 is a block diagram showing a structural example when a 4-cycle color printer is connected as an output device in the first embodiment of an image processing apparatus according to the present invention.
Figure 6:
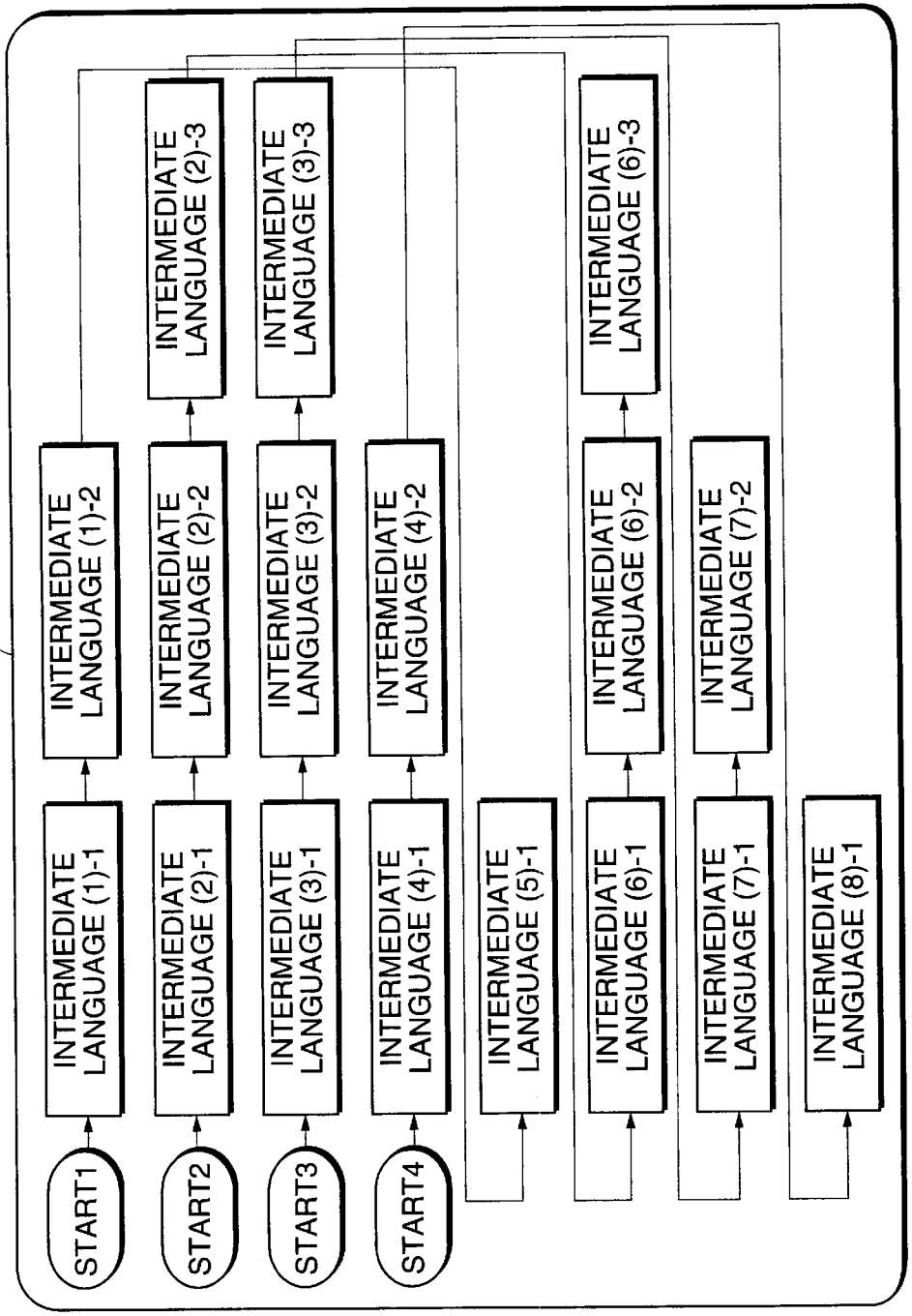
FIG. 6 is an explanatory view illustrating an example of an intermediate language group divided into four when a 4-cycle color printer is connected as an output device in the first embodiment of an image processing apparatus according to the present invention.
Figure 29:
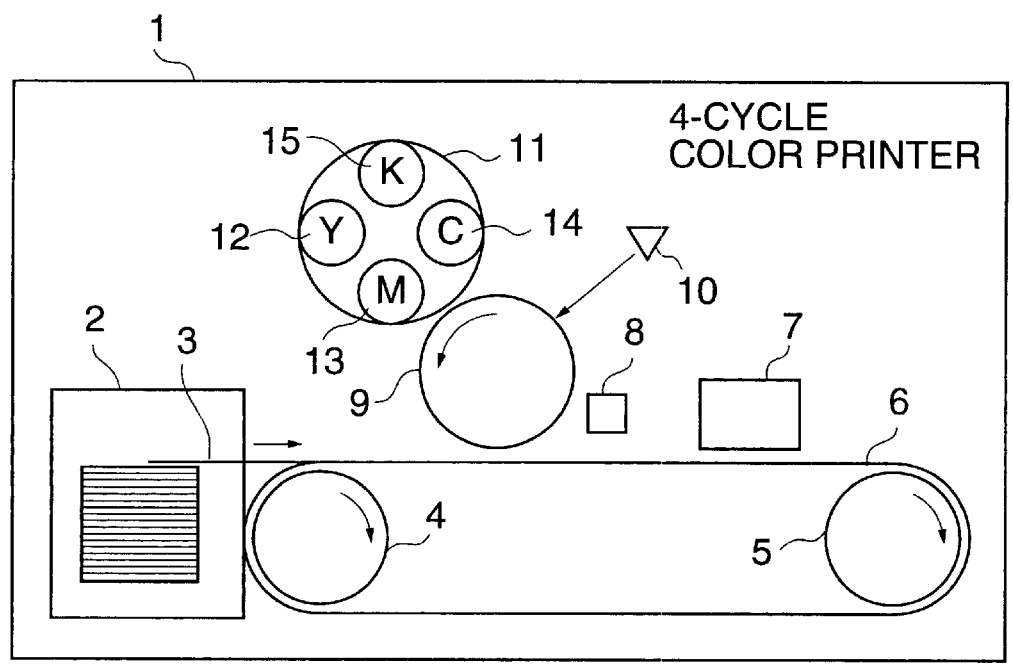
FIG. 29 is an explanatory view illustrating a basic mechanism of the 4-cycle color printer.
Figure 30:
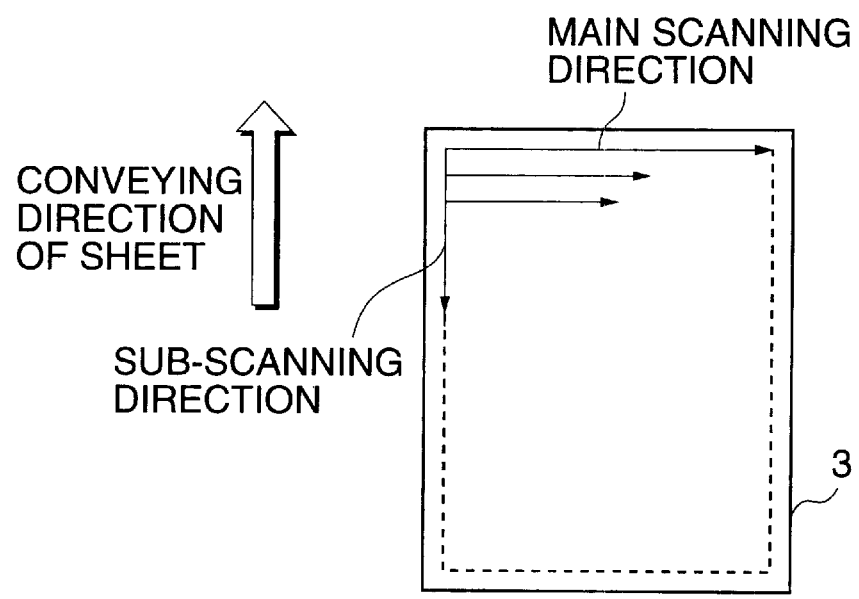
FIG. 30 is an explanatory view illustrating a conveying direction of a sheet, a main scanning direction and a sub-scanning direction.
Figure 31:
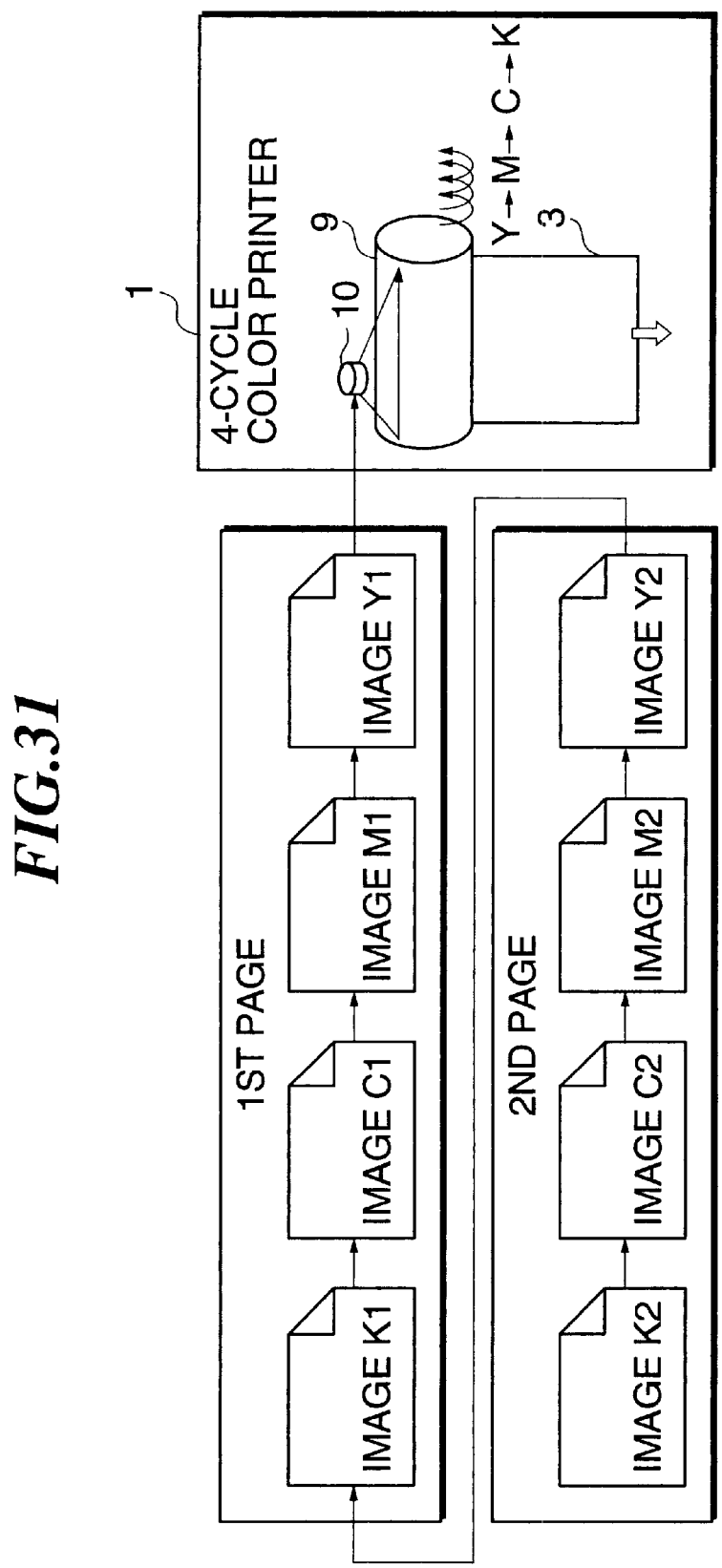
FIG. 31 is an explanatory view illustrating an example of a method of transmitting image data onto the 4-cycle color printer.
Figure 40:
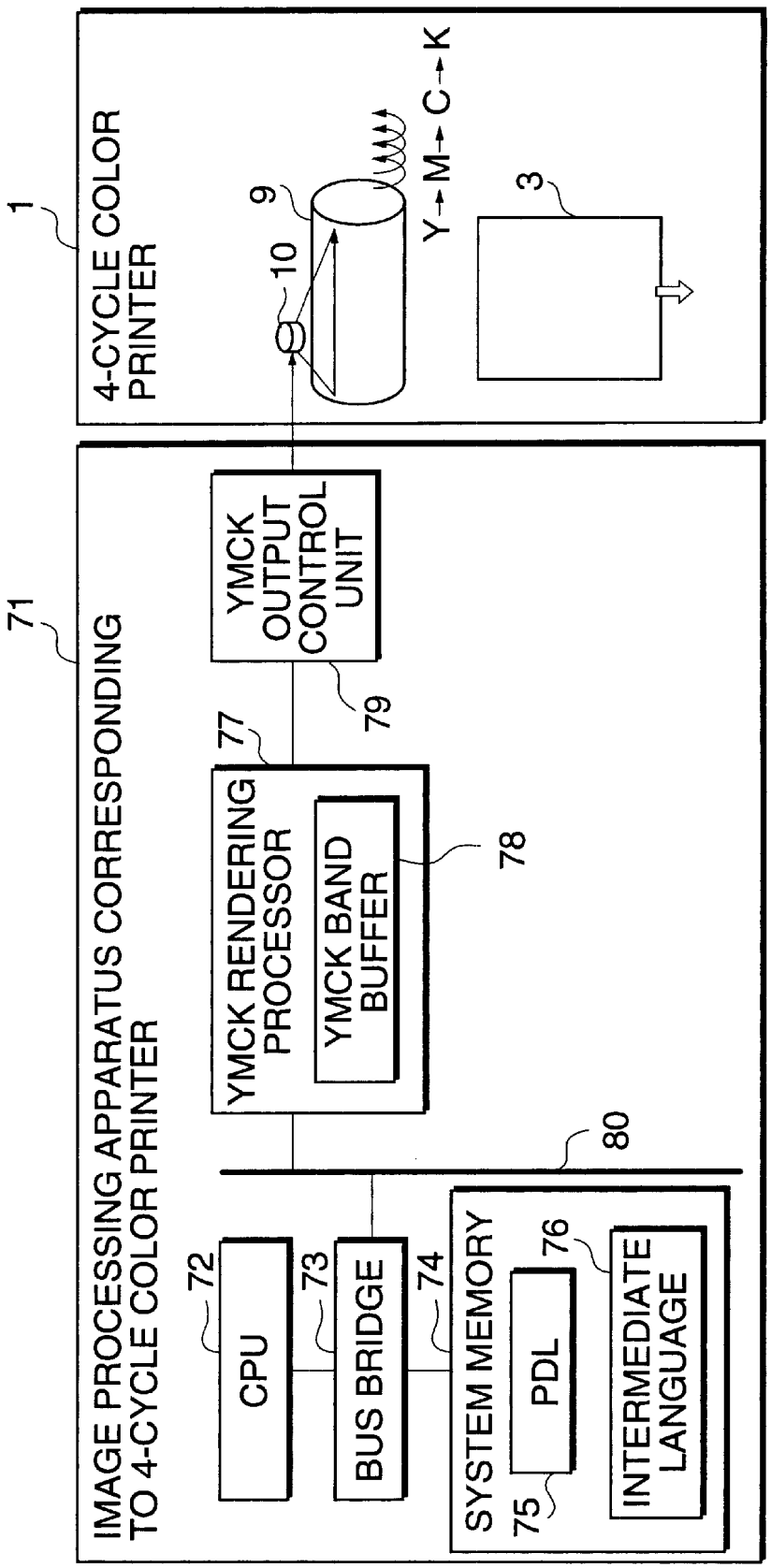
FIG. 40 is a block diagram showing an example of an image processing apparatus corresponding to a 4-cycle color printer.

FIG. 5 is a block diagram showing a structural example when a 4-cycle color printer is connected as an output device in the first embodiment of an image processing apparatus according to the present invention, and FIG. 6 is likewise an explanatory view illustrating an example of an intermediate language group divided into four. In FIGS. 5 and 6, components equivalent to those in FIGS. 2, 29 and 40 are represented by the same reference numbers, and a description thereof will be omitted. A reference numeral 223 designates an intermediate language group divided into four. This shows an example in which such a 4-cycle color printer 1 as shown in FIG. 29 is connected as an output device 216. In this respect, in this example, the function of the processing order control unit 215 is implemented by the CPU 72.

In a case where the output device 216 is a 4-cycle color printer 1, the configuration control unit 202 performs the following setting and control. The first rendering processor 203 sequentially generates bit map data of Y-color, M-color, C-color and K-color from the intermediate languages to render on the first band buffer 204. Also, the second rendering processor 206 generates bit map data of Y-color, M-color, C-color and K-color from the intermediate languages to render on the second band buffer 207. The third rendering processor 209 generates bit map data of Y-color, M-color, C-color and K-color from the intermediate languages to render on the third band buffer 210. The fourth rendering processor 212 generates bit map data of Y-color, M-color, C-color and K-color from the intermediate languages to render on the fourth band buffer 213.

When bit map data to be outputted to the 4-cycle color printer 1 is the band management unit (1) or the band management unit (5), the first output control unit 205 reads out the bit map data from the first band buffer 204 to output to the 4-cycle color printer 1. Also, when the bit map data to be outputted to the 4-cycle color printer 1 is the band management unit (2) or the band management unit (6), the second output control unit 208 reads out the bit map data from the second band buffer 207, and transmits it to the first output control unit 205 to output to the 4-cycle color printer 1. When the bit map data to be outputted to the 4-cycle color printer 1 is the band management unit (3) or the band management unit (7), the third output control unit 211 reads out the bit map data from the third band buffer 210, and transmits it to the first output control unit 205 through the second output control unit 208 to output to the 4-cycle color printer 1. When the bit map data to be outputted to the 4-cycle color printer 1 is the band management unit (4) or the band management unit (8), the fourth output control unit 214 reads out the bit map data from the fourth band buffer 213, and transmits it to the first output control unit 205 through the third output control unit 211 and the second output control unit 208 to output to the 4-cycle color printer 1.

Also, an intermediate language group 115 as shown in FIG. 44, generated from the PDL 75 by the CPU 72 is separated from the band management unit 114, and an intermediate language group 223 divided into four as shown in FIG. 6 having new connecting relationship is synthesized in accordance with the setting of the configuration control unit 202. Since there are provided four rendering processors, they are connected together for each remainder to be obtained when a number N (=1 to 8) of band management is divided by 4. More specifically, an intermediate language group is synthesized by sequentially connecting together intermediate languages of band management (1) and band management (5), in which the remainder when the number N of the band management is divided by 4 with the head address of an intermediate language (1) -1 as "Start 1" is 1. Also, an intermediate language group is synthesized by sequentially connecting together intermediate languages of band management (2) and band management (6), in which the remainder when the number of the band management is divided by 4 with the head address of an intermediate language (2) -1 as "Start 2" is 2. Similarly, an intermediate language group is synthesized by sequentially connecting together intermediate languages of band management (3) and band management (7), in which the remainder when the number of the band management is divided by 4 with the head address of an intermediate language (3) -1 as "Start 3" is 3. Also, an intermediate language group is synthesized by sequentially connecting together intermediate languages of band management (4) and band management (8), in which the remainder when the number of the band management is divided by 4 with the head address of an intermediate language (4) -1 as "Start 4" is 0.

Thus, from the "Start 1", the intermediate language (1) -1, intermediate language (1) -2, and intermediate language (5) -1 are connected together in this order. Also, from the "Start 2", the intermediate language (2) -1, intermediate language (2) -2, intermediate language (2) -3, intermediate language (6) -1, intermediate language (6) -2, and intermediate language (6) -3 are connected together in this order. Further, from the "Start 3", the intermediate language (3) -1, intermediate language (3) -2, intermediate language (3) -3, intermediate language (7) -1 and intermediate language (7) -2 are connected together in this order. Further, from the "Start 4", the intermediate language (4) -1, intermediate language (4) -2 and intermediate language (8) -1 are connected together in this order. The intermediate language group 223 divided into four is retained within the system memory 74 in the image processing apparatus 221.

Before issuing an instruction to start printing to the 4-cycle color printer 1, the image processing apparatus 221 sets the "Start 1" address in the first rendering processor 203, the "Start 2" address in the second rendering processor 206, the "Start 3" address in the third rendering processor 209 and the "Start 4" address in the fourth rendering processor 212 to issue an instruction to start rendering of Y-color bit map data.

The first rendering processor 203 accesses the "Start 1" address of the intermediate language group 223 divided into four within the system memory 74 by the use of, for example, DMA or the like for starting rendering of Y-color bit map data on the first band buffer 204. Also, the second rendering processor 206 accesses the "Start 2" address of the intermediate language group 223 divided into four within the system memory 74 by the use of, for example, DMA or the like for starting rendering of Y-color bit map data on the second band buffer 207. Further, the third rendering processor 209 accesses the "Start 3" address of the intermediate language group 223 divided into four within the system memory 74 by the use of, for example, DMA or the like for starting rendering of Y-color bit map data on the third band buffer 210. Further, the fourth rendering processor 212 accesses the "Start 4" address of the intermediate language group 223 divided into four within the system memory 74 by the use of, for example, DMA or the like for starting rendering of Y-color bit map data on the fourth band buffer 213.

When the Y-color bit map data is generated, the image processing apparatus 221 issues an instruction to start printing to the 4-cycle color printer 1, and the first output control unit 205 reads out the Y-color bit map data from the first band buffer 204 to start output of the Y-color bit map data to the 4-cycle color printer 1. The first rendering processor 203 renders the band (5) while outputting the data to the 4-cycle color printer 1 through the first output control unit 205, and generates the Y-color bit map data. It generates and outputs the bit map by the use of the first band buffer 204 divided into two.

When the output of the Y-color bit map data of the band (1) comes close to the end, the first output control unit 205 requests the second output control unit 208 to output the band (2). On the receipt of the request to output the band (2), the second output control unit 208 reads out the Y-color bit map data from the second band buffer 207, and transmits it to the first output control unit 205 to continuously output the Y-color bit map data to the 4-cycle color printer 1. The second rendering processor 206 renders the band (6) while outputting the bit map data to the 4-cycle color printer 1 through the second output control unit 208 and the first output control unit 205, and generates the Y-color bit map data. It generates and outputs the bit map by the use of the second band buffer 207 divided into two.

When the output of the Y-color bit map data of the band (2) comes close to the end, the first output control unit 205 requests the third output control unit 211 through the second output control unit 208 to output the band (3). On the receipt of the request to output the band (3), the third output control unit 211 reads out the Y-color bit map data from the third band buffer 210, and transmits it to the first output control unit 205 through the second output control unit 208 to continuously output the Y-color bit map data to the 4-cycle color printer 1. The third rendering processor 209 renders the band (7) while outputting the bit map data to the 4-cycle color printer 1 through the third output control unit 211, the second output control unit 208 and the first output control unit 205, and generates the Y-color bit map data. It generates and outputs the bit map by the use of the third band buffer 210 divided into two.

When the output of the Y-color bit map data of the band (3) comes close to the end, the first output control unit 205 requests the fourth output control unit 214 through the second output control unit 208 and the third output control unit 211 to output the band (4). On the receipt of the request to output the band (4), the fourth output control unit 214 reads out the Y-color bit map data from the fourth band buffer 213, and transmits it to the first output control unit 205 through the third output control unit 211 and the second output control unit 208 to continuously output the Y-color bit map data to the 4-cycle color printer 1. The fourth rendering processor 212 renders the band (8) while outputting the bit map data to the 4-cycle color printer 1 through the fourth output control unit 214, the third output control unit 211, the second output control unit 208 and the first output control unit 205, and generates the Y-color bit map data. It generates and outputs the bit map by the use of the fourth band buffer 213 divided into two.

Similarly, the band (5) is outputted from the first band =buffer 204, the band (6), from the second band buffer 207, the band (7), from the third band buffer 210, and the band (8), from the fourth band buffer 213 to complete the output of the Y-color bit map data.

Figure 32:
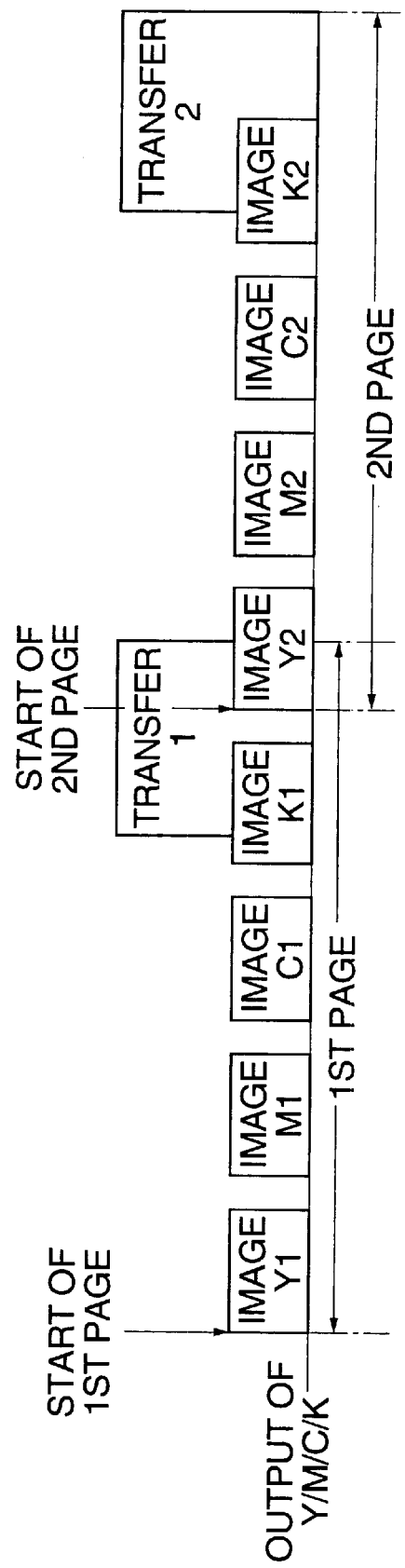
FIG. 32 is an explanatory view illustrating an example of timing in transmitting and transferring image data to the 4-cycle color printer.

Further similarly, the M-color bit map data, the C-color bit map data and the K-color bit map data are outputted to the 4-cycle color printer 1 to complete printing of the first page. In this respect, the output timing at this time is as shown in, for example, FIG. 32.

Figure 7:
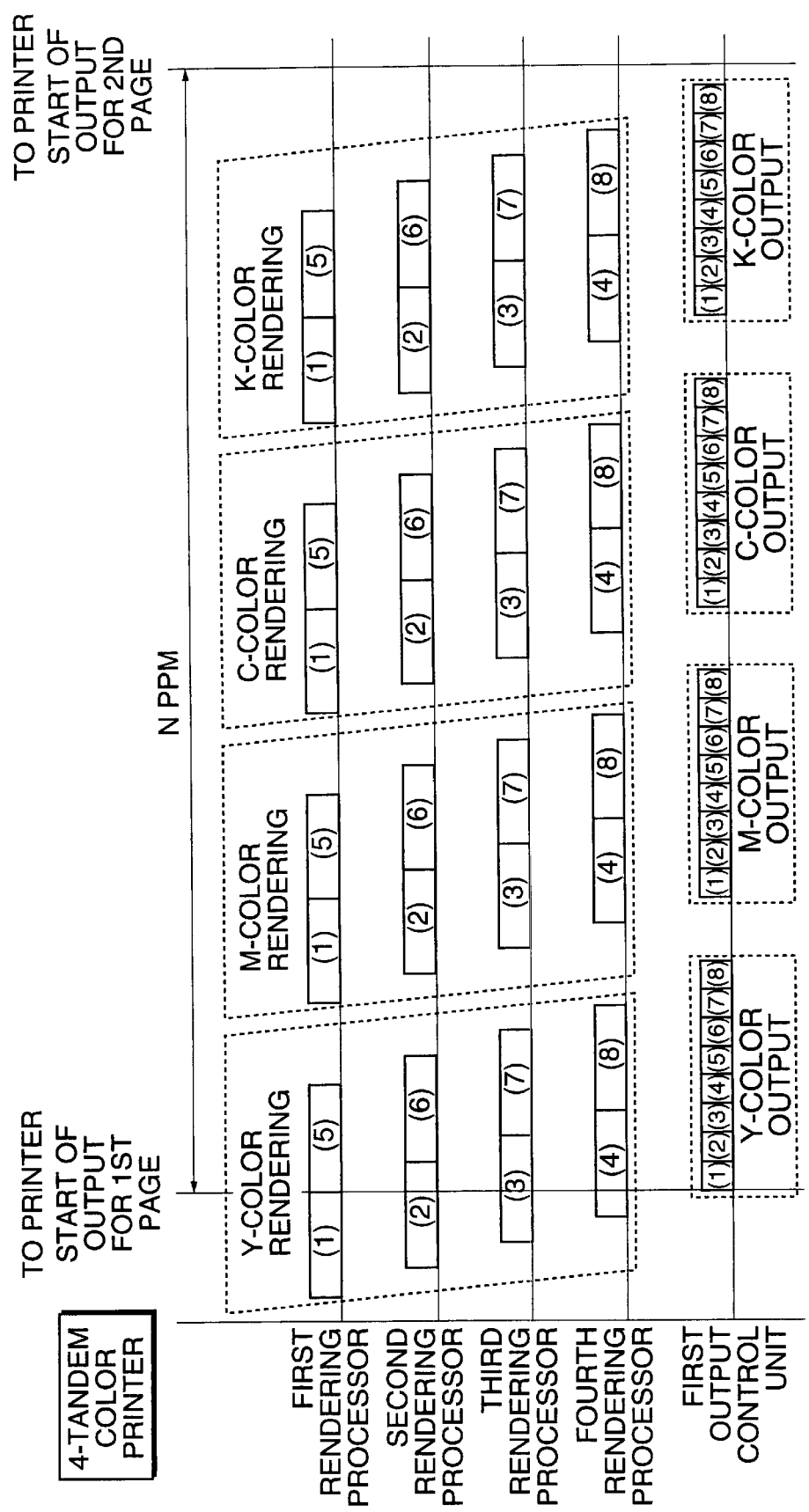
FIG. 7 is a timing chart showing an example of each rendering processor and data output in the case of outputting to a 4-cycle color printer in the first embodiment of an image processing apparatus according to the present invention.

FIG. 7 is a timing chart showing an example of each rendering processor and data output in the case of outputting to a 4-cycle color printer in the first embodiment of image processing apparatus according to the present invention. Here, in a case where printing is performed at a speed of NPPM as in the case of FIGS. 45 to 47, there are shown timing, at which rendering is performed in the first rendering processor 203, the second rendering processor 206, the third rendering processor 209 and the fourth rendering processor 212, and timings of Y-color output, M-color output, C-color output and K-color output to be outputted from the first output control unit 205 to the 4-cycle color printer 1. As can be seen from the comparison with FIG. 45, the processing time in each rendering processor can be taken approximately four times. Therefore, even if the throughput capacity of each rendering processor is low, it is possible to transmit the bit map data to the 4-cycle color printer.

Figure 8:
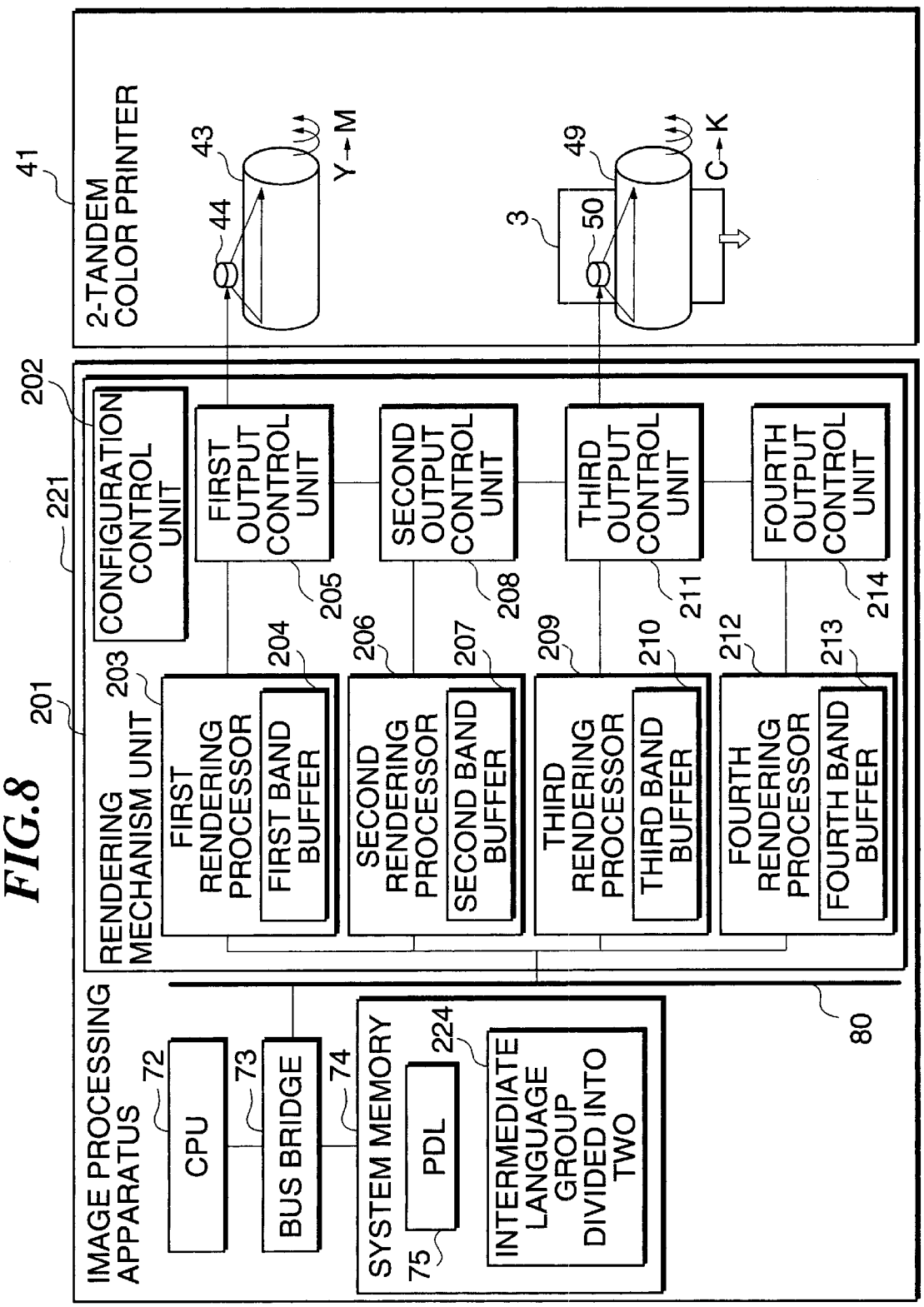
FIG. 8 is a block diagram showing a structural example when a 2-tandem color printer is connected as an output device in the first embodiment of an image processing apparatus according to the present invention.
Figure 9:
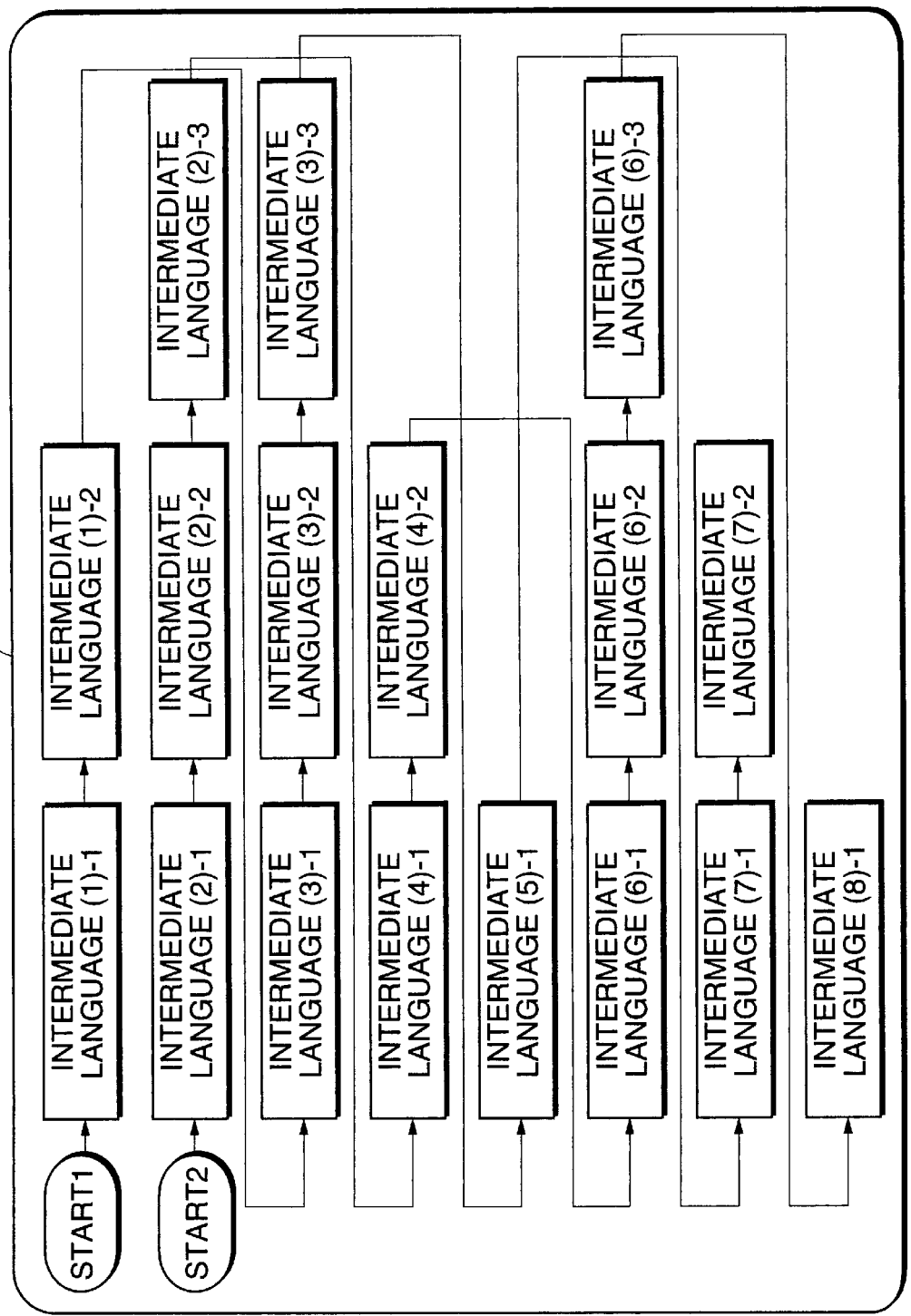
FIG. 9 is an explanatory view illustrating an example of an intermediate language group divided into two when a 2-tandem color printer is connected as an output device in the first embodiment of an image processing apparatus according to the present invention.
Figure 36:
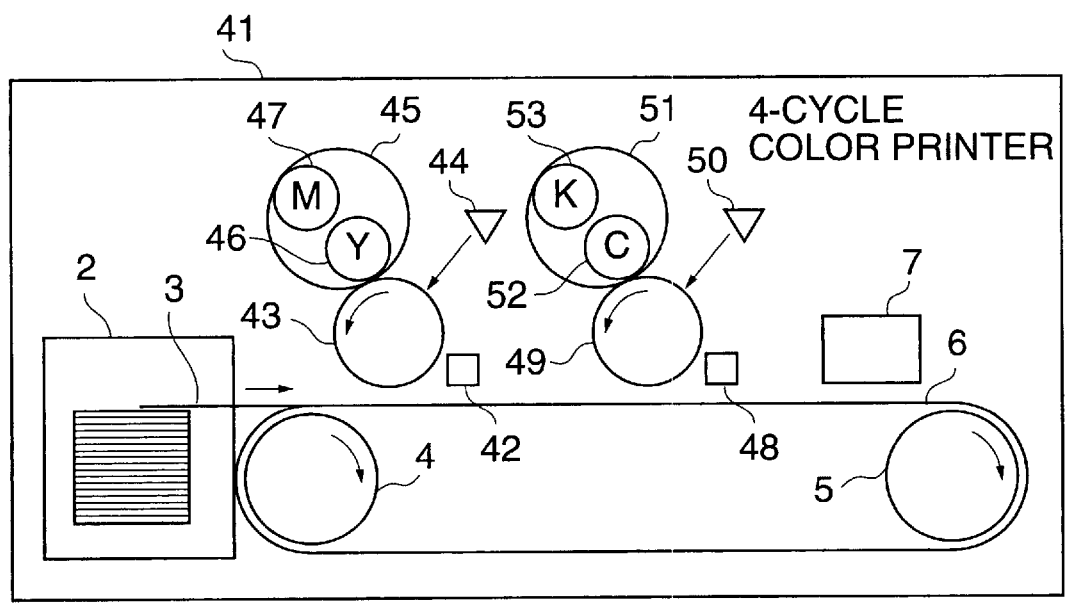
FIG. 36 is an explanatory view illustrating a basic mechanism of the 2-tandem color printer.
Figure 37:
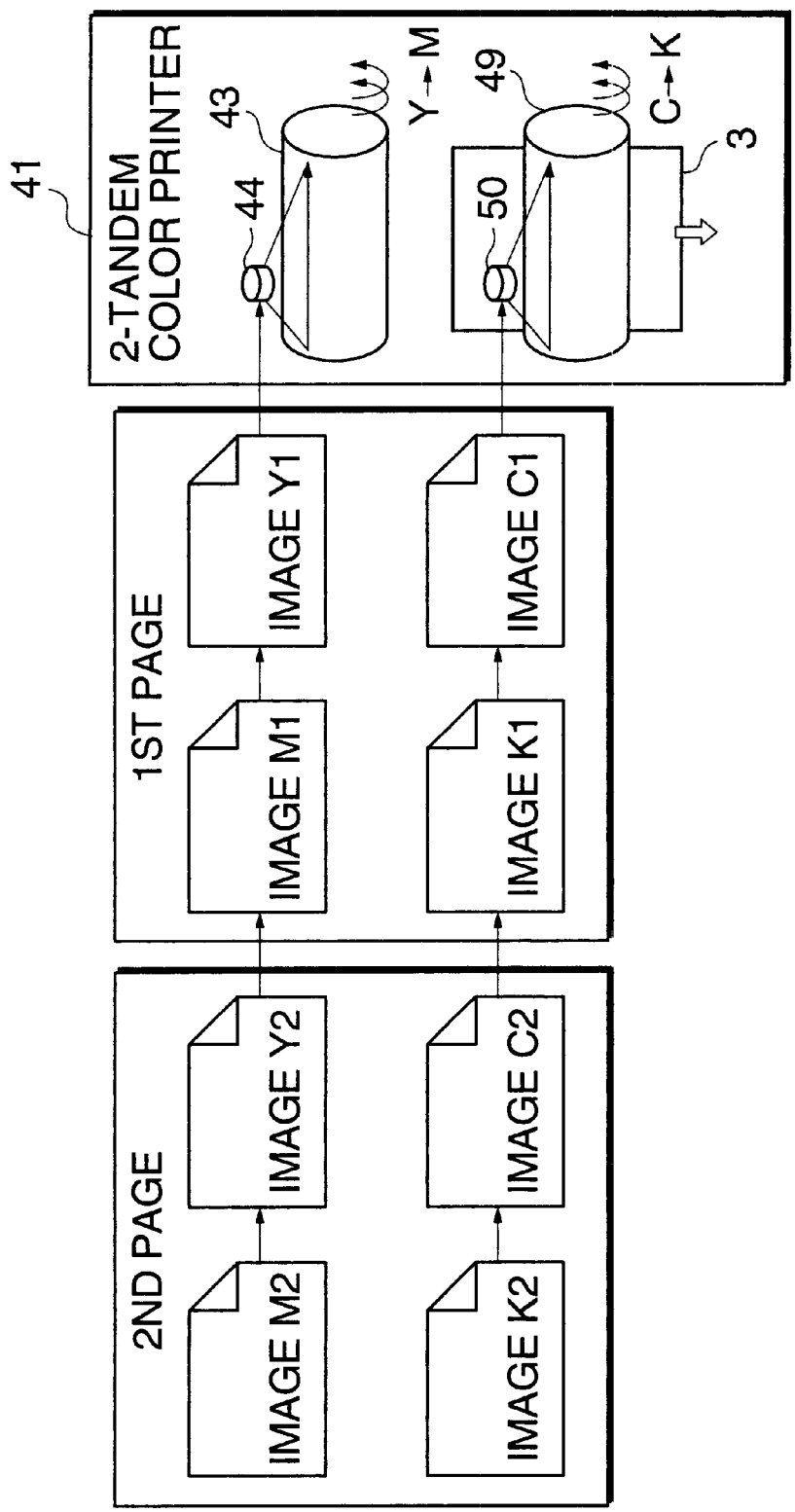
FIG. 37 is an explanatory view illustrating an example of a method of transmitting image data to the 2-tandem color printer.
Figure 42:
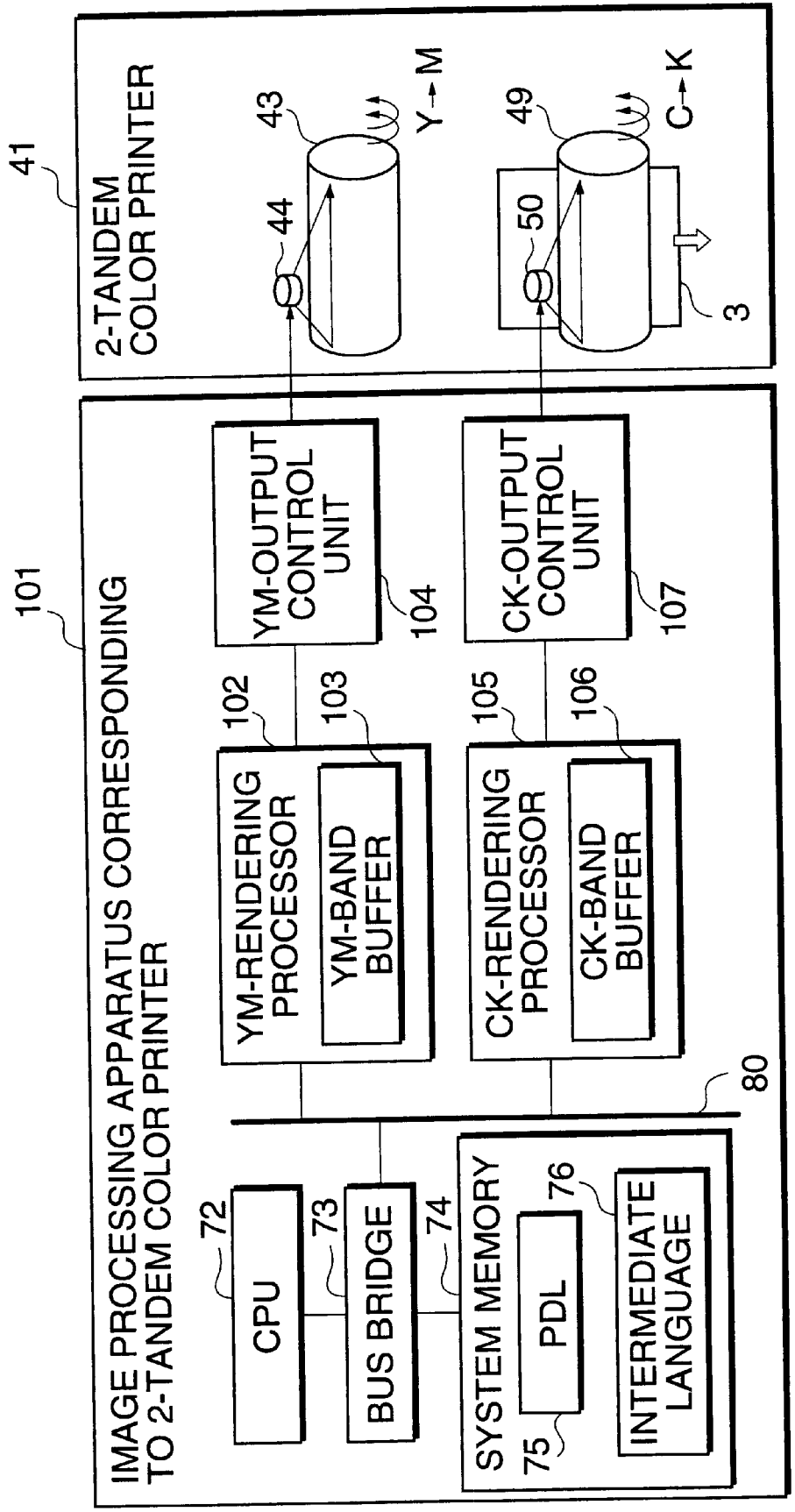
FIG. 42 is a block diagram showing an example of an image processing apparatus corresponding to a 2-tandem color printer.

FIG. 8 is a block diagram showing a structural example when a 2-tandem color printer is connected as an output device in the first embodiment of image processing apparatus according to the present invention, and FIG. 9 is likewise an explanatory view illustrating an example of an intermediate language group divided into two. In FIGS. 8 and 9, components equivalent to those in FIGS. 2, 36 and 42 are represented by the same reference numbers, and a description thereof will be omitted. A reference numeral 224 designates an intermediate language group divided into two. This shows an example in which such a 2-tandem color printer 41 as shown in FIG. 36 is connected as an output device 216. In this respect, in this example, the function of the processing order control unit 215 is also implemented by the CPU 72.

In a case where the output device 216 is a 2-tandem color printer 41, the configuration control unit 202 performs the following setting and control. The first rendering processor 203 sequentially generates bit map data of Y-color and M-color from the intermediate languages to render on the first band buffer 204. The second rendering processor 206 sequentially generates bit map data of Y-color and M-color from the intermediate languages to render on the second band buffer 207. The third rendering processor 209 sequentially generates bit map data of C-color and K-color from the intermediate languages to render on the third band buffer 210. The fourth rendering processor 212 sequentially generates bit map data of C-color and K-color from the intermediate languages to render on the fourth band buffer 213.

When bit map data of Y-color and M-color are outputted to the 2-tandem color printer 41 and bands in a band management unit (1), a band management unit (3), a band management unit (5) and a band management unit (7) are used, the first output control unit 205 reads out the bit map data from the first band buffer 204 to output to the 2-tandem color printer 41. When bit map data of Y-color and M-color are outputted to the 2-tandem color printer 41 and bands in a band management unit (2), a band management unit (4), a band management unit (6) and a band management unit (8) are used, the second output control unit 208 reads out the bit map data from the second band buffer 207, and transmits to the first output control unit 205 to output to the 2-tandem color printer 41. When bit map data of C-color and K-color are outputted to the 2-tandem color printer 41 and bands in the band management unit (1), the band management unit (3), the band management unit (5) and the band management unit (7) are used, the third output control unit 211 reads out the bit map data from the third band buffer 210 to output to the 2-tandem color printer 41. When bit map data of C-color and K-color are outputted to the 2-tandem color printer 41 and bands in the band management unit (2), the band management unit (4), the band management unit (6) and the band management unit (8) are used, the fourth output control unit 214 reads out the bit map data from the fourth band buffer 213, and transmits to the third output control unit 211 to output to the 2-tandem color printer 41.

Also, such an intermediate language group 115 as shown in FIG. 44, generated from the PDL 75 by the CPU 72 is separated from the band management unit 114, and an intermediate language group 224 divided into two as shown in FIG. 9 having new connecting relationship is synthesized in accordance with the setting of the configuration control unit 202. The intermediate languages can be connected together for each remainder to be obtained when a number N (=1 to 8) of band management is divided by, for example, 2. More specifically, an intermediate language group is synthesized by sequentially connecting together intermediate languages of a band management (1), a band management (3), a band management (5) and a band management (7), in which the remainder when the number of the band management is divided by 2 with the head address of an intermediate language (1) -1 as "Start 1" is 1. Also, an intermediate language group is synthesized by sequentially connecting together intermediate languages of a band management (2), a band management (4), a band management (6) and a band management (8), in which the remainder when the number of the band management is divided by 2 with the head address of an intermediate language (2) -1 as "Start 2" is 0. From the "Start 1", the intermediate language (1) -1, an intermediate language (1) -2, an intermediate language (3) -1, an intermediate language (3) -2, an intermediate language (3) -3, an intermediate language (5) -1, an intermediate language (7) -1, and an intermediate language (7) -2 are connected together in this order. From the "Start 2", the intermediate language (2) -1, an intermediate language (2) -2, an intermediate language (2) -3, an intermediate language (4) -1, an intermediate language (4) -2, an intermediate language (6) -1, an intermediate language (6) -2, an intermediate language (6) -3 and an intermediate language (8) -1 are connected together in this order. The intermediate language group 224 divided into two is retained within the system memory 74 in the image processing apparatus 221.

Before issuing an instruction to start printing to the 2-tandem color printer 41, the image processing apparatus 221 sets the "Start 1" address in the first rendering processor 203, and the "Start 2" address in the third rendering processor 209 to instruct to start rendering of Y-color bit map data. Further, the image processing apparatus 221 sets the "Start 1" address in the third rendering processor 209 and the "Start 2" address in the fourth rendering processor 212 to instruct to start rendering of C-color bit map data.

The first rendering processor 203 and the second rendering processor 206 access the "Start 1" and "Start 2" addresses of the intermediate language group 224 divided into two within the system memory 74 by the use of, for example, DMA or the like for starting rendering of Y-color bit map data on the first band buffer 204 and the second band buffer 207. Also, the third rendering processor 209 and the fourth rendering processor 212 access the "Start 1" and "Start 2" addresses of the intermediate language group 224 divided into two within the system memory 74 by the use of, for example, DMA or the like for starting rendering of C-color bit map data on the third band buffer 210 and the fourth band buffer 213.

When the Y-color bit map data and the C-color bit map data are generated, the image processing apparatus 221 issues an instruction to start printing to the 2-tandem color printer 41, and the first output control unit 205 reads out the Y-color bit map data from the first band buffer 204 to start output of the bit map data to the 2-tandem color printer 41. The first rendering processor 203 renders the band (3) while outputting the bit map data to the 2-tandem color printer 41 through the first output control unit 205, and generates the Y-color bit map data. It generates and outputs the bit map by the use of the first band buffer 204 divided into two. The second rendering processor 206 also accesses the "Start 2" address of the intermediate language group 224 divided into two by the use of, for example, DMA or the like for rendering the Y-color bit map data on the second band buffer 207.

When the output of the Y-color bit map data of the band (1) comes close to the end, the first output control unit 205 requests the second output control unit 208 to output the band (2). On the receipt of the request to output the band (2), the second output control unit 208 reads out the Y-color bit map data from the second band buffer 207, and transmits it to the first output control unit 205 to continuously output the bit map data to the 2-tandem color printer 41. The second rendering processor 206 renders the band (4) while outputting the bit map data to the 2-tandem color printer 41 through the second output control unit 208 and the first output control unit 205, and generates the Y-color bit map data. The second rendering a processor 206 generates and outputs the bit map by the use of the second band buffer 207 divided into two.

When the output of the Y-color bit map data of the band (2) comes close to the end, the first output control unit 205 reads out the Y-color bit map data of the band (3) from the first band buffer 204 to output to the 2-tandem color printer. Further, when the output of the Y-color bit map data of the band (3) comes close to the end, the first output control unit 205 requests the second output control unit 208 to output the band (4). The second output control unit 208 reads out the Y-color bit map data of the band (4) from the second band buffer 207 to output to the 2-tandem color printer. Similarly, the band (5), the band (6), the band (7) and the band (8) are outputted to complete the output of the Y-color bit map data. Similarly, the output of the M-color bit map data is completed.

Substantially the moment the first output control unit 205 starts to output the Y-color bit map data to the 2-tandem color printer, the third output control unit 211 reads out the C-color bit map data from the third band buffer 210 to output the bit map data to the 2-tandem color printer 41. The third rendering processor 209 renders the band (3) while outputting the bit map data to the 2-tandem color printer 41 through the third output control unit 211, and generates the C-color bit map data. It generates and outputs the bit map by the use of the third band buffer 210 divided into two. The fourth rendering processor 212 also accesses the "Start 2" address of the intermediate language group 224 divided into two by the use of, for example, DMA or the like to render the C-color bit map data on the fourth band buffer 213.

When the output of the C-color bit map data of the band (1) comes close to the end, the third output control unit 211 requests the fourth output control unit 214 to output the band (2). On the receipt of the request to output the band (2), the fourth output control unit 214 reads out the C-color bit map data from the fourth band buffer 213, and transmits it to the third output control unit 211 to continuously output the bit map data to the 2-tandem color printer 41. The fourth rendering processor 212 renders the band (4) while outputting the bit map data to the 2-tandem color printer 41 through the fourth output control unit 214 and the third output control unit 211, and generates the C-color bit map data. It generates and outputs the bit map by the use of the fourth band buffer 213 divided into two.

When the output of the C-color bit map data of the band (2) comes close to the end, the third output control unit 211 reads out the C-color bit map data of the band (3) from the third band buffer 210 to output to the 2-tandem color printer 41. Further, when the output of the C-color bit map data of the band (3) comes close to the end, the third output control unit 211 requests the fourth output control unit 214 to output the band (4), and reads out the C-color bit map data of the band (4) from the fourth band buffer 213 to output to the 2-tandem color printer 41. Similarly, the band (5), the band (6), the band (7) and the band (8) are outputted to complete the output of the C-color bit map data. Similarly, the output of the K-color bit map data is completed.

Figure 10:
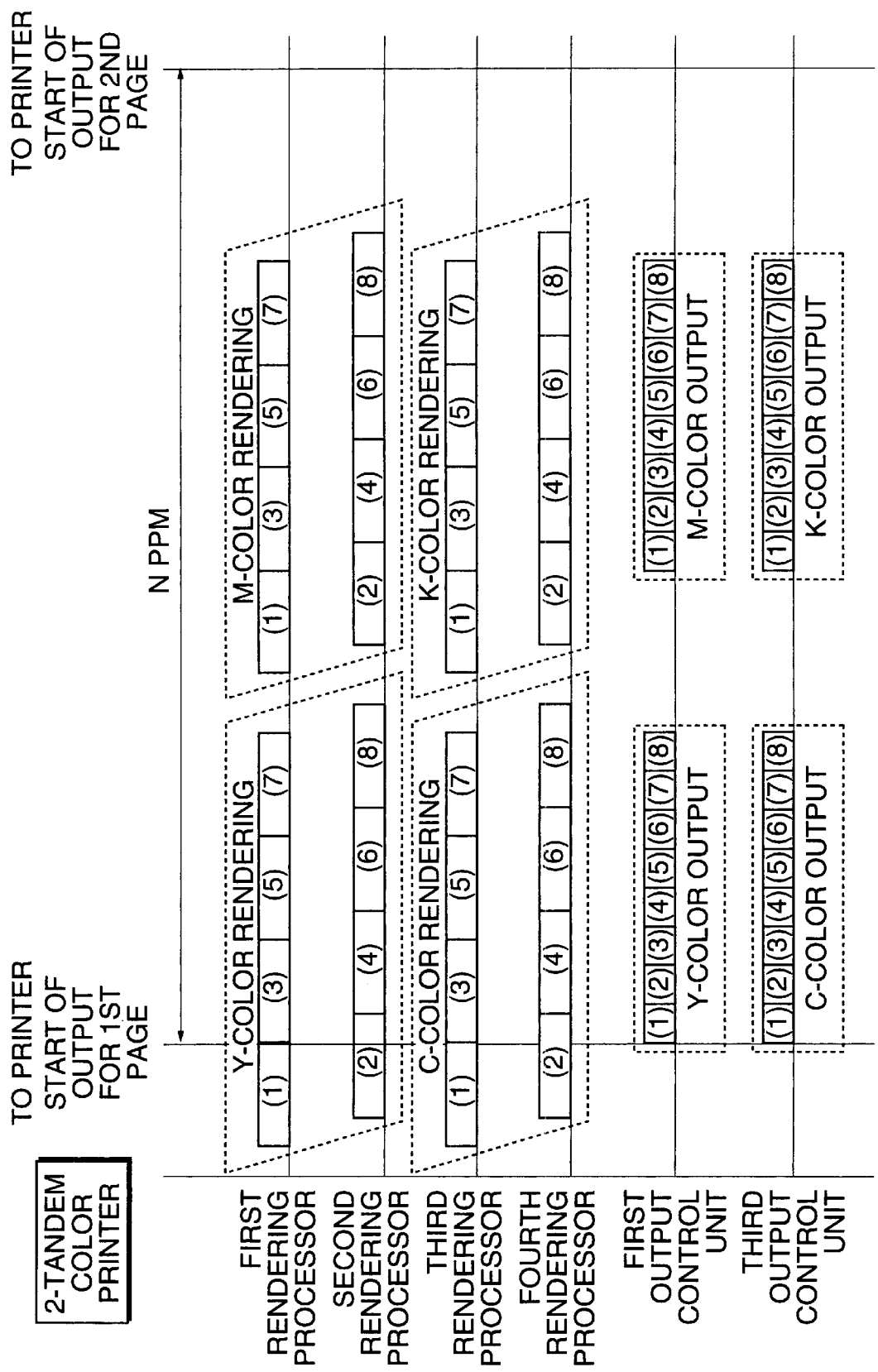
FIG. 10 is a timing chart showing an example of each rendering processor and data output in the case of outputting to a 2-tandem color printer in the first embodiment of an image processing apparatus according to the present invention.
Figure 38:
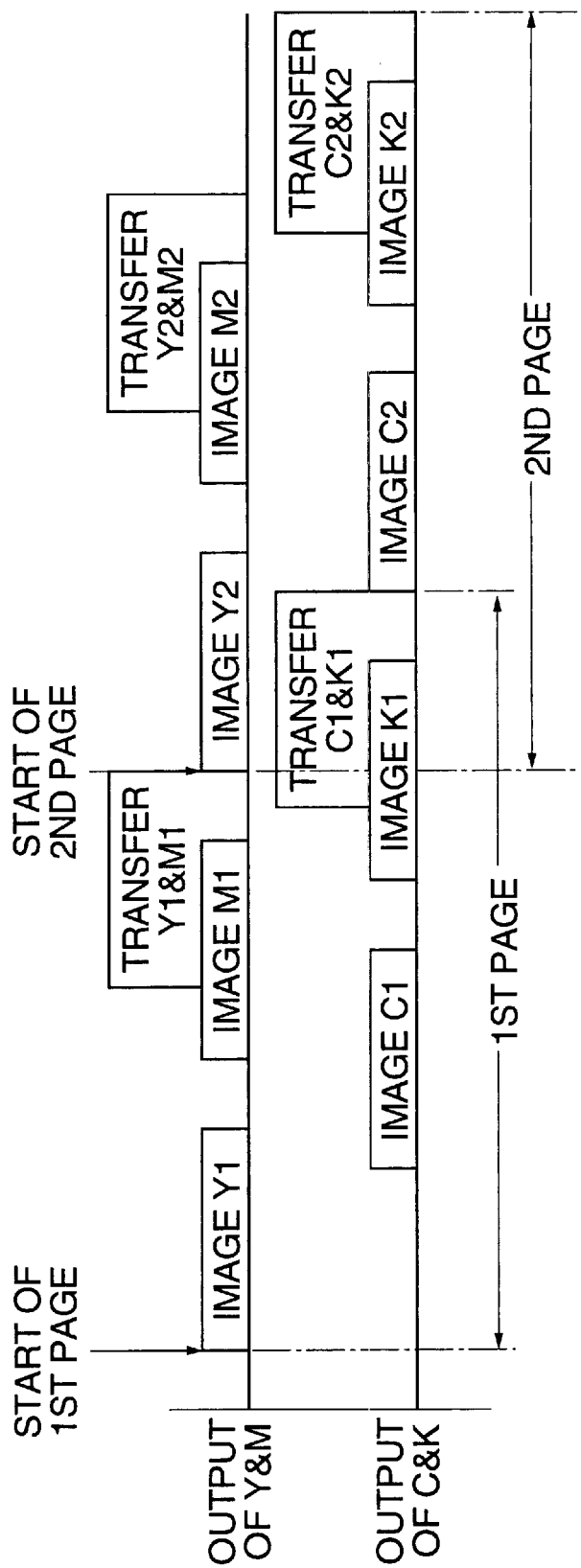
FIG. 38 is an explanatory view illustrating an example of timing in transmitting and transferring image data to the 2-tandem color printer.
Figure 39:
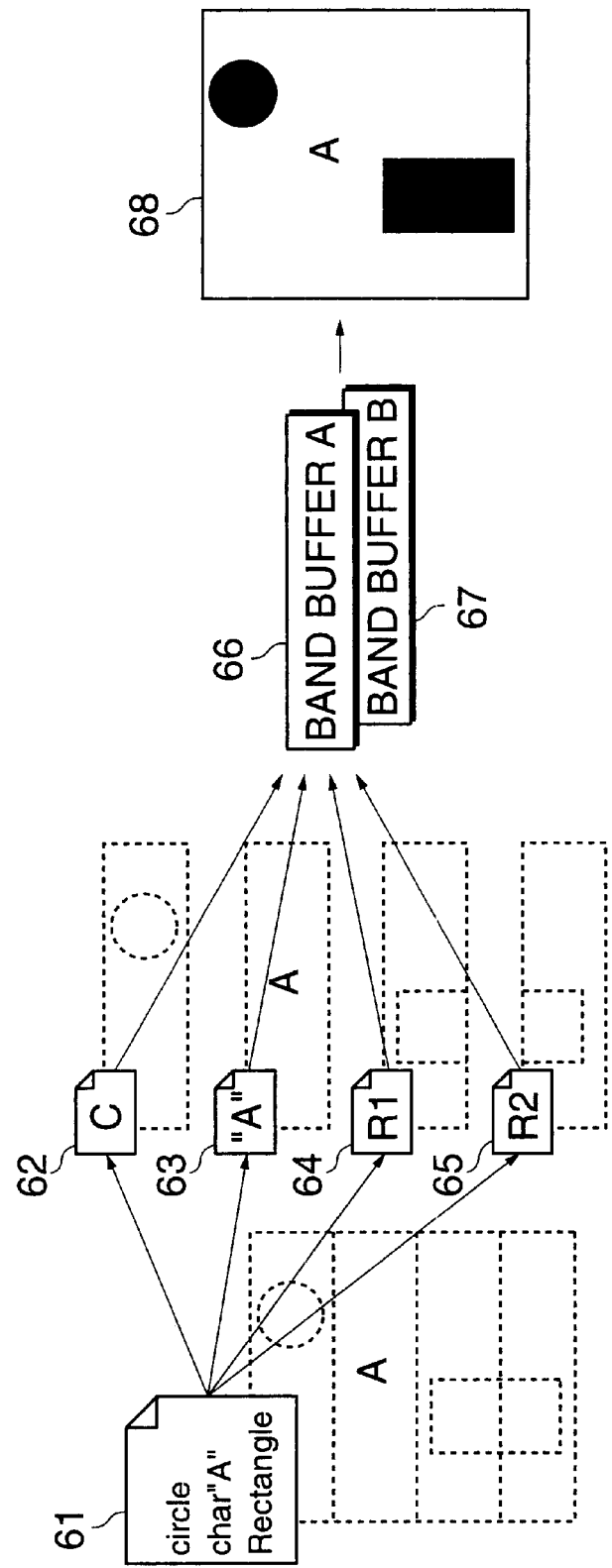
FIG. 39 is an explanatory view illustrating an example of a recording operation using an intermediate language and a band buffer.

The above operation completes printing of one page. In this respect, output timings at this time are as shown in, for example, FIG. 38. FIG. 10 is a timing chart showing an example of each rendering processor and data output in the case of outputting to a 2-tandem color printer in the first embodiment of image processing apparatus according to the present invention. Here, in a case where printing is performed at a speed of NPPM as in the case of FIGS. 45 to 47, there are shown timings, at which rendering is performed in the first rendering processor 203, the second rendering processor 206, the third rendering processor 209 and the fourth rendering processor 212, and timings of Y-color output, M-color output, C-color output and K-color output to be outputted to the 2-tandem color printer 41 from the first output control unit 205 and the third output control unit 211. As can be seen from the comparison with FIG. 47, the processing time in each rendering processor can be taken approximately twice. Therefore, even if the throughput capacity of each rendering processor is low, it is possible to transmit the bit map data to the 2-tandem color printer.

Figure 45:
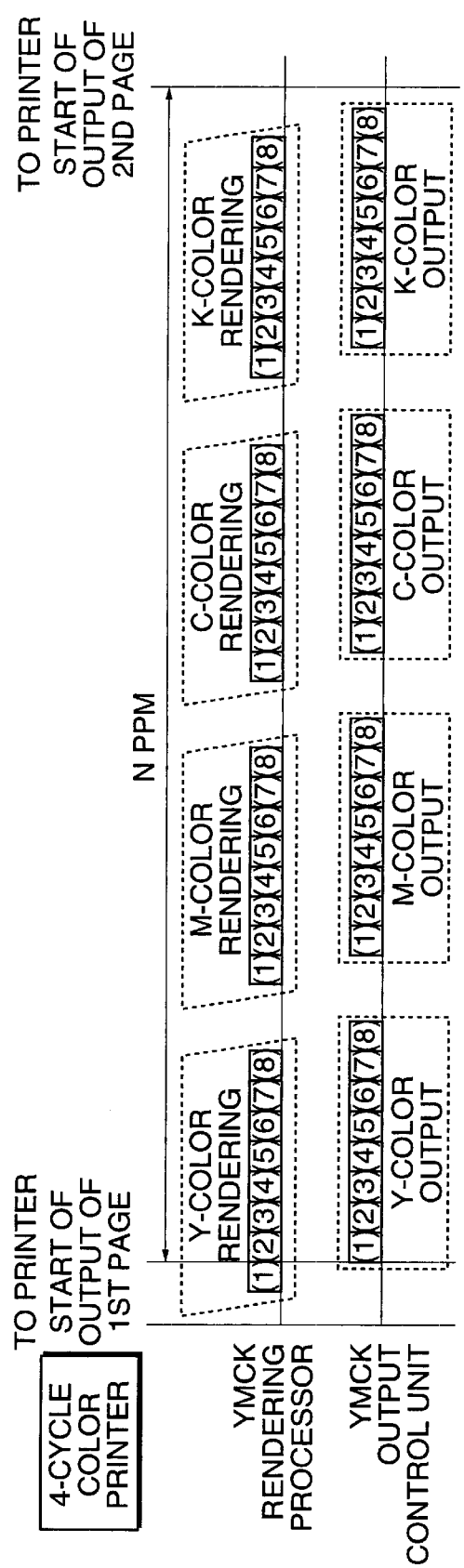
FIG. 45 is a timing chart when bit map data for each band is transmitted to the 4-cycle color printer in a case where a conventional image processing apparatus corresponding to a 4-cycle color printer is used.
Figure 46:
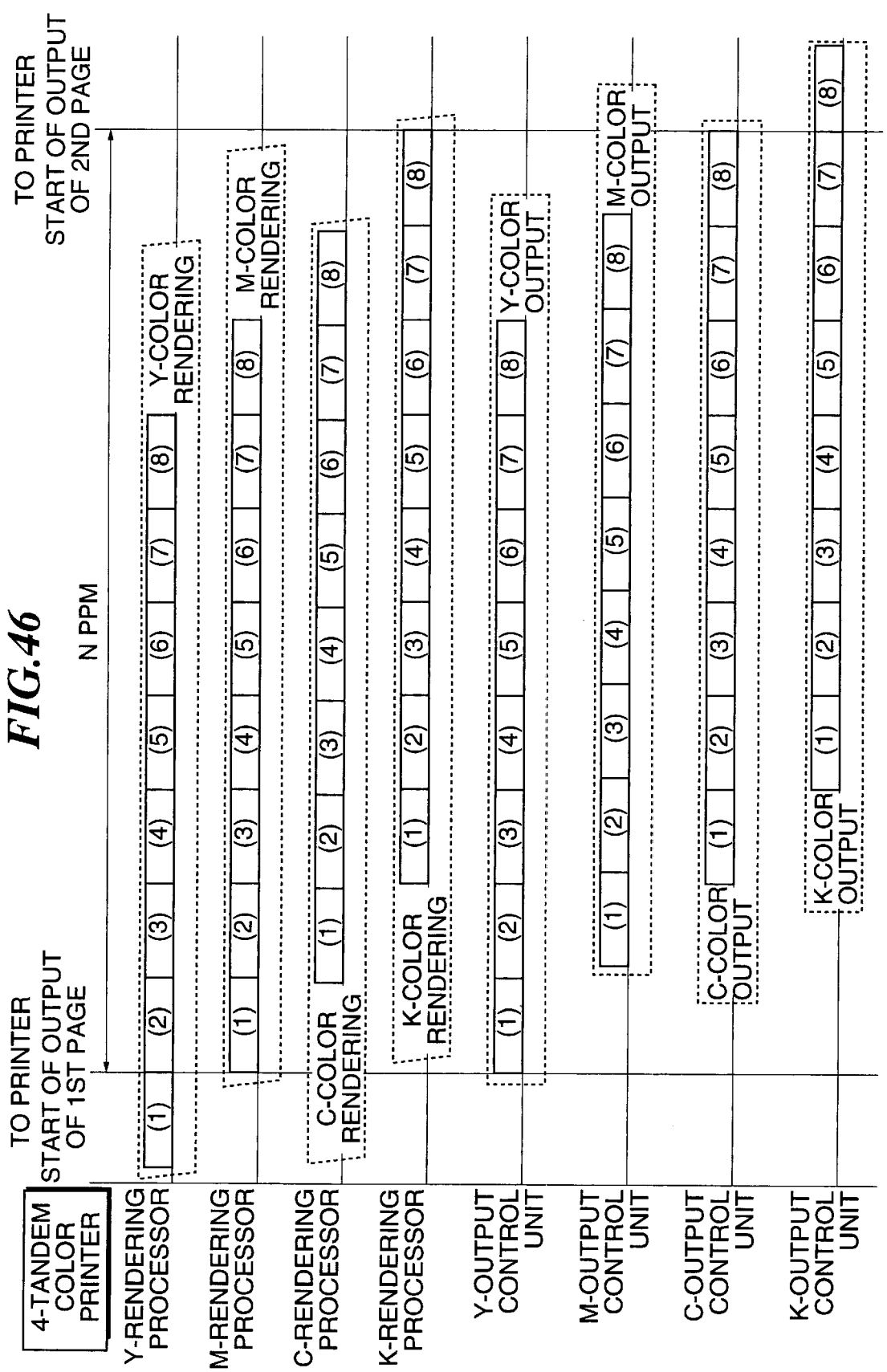
FIG. 46 is a timing chart when bit map data for each band is transmitted to the 4-tandem color printer in a case where a conventional image processing apparatus corresponding to a 4-tandem color printer is used.
Figure 47:
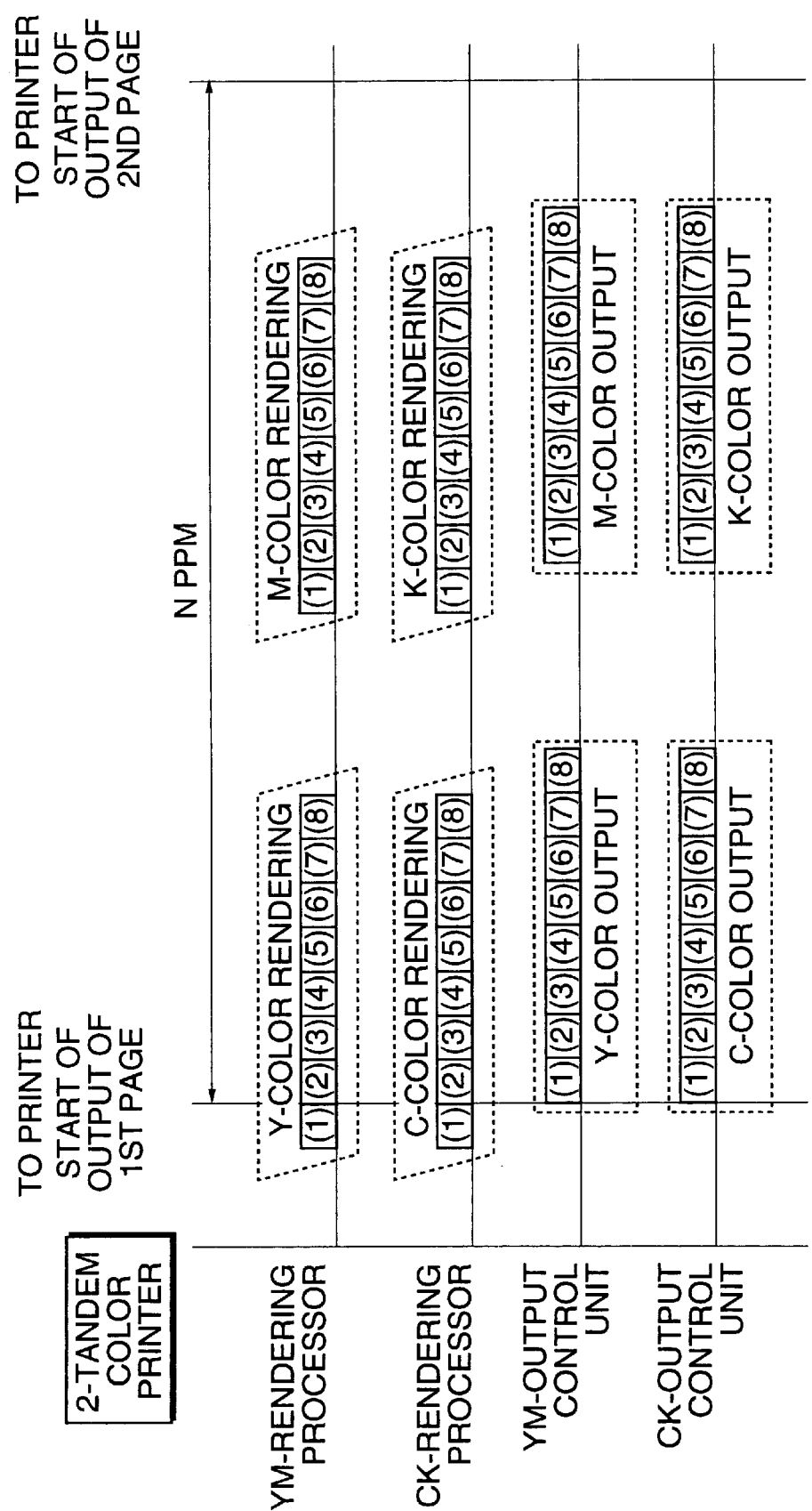
FIG. 47 is a timing chart when bit map data for each band is transmitted to the 2-tandem color printer in a case where a conventional image processing apparatus corresponding to a 2-tandem color printer is used.

In the foregoing, the description has been made of a case where the first embodiment of image processing apparatus according to the present invention is connected to a 4-tandem color printer 21, a 4-cycle color printer 1 and a 2-tandem color printer 41 as a concrete example. Conventionally, the image processing apparatus coped with these printers, but rendering had to be processed at timings as shown in FIGS. 45 to 47 in order to obtain the same output speed in the image processing apparatuses. More specifically, in the conventional image processing apparatus, rendering time given to the rendering processor differs depending on the 4-cycle color printer, the 4-tandem color printer, and the 2-tandem color printer. In the case of any configuration using an image processing apparatus according to the present invention, however, it can be seen that the time given to the first rendering processor 203, the second rendering processor 206, the third rendering processor 209 and the fourth rendering processor 212 is substantially constant irrespective of the type of the color printer as shown in FIGS. 4, 7 and 10.

Therefore, the use of the configuration shown in FIG. 1 enables any of the 4-tandem color printer 21, the 4-cycle color printer 1 and the 2-tandem color printer 41 to be connected, and the performance of NPPM to be assured.

Next, a description will be made of a second embodiment of image processing apparatus according to the present invention. When the performance of the 4-cycle color printer 1 is set to NPPM, let us consider a double-speed 4-cycle color printer 1a having performance of 2 NPPM, which is double speed. In the above first embodiment, there is shown an example in which an image processing apparatus 221 having one rendering mechanism unit 201 can be connected to a 4-cycle color printer 1. In the present second embodiment, there has been shown configuration in which two rendering mechanism units 201 are used. This configuration is capable of corresponding to a double-speed 4-cycle color printer 1a. In this respect, the configuration of the double-speed 4-cycle color printer 1a is the same as the 4-cycle color printer 1 shown in FIG. 29.

Figure 11:
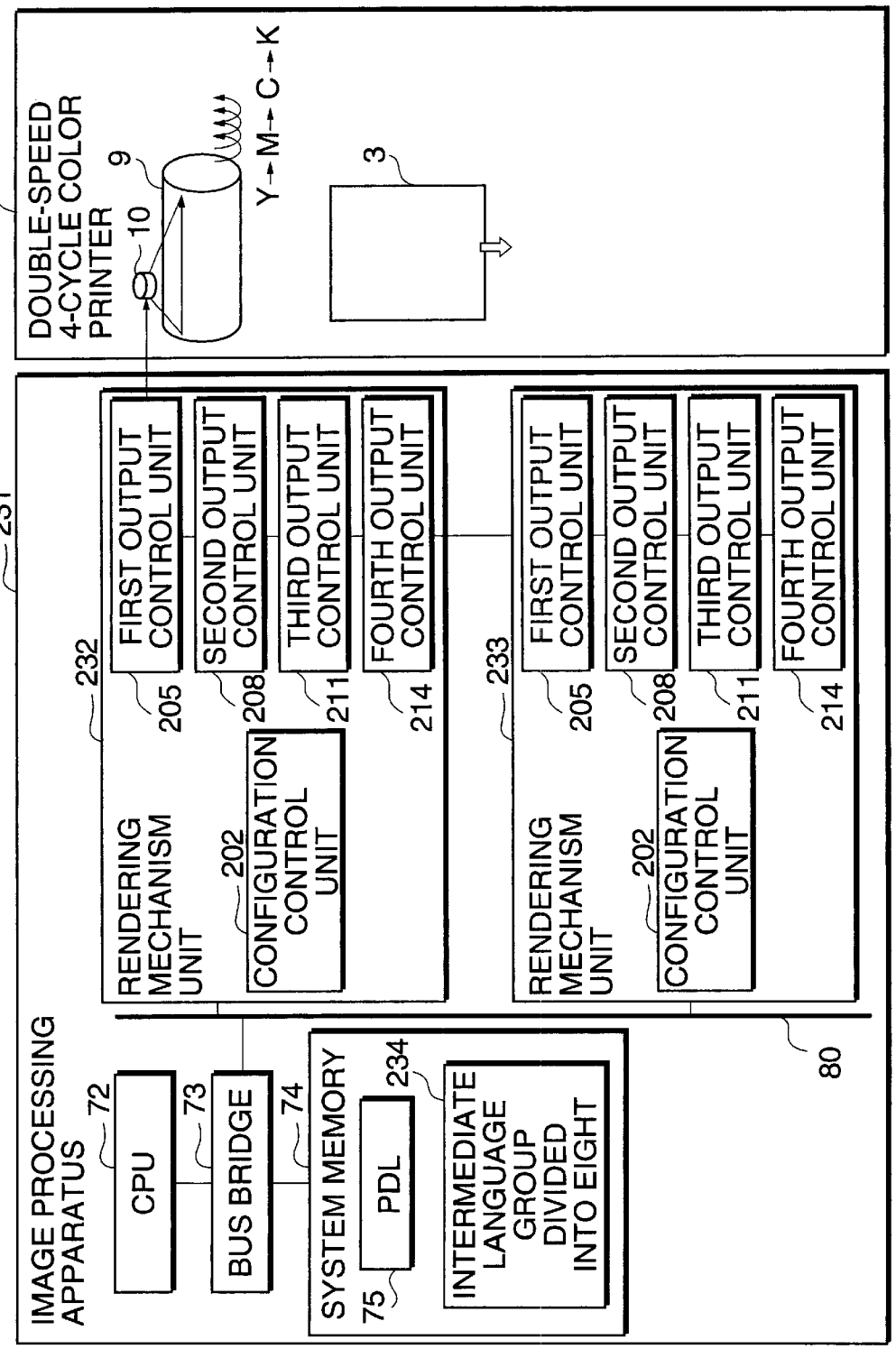
FIG. 11 is a block diagram showing an example when a double-speed 4-cycle color printer is connected as an output device in a second embodiment of an image processing apparatus according to the present invention.
Figure 12:
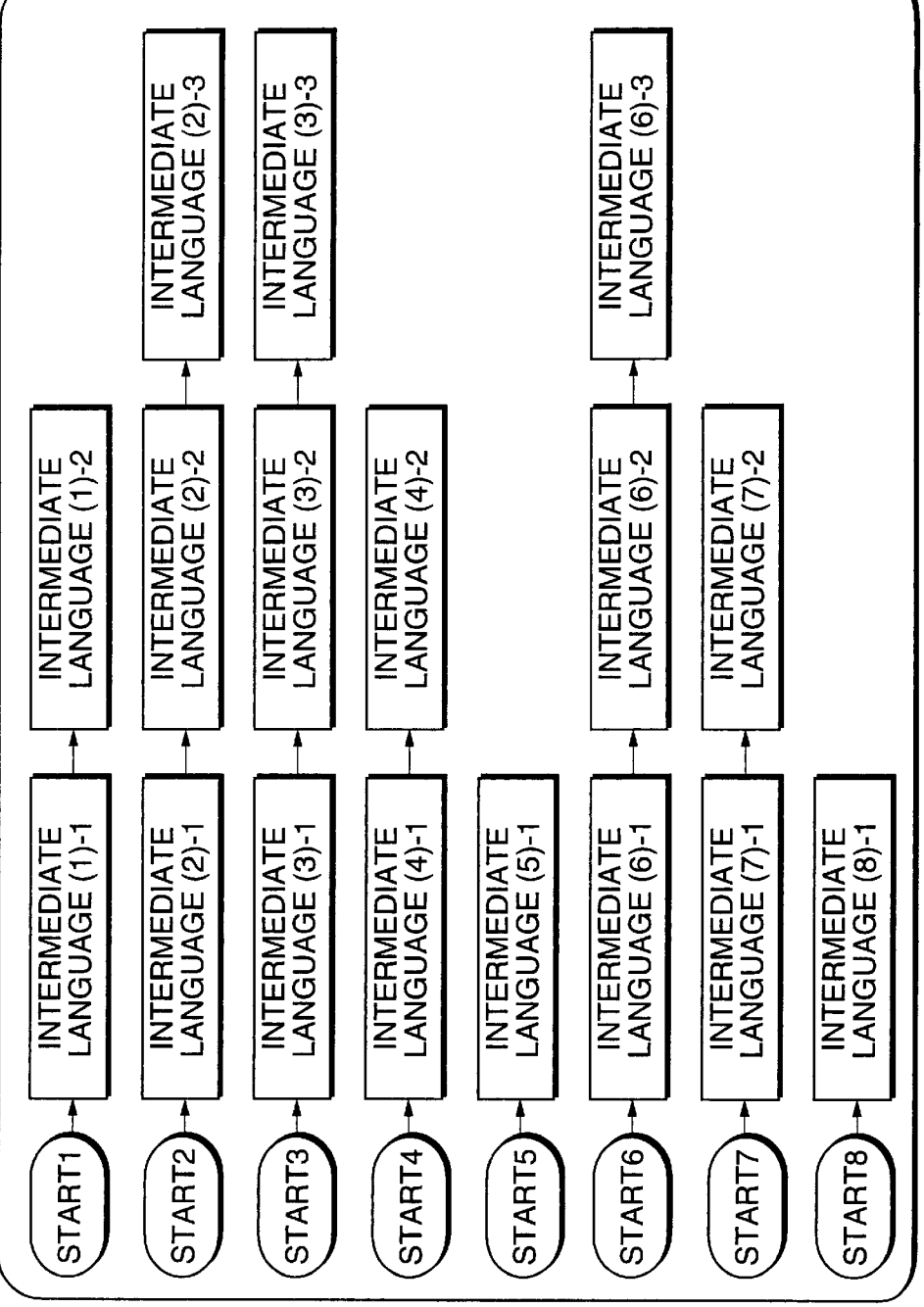
FIG. 12 is an explanatory view illustrating an example of an intermediate language group divided into eight when a double-speed 4-cycle color printer is connected as an output device in the second embodiment of an image processing apparatus according to the present invention.

FIG. 11 is a block diagram showing an example when a double-speed 4-cycle color printer is connected as an output device in a second embodiment of image processing apparatus according to the present invention, and FIG. 12 is likewise an explanatory view illustrating an example of an intermediate language group divided into eight. In FIGS. 11 and 12, components equivalent to those in FIGS. 1 and 5 are represented by the same reference numbers, and a description thereof will be omitted. A reference numeral 1a designates a double-speed 4-cycle color printer; 231, an image processing apparatus; 232 and 233, rendering mechanism units; and 234, an intermediate language group divided into eight. The image processing apparatus 231 has two rendering mechanism units 232 and 233 together with a CPU 72, a system memory 74, a bus bridge 73 and the like. In this respect, both the rendering mechanism units 232 and 233 have the same configuration as the rendering mechanism unit 201 shown in FIG. 1. For convenience's sake in representation, there are shown only the configuration control unit 202 and the first to fourth output control units 205, 208, 211 and 214.

The configuration control unit 202 in the rendering mechanism unit 232 sets a data output target of the first output control unit 205 to the double-speed 4-cycle color printer 1a, sets the data output target of the second output control unit 208 to the first output control unit 205, sets the data output target of the third output control unit 211 to the second output control unit 208, and sets the data output target of the fourth output control unit 214 to the third output control unit 211 for controlling. The configuration control unit 202 in the rendering mechanism unit 233 sets the data output target of the first output control unit 205 to the fourth output control unit 214 in the rendering mechanism unit 232, sets the data output target of the second output control unit 208 to the first output control unit 205, sets the data output target of the third output control unit 211 to the second output control unit 208, and sets the data output target of the fourth output control unit 214 to the third output control unit 211 for controlling. The configuration control unit 202 in the rendering mechanism unit 232 and the configuration control unit 202 in the rendering mechanism unit 233 control each other in configuration and output.

An intermediate language group 115 as shown in FIG. 44, generated from the PDL 75 by the CPU 72 is separated from the band management unit 114, and the intermediate language group 234 divided into eight as shown in FIG. 12 having new connecting relationship is synthesized in conformity with the setting of the configuration control unit 202 in the rendering mechanism unit 232 and the configuration control unit 202 in the rendering mechanism unit 233.

The intermediate language group 234 divided into eight is connected together in the order of the intermediate language (1) -1 and the intermediate language (1) -2 with the head address of an intermediate language (1) -1 as "Start 1". It is connected together in the order of the intermediate language (2) -1, the intermediate language (2) -2 and the intermediate language (2) -3 with the head address of the intermediate language (2) -1 as "Start 2". Further, it is connected together in the order of the intermediate language (3) -1, the intermediate language (3) -2 and the intermediate language (3) -3 with the head address of the intermediate language (3) -1 as "Start 3". Further, it is connected together in the order of the intermediate language (4) -1, and the intermediate language (4) -2 with the head address of the intermediate language (4) -1 as "Start 4". Further, it is connected together in the order of the intermediate language (5) -1 with the head address of the intermediate language (5) -1 as "Start 5". Further, it is connected together in the order of the intermediate language (6) -1, the intermediate language (6) -2 and the intermediate language (6) -3 with the head address of the intermediate language (6) -1 as "Start 6". Further, it is connected together in the order of the intermediate language (7) -1, and the intermediate language (7) -2 in this order with the head address of the intermediate language (7) -1 as "Start 7". Further, it is connected together in the order of the intermediate language (8) -1 with the head address of the intermediate language (8) -1 as "Start 8". The intermediate language group 234 divided into eight is retained within the system memory 74.

The intermediate language, which starts with the "Start 1" address, is converted into bit map data in the first rendering processor 203 in the rendering mechanism unit 232, and is outputted to the double-speed 4-cycle color printer 1a from the first output control unit 205 in the rendering mechanism unit 232. The intermediate language, which starts with the "Start 2" address, is converted into bit map data in the second rendering processor 206 in the rendering mechanism unit 232, and is outputted to the double-speed 4-cycle color printer 1a from the first output control unit 205 in the rendering mechanism unit 232. The intermediate language, which starts with the "Start 3" address, is converted into bit map data in the third rendering processor 209 in the rendering mechanism unit 232, and is outputted to the double-speed 4-cycle color printer 1a from the first output control unit 205 in the rendering mechanism unit 232. The intermediate language, which starts with the "Start 4" address, is converted into bit map data in the fourth rendering processor 212 in the rendering mechanism unit 232, and is outputted to the double-speed 4-cycle color printer 1a from the first output control unit 205 in the rendering mechanism unit 232. The intermediate language, which starts with the "Start 5" address, is converted into bit map data in the first rendering processor 203 in the rendering mechanism unit 233, and is outputted to the double-speed 4-cycle color printer 1a from the first output control unit 205 in the rendering mechanism unit 232. The intermediate language, which starts with the "Start 6" address, is converted into bit map data in the second rendering processor 206 in the rendering mechanism unit 233, and is outputted to the double-speed 4-cycle color printer 1a from the first output control unit 205 in the rendering mechanism unit 232. The intermediate language, which starts with the "Start 7" address, is converted into bit map data in the third rendering processor 209 in the rendering mechanism unit 233, and is outputted to the double-speed 4-cycle color printer 1a from the first output control unit 205 in the rendering mechanism unit 232. The intermediate language, which starts with the "Start 8" address, is converted into bit map data in the fourth rendering processor 212 in the rendering mechanism unit 233, and is outputted to the double-speed 4-cycle color printer 1a from the first output control unit 205 in the rendering mechanism unit 232.

From the foregoing, it can be seen that two rendering processors 232 and 233 are output-controlled each other, whereby it is possible to correspond to twice performance (2NPPM).

The above example shows an example in which there is provided an image processing apparatus 231 corresponding to the double-speed 4-cycle color printer 1a using two rendering processors. Similarly, it is possible to correspond to a double-speed tandem color printer 21a, and a double-speed 2-tandem color printer 41a by the use of configuration of using two rendering processors. More specifically, when the performance of the 4-tandem color printer 21 or the 2-tandem color printer 41 is set to NPPM, there is shown an image processing apparatus capable of being connected to the double-speed tandem color printer 21a or the double-speed 2-tandem color printer 41a whose performance is 2NPPM.

Figure 13:
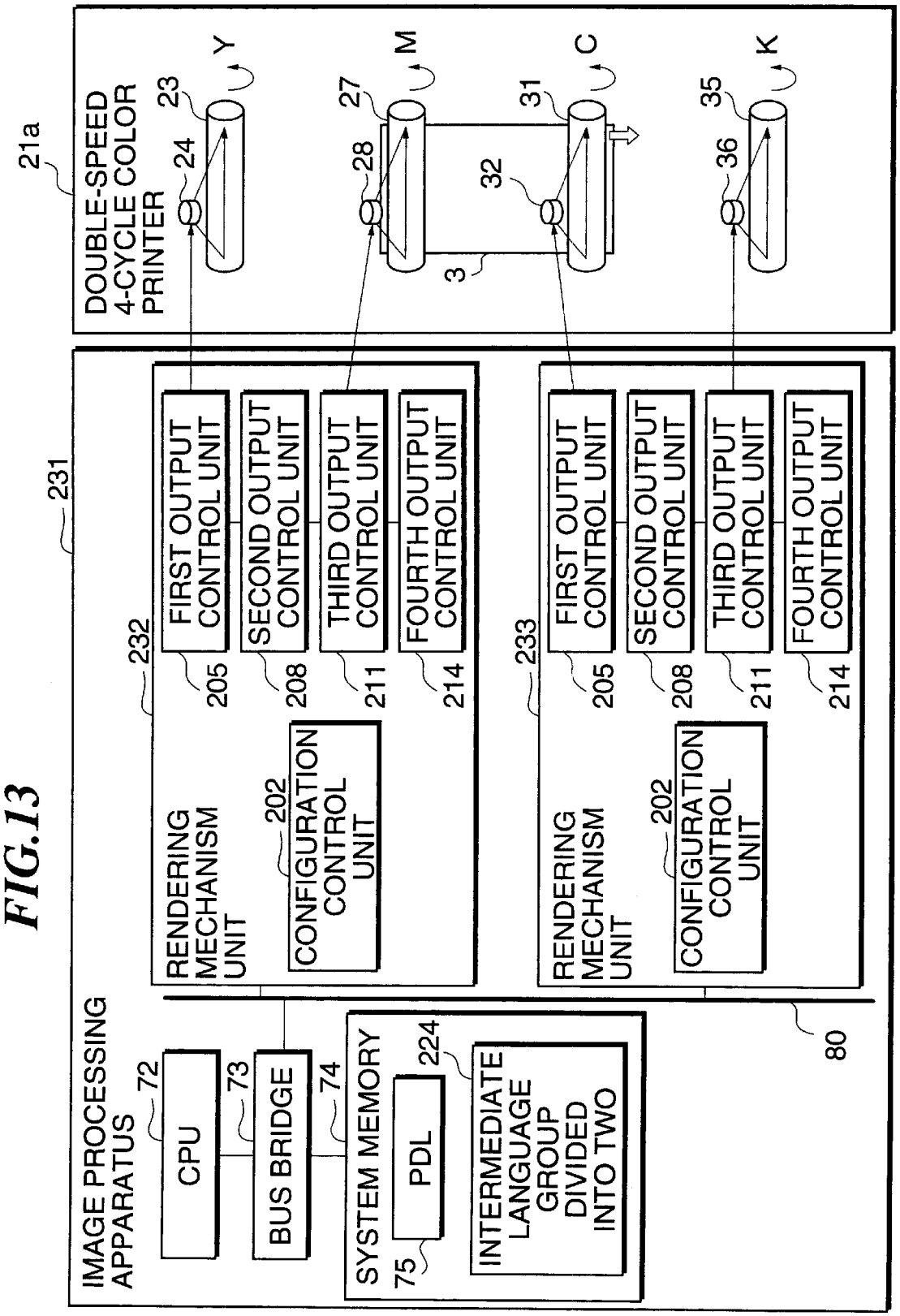
FIG. 13 is a block diagram showing an example when a double-speed 4-tandem color printer is connected as an output device in a second embodiment of an image processing apparatus according to the present invention.

FIG. 13 is a block diagram showing an example when a double-speed 4-tandem color printer is connected as an output device in a second embodiment of image processing apparatus according to the present invention. In FIG. 13, components equivalent to those in FIGS. 1, 2 and 11 are represented by the same reference numbers, and a description thereof will be omitted. A reference numeral 21a designates a double-speed 4-tandem color printer. In this respect, an intermediate language group 224 divided into two is the same as described in FIG. 9. Rendering mechanism units 232 and 233 have both the same configuration as the rendering mechanism unit 201 shown in FIG. 1, and there are shown only respective configuration control units 202 and the first to fourth output control units 205, 208, 211 and 214 for convenience's sake in representation.

The configuration control unit 202 in the rendering mechanism unit 232 sets a data output target of the first output control unit 205 to the double-speed 4-tandem color printer 21a, sets the data output target of the second output control unit 208 to the first output control unit 205, sets the data output target of the third output control unit 211 to the double-speed 4-tandem color printer 21a, and sets the data output target of the fourth output control unit 214 to the third output control unit 211 for controlling. The configuration control unit 202 in the rendering mechanism unit 233 sets the data output target of the first output control unit to the double-speed 4-tandem color printer 21a, sets the data output target of the second output control unit 208 to the first output control unit 205, sets the data output target of the third output control unit 211 to the double-speed 4-tandem color printer 21a, and sets the data output target of the fourth output control unit 214 to the third output control unit 211 for controlling.

An intermediate language group 115 as shown in FIG. 44, generated from the PDL 75 by the CPU 72 is separated from the band management unit 114, and the intermediate language group 224 divided into two as shown in FIG. 9 having new connecting relationship is synthesized in accordance with the setting of the configuration control unit 202 in the rendering mechanism unit 232 and the configuration control unit 202 in the rendering mechanism unit 233. As already described, the intermediate language group 224 divided into two is, with the head address of the intermediate language (1) -1 as "Start 1", connected together in the order of the intermediate language (1) -1, an intermediate language (1) -2, an intermediate language (3) -1, an intermediate language (3) -2, an intermediate language (3) -3, an intermediate language (5) -1, an intermediate language (7) -1, and an intermediate language (7) -2. Also, it is, with the head address of an intermediate language (2) -1 as "Start 2", connected together in the order of the intermediate language (2) -1, an intermediate language (2) -2, an intermediate language (2) -3, an intermediate language (4) -1, an intermediate language (4) -2, an intermediate language (6) -1, an intermediate language (6) -2, an intermediate language (6) -3 and an intermediate language (8) -1. The intermediate language group 224 divided into two is retained within the system memory 74 in the image processing apparatus 231.

Y-color bit map data to be outputted to the double-speed 4-tandem color printer 21a is converted into Y-color bit map data by an intermediate language, which starts with "Start 1" address in the first rendering processor 203 in the rendering mechanism unit 232, and an intermediate language, which starts with "Start 2" address in the second rendering processor 206, and is outputted from the first output control unit 205 in the rendering mechanism unit 232. M-color bit map data is converted into M-color bit map data by an intermediate language, which starts with "Start 1" address in the third rendering processor 209 in the rendering mechanism unit 232, and an intermediate language, which starts with "Start 2" address in the fourth rendering processor 212, and is outputted from the third output control unit 211 in the rendering mechanism unit 232. C-color bit map data is converted into C-color bit map data by an intermediate language, which starts with "Start 1" address in the first rendering processor 203 in the rendering mechanism unit 232, and an intermediate language, which starts with "Start 2" address in the second rendering processor 206, and is outputted from the first output control unit 205 in the rendering mechanism unit 233. K-color bit map data is converted into K-color bit map data by an intermediate language, which starts with "Start 1" address in the third rendering processor 209 in the rendering mechanism unit 233, and an intermediate language, which starts with "Start 2" address in the fourth rendering processor 212, and is outputted from the third output control unit 211 in the rendering mechanism unit 233.

Figure 14:
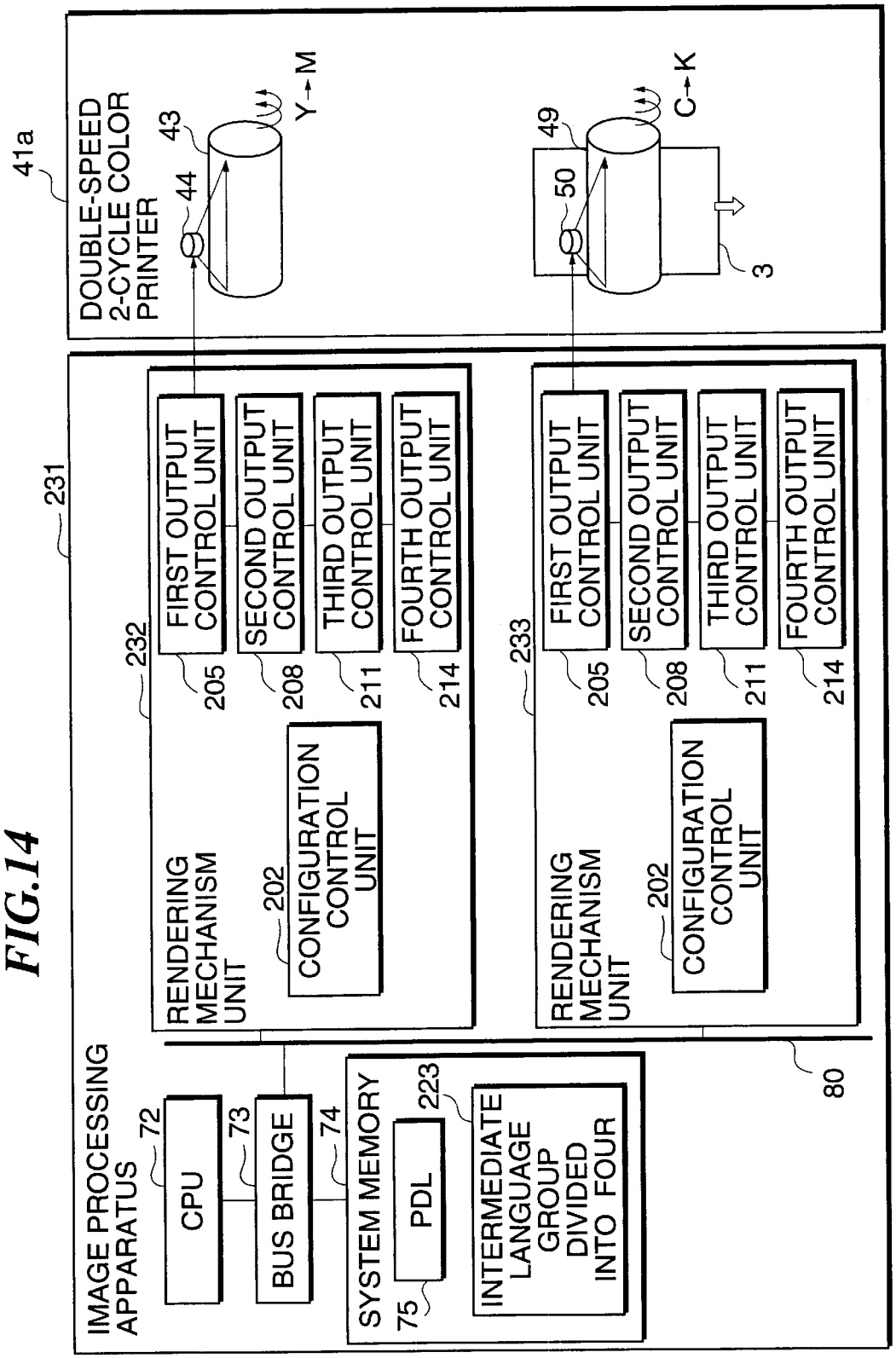
FIG. 14 is a block diagram showing an example when a double-speed 2-tandem color printer is connected as an output device in the second embodiment of an image processing apparatus according to the present invention.

FIG. 14 is a block diagram showing an example when a double-speed 2-tandem color printer is connected as an output device in the second embodiment of image processing apparatus according to the present invention. In FIG. 14, components equivalent to those in FIGS. 1, 8 and 11 are represented by the same reference numbers, and a description thereof will be omitted. A reference numeral 41a designates a double-speed 2-tandem color printer. In this respect, an intermediate language group 223 divided into four is the same as described in FIG. 6. Rendering mechanism units 232 and 233 have both the same configuration as the rendering mechanism unit 201 shown in FIG. 1, and there are shown only respective configuration control units 202 and first to fourth output control units 205, 208, 211 and 214 for convenience's sake in representation.

The configuration control unit 202 in the rendering mechanism unit 232 sets a data output target of the first output control unit 205 to the double-speed 2-tandem color printer 41a, sets the data output target of the second output control unit 208 to the first output control unit 205, sets the data output target of the third output control unit 211 to the second output control unit 208, and sets the data output target of the fourth output control unit 214 to the third output control unit 211 for controlling. The configuration control unit 202 in the rendering mechanism unit 233 sets the data output target of the first output control unit 205 to the double-speed 2-tandem color printer 41a, sets the data output target of the second output control unit 208 to the first output control unit 205, sets the data output target of the third output control unit 211 to the second output control unit 208, and sets the data output target of the fourth output control unit 214 to the third output control unit 211 for controlling.

An intermediate language group 115 as shown in FIG. 44, generated from the PDL 75 by the CPU 72 is separated from the band management unit 114, and the intermediate language group 223 divided into four as shown in FIG. 6 having new connecting relationship is synthesized in accordance with the setting of the configuration control unit 202 in the rendering mechanism unit 232 and the configuration control unit 202 in the rendering mechanism unit 233. As already described, the intermediate language group 223 divided into four is, with the head address of the intermediate language (1) -1 as "Start 1", connected together in the order of the intermediate language (1) -1, an intermediate language (1) -2, and an intermediate language (5) -1. Also, it is, with the head address of the intermediate language (2) -1 as "Start 2", connected together in the order of the intermediate language (2) -1, an intermediate language (2) -2, an intermediate language (2) -3, an intermediate language (6) -1, an intermediate language (6) -2, and an intermediate language (6) -3. Further, it is, with the head address of the intermediate language (3) -1 as "Start 3", connected together in the order of the intermediate language (3) -1, an intermediate language (3) -2, an intermediate language (3) -3, an intermediate language (7) -1 and an intermediate language (7) -2. Further, it is, with the head address of the intermediate language (4) -1 as "Start 4", connected together in the order of the intermediate language (4) -1, an intermediate language (4) -2 and an intermediate language (8) -1. In this respect, the intermediate language group 223 divided into four is retained within the system memory 74.

In the Y-color bit map data to be outputted to the double-speed 2-tandem color printer 41a, an intermediate language, which starts with "Start 1" address in the first rendering processor 203 in the rendering mechanism unit 232, is read, and is expanded in the first band buffer 204 as Y-color bit map data. Also, an intermediate language, which starts with "Start 2" address in the second rendering processor 206, is read, and is expanded in the second band buffer 207 as Y-color bit map data. Further, an intermediate language, which starts with "Start 3" address in the third rendering processor 209, is read, and is expanded in the third band buffer 210 as Y-color bit map data. Further, an intermediate language, which starts with "Start 4" address in the fourth rendering processor 212, is read, and is expanded in the fourth band buffer 213 as Y-color bit map data. The Y-color bit map data which have been expanded in the first band buffer 204, the second band buffer 207, the third band buffer 210, and the fourth band buffer 213, are outputted from the first output control unit 205 in the rendering mechanism unit 232.

Similarly, in the M-color bit map data to be outputted to the double-speed 2-tandem color printer 41a, an intermediate language, which starts with "Start 1" address in the first rendering processor 203 in the rendering mechanism unit 232, is read, and is expanded in the first band buffer 204 as M-color bit map data. Also, an intermediate language, which starts with "Start 2" address in the second rendering processor 206, is read, and is expanded in the second band buffer 207 as M-color bit map data. Further, an intermediate language, which starts with "Start 3" address in the third rendering processor 209, is read, and is expanded in the third band buffer 210 as M-color bit map data. Further, an intermediate language, which starts with "Start 4" address in the fourth rendering processor 212, is read, and is expanded in the fourth band buffer 213 as M-color bit map data. The M-color bit map data which have been expanded in the first band buffer 204, the second band buffer 207, the third band buffer 210, and the fourth band buffer 213, are outputted from the first output control unit 205 in the rendering mechanism unit 232.

In the C-color bit map data to be outputted to the double-speed 2-tandem color printer 41a, an intermediate language, which starts with "Start 1" address in the first rendering processor 203 in the rendering mechanism unit 233, is read, and is expanded in the first band buffer 204 as C-color bit map data. Also, an intermediate language, which starts with "Start 2" address in the second rendering processor 206, is read, and is expanded in the second band buffer 207 as C-color bit map data. Further, an intermediate language, which starts with "Start 3" address in the third rendering processor 209, is read, and is expanded in the third band buffer 210 as C-color bit map data. Further, an intermediate language, which starts with "Start 4" address in the fourth rendering processor 212, is read, and is expanded in the fourth band buffer 213 as C-color bit map data. The C-color bit map data which have been expanded in the first band buffer 204, the second band buffer 207, the third band buffer 210, and the fourth band buffer 213, are outputted from the first output control unit 205 in the rendering mechanism unit 233.

Similarly, in the K-color bit map data to be outputted to the double-speed 2-tandem color printer 41a, an intermediate language, which starts with "Start 1" address in the first rendering processor 203 in the rendering mechanism unit 233, is read, and is expanded in the first band buffer 204 as K-color bit map data. Also, an intermediate language, which starts with "Start 2" address in the second rendering processor 206, is read, and is expanded in the second band buffer 207 as K-color bit map data. Further, an intermediate language, which starts with "Start 3" address in the third rendering processor 209, is read, and is expanded in the third band buffer 210 as K-color bit map data. Further, an intermediate language, which starts with "Start 4" address in the fourth rendering processor 212, is read, and is expanded in the fourth band buffer 213 as K-color bit map data. The K-color bit map data which have been expanded in the first band buffer 204, the second band buffer 207, the third band buffer 210, and the fourth band buffer 213, are outputted from the first output control unit 205 in the rendering mechanism unit 233.

Next, a description will be made of a third embodiment of image processing apparatus according to the present invention. In color printers connected to the image processing apparatuses according to the present invention in each example described above, the printing speed was constant both when a color image is printed and when a monochrome image is printed. However, there exists a 4-tandem monochrome color printer which operates as a monochrome printer having the performance of NPPM as, for example, a 4-tandem color printer and having the performance of 2NPPM at double speed during K-color printing. An image processing apparatus according to the present invention can be also connected to such a 4-tandem monochrome color printer. In the present third embodiment, a description will be made of a case where an image processing apparatus according to the present invention is connected to a 4-tandem monochrome color printer.

Figure 15:
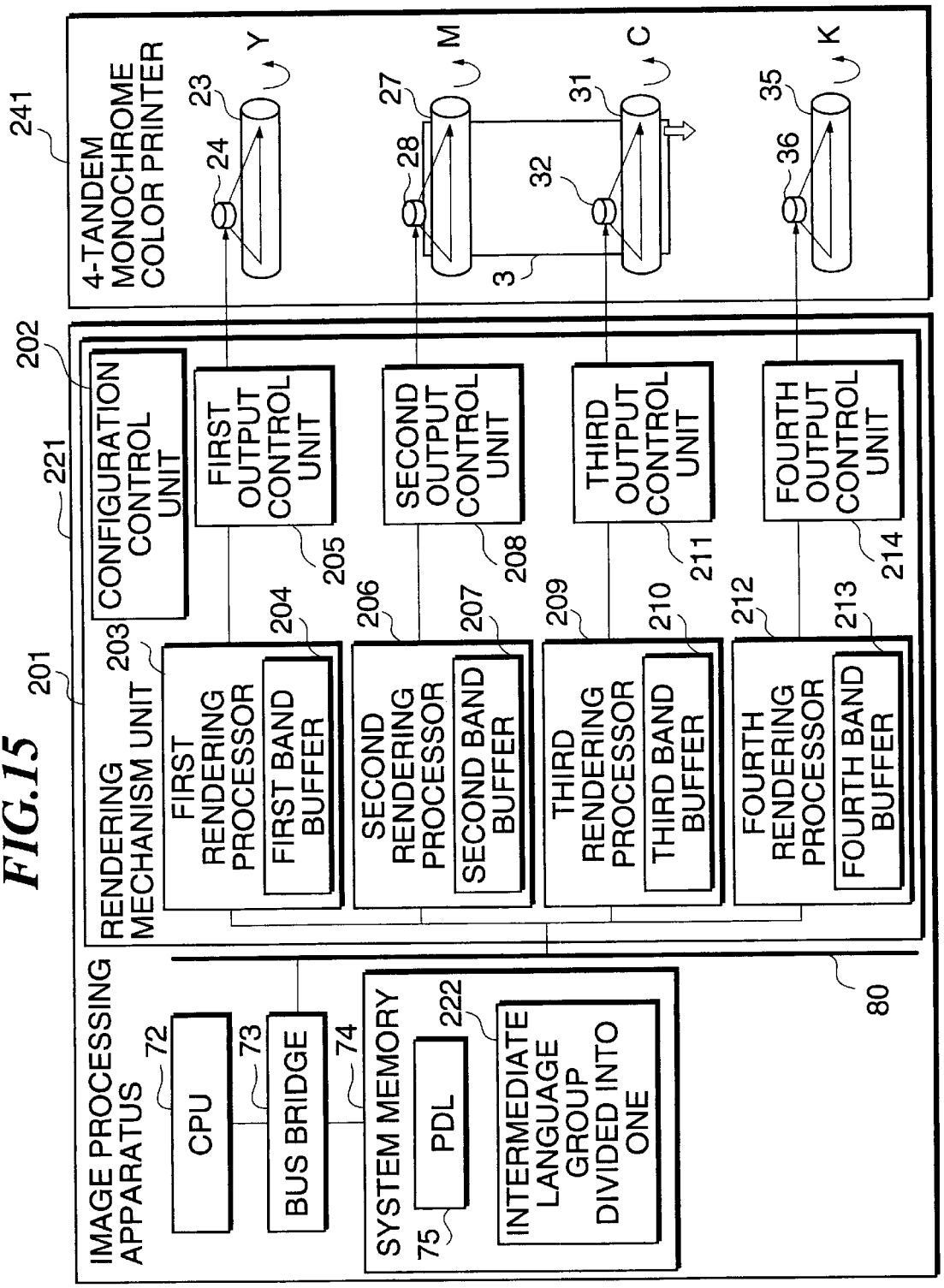
FIG. 15 is a block diagram showing an example during color printing when a 4-tandem monochrome color printer is connected as an output device in a third embodiment of an image processing apparatus according to the present invention.
Figure 16:
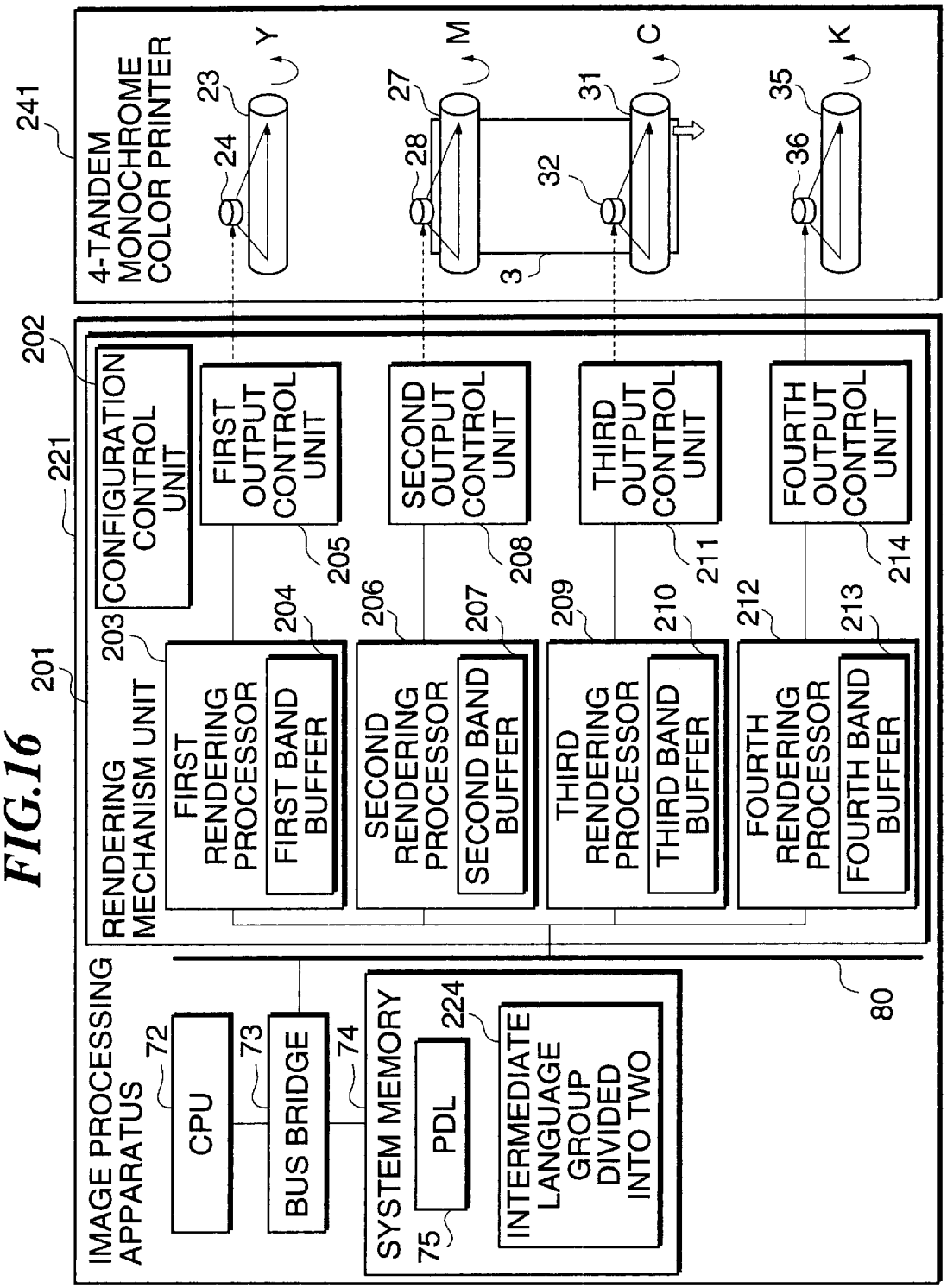
FIG. 16 is a block diagram showing an example during monochrome printing when a 4-tandem monochrome color printer is connected as an output device in the third embodiment of an image processing apparatus according to the present invention.

FIG. 15 is a block diagram showing an example during color printing when a 4-tandem monochrome color printer is connected as an output device in a third embodiment of image processing apparatus according to the present invention, and FIG. 16 is likewise a block diagram showing an example during monochrome printing. In FIGS. 15 and 16, components equivalent to those in FIGS. 1 and 2 are represented by the same reference numbers, and a description thereof will be omitted. A reference numeral 241 designates a 4-tandem monochrome color printer. In this respect, the rendering mechanism unit 201 has the same configuration as the rendering mechanism unit 201 shown in FIG. 1. The intermediate language group 222 divided into one is the same as illustrated in FIG. 3, and the intermediate language group 224 divided into two, in FIG. 9.

The 4-tandem monochrome color printer 241 operates as a 4-tandem color printer of NPPM during color output, and operates as a monochrome printer which outputs only K-color at 2NPPM during monochrome output. FIG. 15 shows the configuration during color output. The configuration control unit 202 operates the first to fourth rendering processors 203, 206, 209 and 212, and the first to fourth output control units 205, 208, 211 and 214 at the same setting as in FIG. 2, that is, the setting when one rendering mechanism unit 201 is used and is connected to the 4-tandem color printer 21. At this time, an intermediate language to be processed is an intermediate language group 222 divided into one, and quite the same operation as when data is outputted to the 4-tandem color printer of FIG. 2 is performed.

FIG. 16 shows the configuration during monochrome output. The configuration control unit 202 renders by the use of the third rendering processor 209 and the fourth rendering processor 212 alone, and outputs K-color bit map data to the 4-tandem monochrome color printer 241 from the fourth output control unit 214. From the first output control unit 205, the second output control unit 208, and the third output control unit 211, any bit map data is not outputted directly to the 4-tandem monochrome color printer 241. In this respect, the third output control unit 211 transfers the bit map data to the fourth output control unit 214.

On the system memory 74, the intermediate language group 224 divided into two is prepared, only the third rendering processor 209 and the fourth rendering processor 212 render, and K-color bit map data is outputted to the 4-tandem monochrome color printer 241 from the fourth output control unit 214. Thus, it becomes possible to correspond to monochrome printing at 2NPPM, which is double speed.

Figure 17:
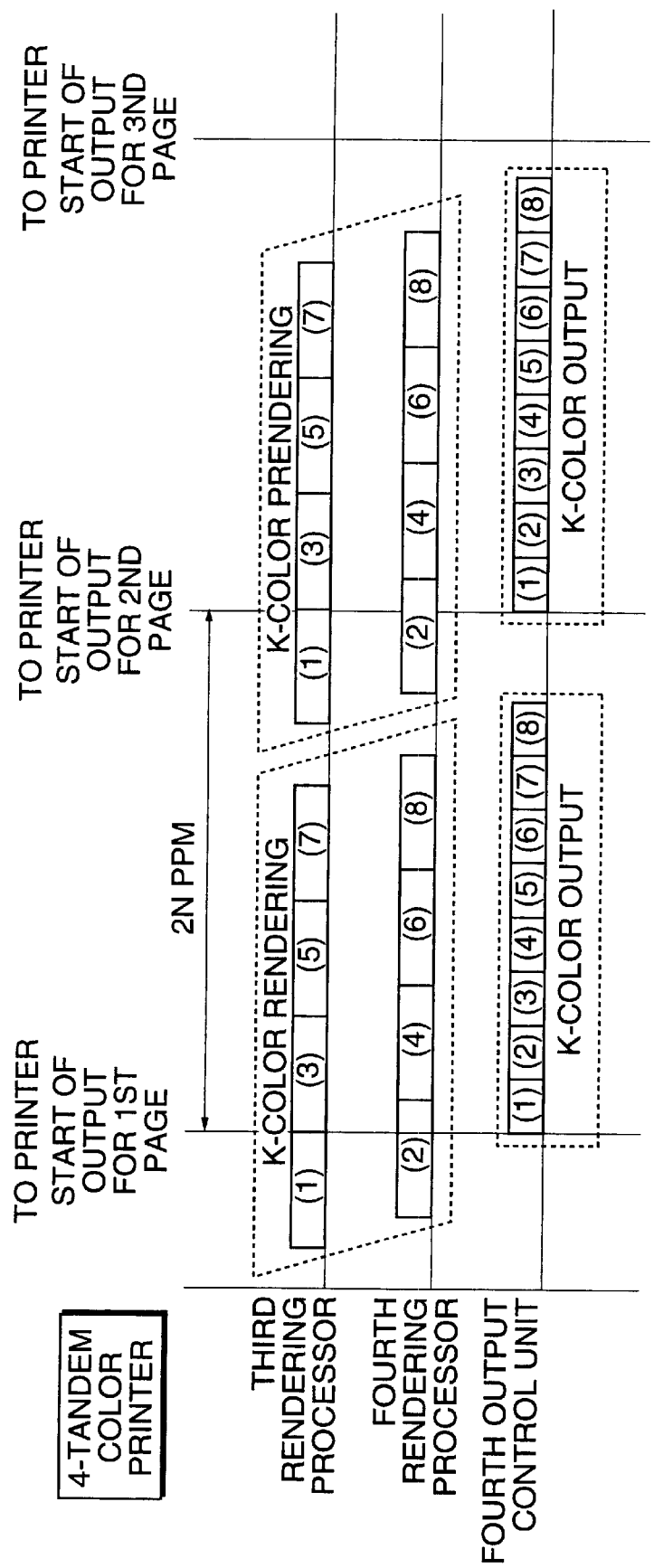
FIG. 17 is a timing chart showing an example of each rendering processor and data output when monochrome is outputted to a 4-tandem monochrome color printer in the third embodiment of an image processing apparatus according to the present invention.

FIG. 17 is a timing chart showing an example of each rendering processor and data output when monochrome output is performed to a 4-tandem monochrome color printer in the third embodiment of image processing apparatus according to the present invention. In this respect, a timing chart during color output is the same as FIG. 4. Timings at which rendering is performed in the third rendering processor 209 and the fourth rendering processor 212 when operated as a monochrome printer, and timings of K-color output to be outputted during printing from the fourth output control unit 214 become as shown in FIG. 17. Speed at which the bit map data is outputted from the fourth output control unit 214 to the 4-tandem monochrome color printer during monochrome output becomes twice as fast as that during color output shown in FIG. 4. By the use of both the third rendering processor 209 and the fourth rendering processor 212, however, the processing speed (throughput capacity) in each rendering processor may be the same.

By changing the settings in accordance with the printer operating conditions by the use of the configuration control unit 202 in this way, it is possible to correspond to any different printing speed.

Figure 18:
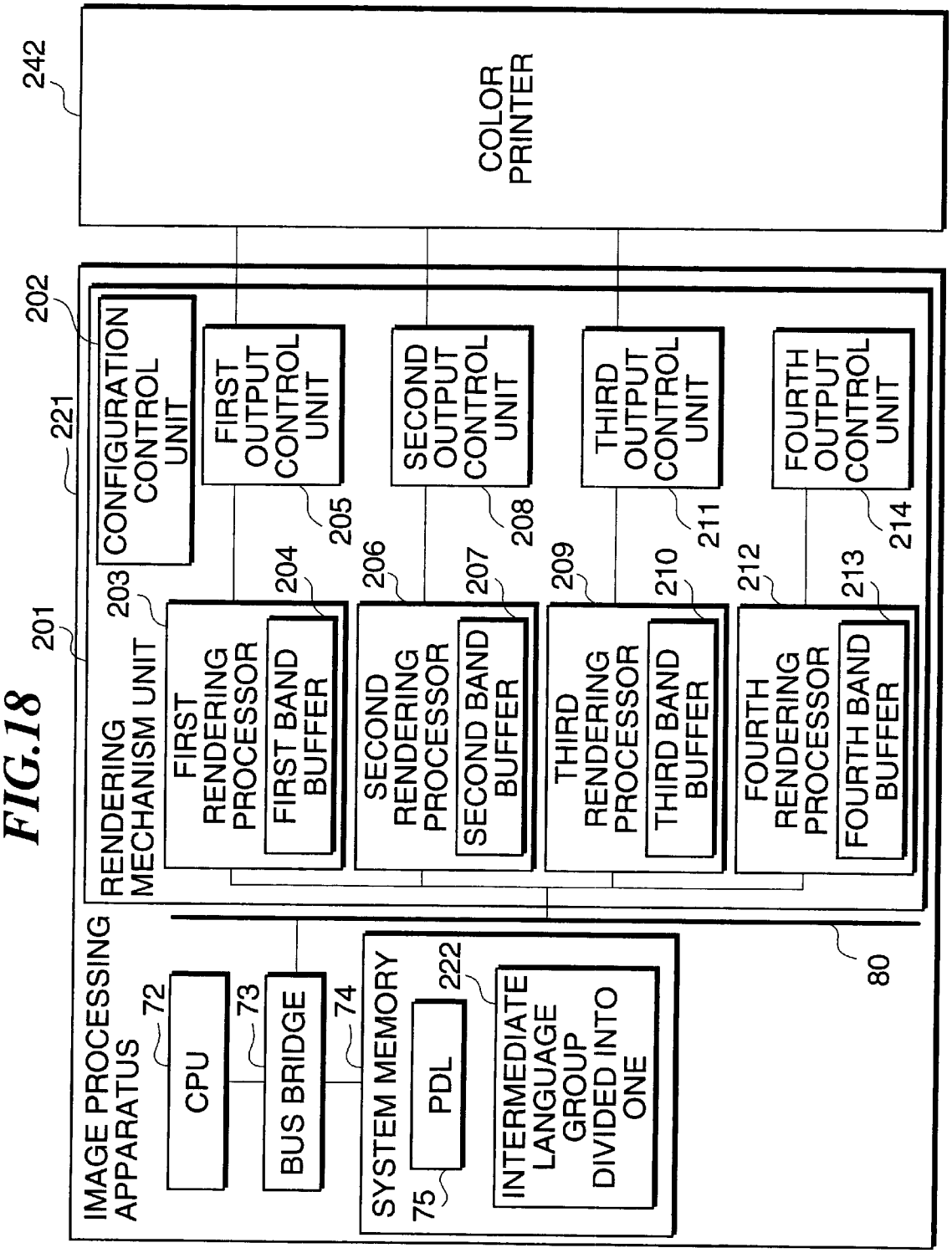
FIG. 18 is a block diagram showing an example when a color printer having an RGB interface is connected as an output device in a fourth embodiment of an image processing apparatus according to the present invention.
Figure 19:
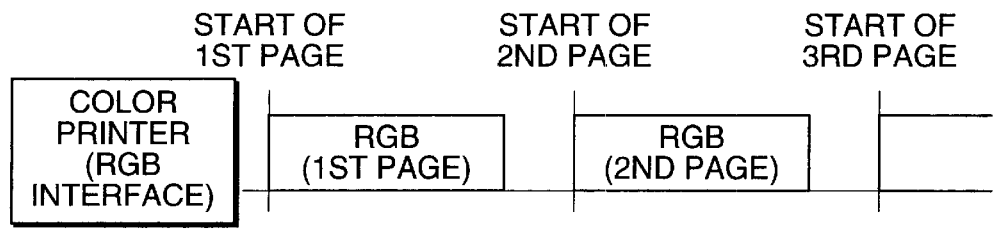
FIG. 19 is a timing chart on the color printer side when bit map data is outputted to a color printer having an RGB interface.
Figure 20:
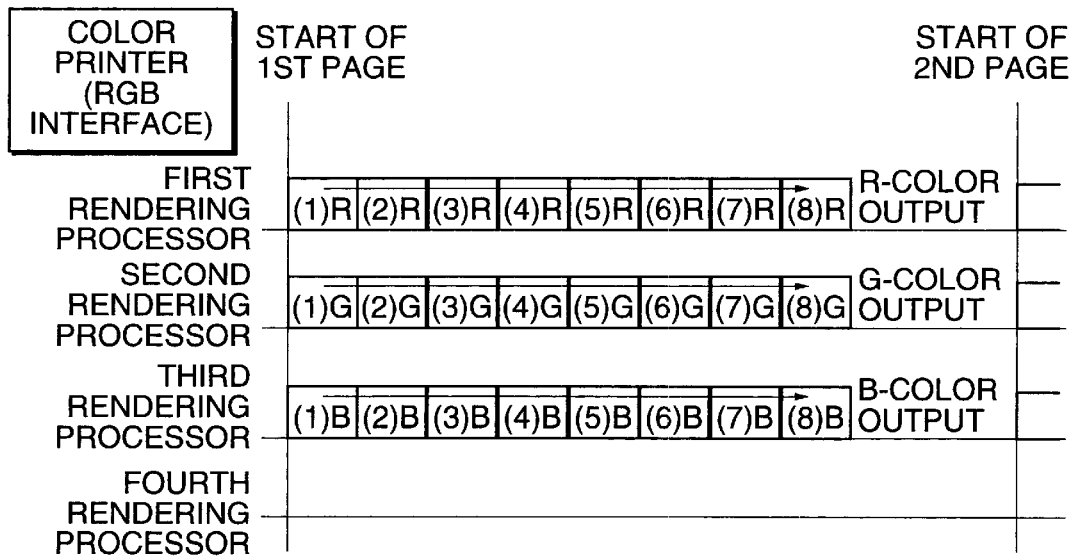
FIG. 20 is a timing chart showing an example of each rendering processor and data output when bit map data is outputted to a color printer having an RGB interface.

FIG. 18 is a block diagram showing an example when a color printer having an RGB interface is connected as an output device in a fourth embodiment of image processing apparatus according to the present invention, FIG. 19 is a timing chart on the color printer side when bit map data is outputted to a color printer having an RGB interface, and FIG. 20 is likewise a timing chart showing an example of each rendering processor and data output. In FIGS. 18, 19 and 20, components equivalent to those in FIGS. 1 and 2 are represented by the same reference numbers, and a description thereof will be omitted. A reference numeral 242 designates a color printer. The color printer 242 has an RGB interface, which receives bit map data of R-(Red) color, G-(Green) color and B-(Blue) color instead of receiving bit map data of YMCK. A color printer 242 having this RGB interface receives, as shown in FIG. 19, RGB bit map data for one page at the same time, and converts into color space (for example, 4-color toner of YMCK), which the coloring material has, within the color printer 242 for printing.

The configuration control unit 202 in the rendering mechanism unit 201 of the image processing apparatus 221 controls the settings of each rendering processor and output control unit as follows. More specifically, it instructs the first rendering processor 203 to generate R-color bit map data, instructs the second rendering processor 206 to generate G-color bit map data and instructs the third rendering processor 209 to generate B-color bit map data. In accordance with these instructions, the first rendering processor 203 generates R-color bit map data in the first band buffer 204. Also, the second rendering processor 206 generates G-color bit map data in the second band buffer 207. Further, the third rendering processor 209 generates B-color bit map data in the third band buffer 210. Also, the first output control unit 205 reads out the R-color bit map data from the first band buffer 204, the second output control unit 208 reads out the G-color bit map data from the second band buffer 207, and the third output control unit 211 reads out the B-color bit map data from the third band buffer 210. Thus, the first output control unit 205, the second output control unit 208 and the third output control unit 211 output the bit map data to the color printer 242 at the same time.

The intermediate language is retained in the system memory 74 as the intermediate language group 222 divided into one. When performing color printing, the first rendering processor 203 reads out the intermediate language group 222 divided into one by the use of, for example, DMA or the like to generate R-color bit map data. Also, the second rendering processor 206 reads out the intermediate language group 222 divided into one by the use of, for example, DMA or the like to generate G-color bit map data. Further, the third rendering processor 209 reads out the intermediate language group 222 divided into one by the use of, for example, DMA or the like to generate B-color bit map data. The R-color bit map data, the G-color bit map data and the B-color bit map data, which have been generated, are outputted to the color printer 242 at the same time. FIG. 20 shows timing at this time.

In this respect, there has been shown here a case where the output device is a color printer having the RGB interface, and the RGB interface is usually used in, for example, a CRT and the like. It is possible to apply to any output device other than printers.

Figure 21:
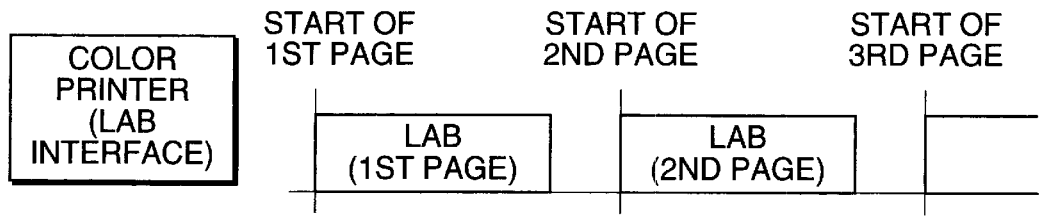
FIG. 21 is a timing chart showing an example when bit map data is outputted to a color printer having a Lab interface.

Also, this example shows a case where the output device has the RGB interface, but it is similarly applicable to an output device having any interface other than this RGB interface. It is also applicable to a case having an interface of, for example, Lab. FIG. 21 is a timing chart showing an example when bit map data is outputted to a color printer having a Lab interface. In the case of a color printer having the Lab interface, it receives, as shown in FIG. 21, each bit map data of "L", "a" and "b" page by page at the same time. In such a case, the configuration can be arranged, as in the case of a color printer 242 having the above RGB interface, such that the first rendering processor 203 generates "L" bit map data, the second rendering processor 206 generates "a" bit map data, and the third rendering processor 209 generates "b" bit map data and that they are outputted from the first output control unit 205, the second output control unit 208 and the third output control unit 211 respectively.

Even when different in the method of connecting to an output device as described above, an image processing apparatus according to the present invention is capable of corresponding thereto.

Figure 22:
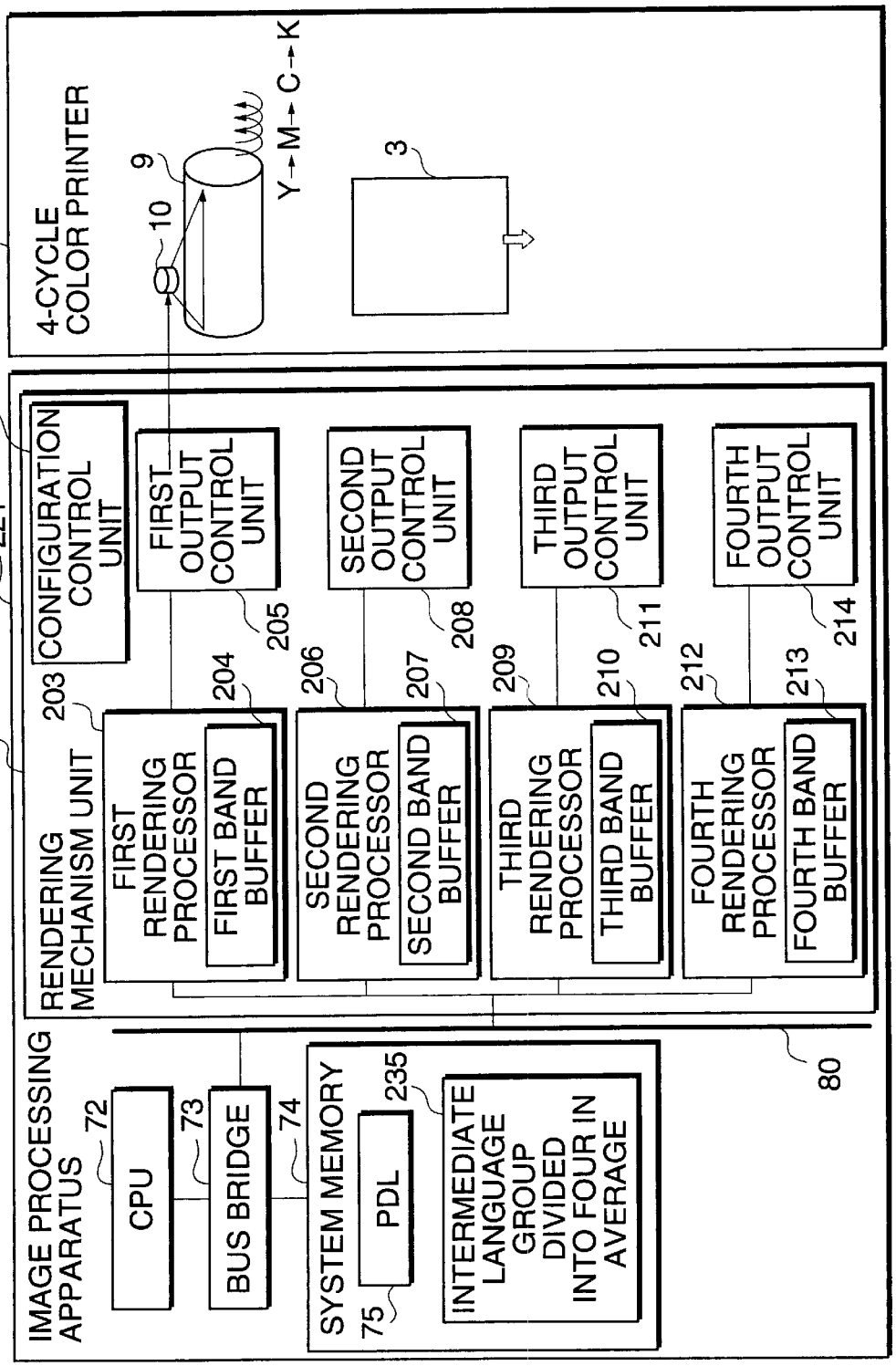
FIG. 22 is a block diagram showing an example when a 4-cycle color printer is connected as an output device in a fifth embodiment of an image processing apparatus according to the present invention.
Figure 23:
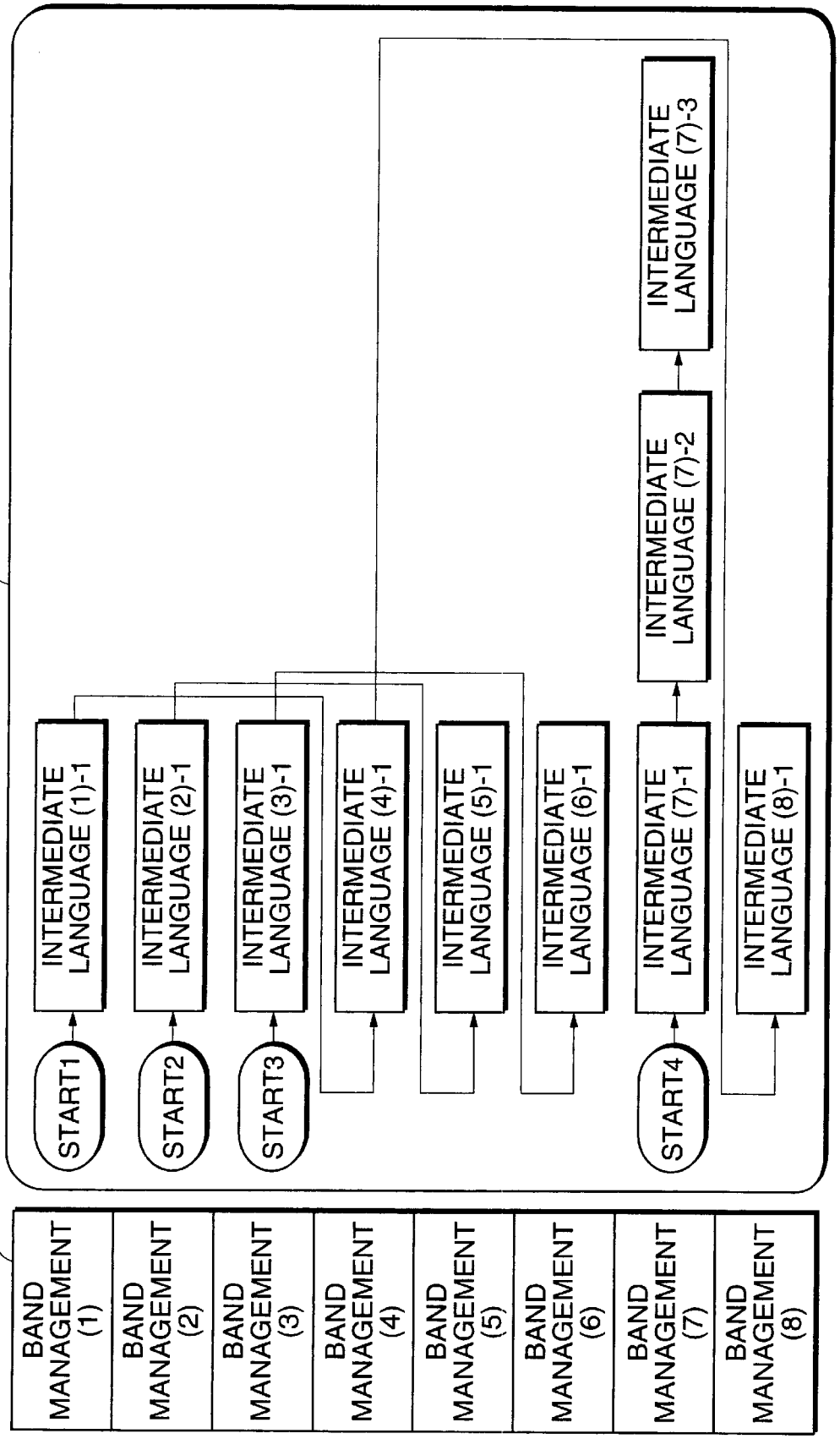
FIG. 23 is an explanatory view illustrating an example of an intermediate language group divided into four in average when a 4-cycle color printer is connected as an output device in the fifth embodiment of an image processing apparatus according to the present invention.

FIG. 22 is a block diagram showing an example when a 4-cycle color printer is connected as an output device in a fifth embodiment of image processing apparatus according to the present invention, and FIG. 23 is likewise an explanatory view illustrating an example of intermediate language group divided into four in average. In FIGS. 22 and 23, components equivalent to those in FIGS. 1 and 5 are represented by the same reference numbers, and a description thereof will be omitted. A reference numeral 235 designates an intermediate language group divided into four in average. The configuration of the image processing apparatus 221 in this fifth embodiment is the same as, for example, in FIG. 5. This fifth embodiment shows an example in which a throughput load in each rendering processor is averaged.

An intermediate language group generated from the PDL 75 by the CPU 72 is separated from a band management unit 114, and an intermediate language group 235 divided into four in average is synthesized by averaging an amount of intermediate languages as shown in FIG. 23. In this example, in the intermediate language group 235 divided into four in average, three intermediate languages are connected together respectively in "Start 1" and "Start 4", and two intermediate languages are connected together respectively in "Start 2" and "Start 3" such that an amount of rendering of intermediate languages is average.

In the intermediate language group 223 divided into four not averaged shown in, for example, FIG. 6, intermediate languages connected to "Start 1" to "Start 4" are as various as 3 to 6 pieces. For this reason, in the intermediate language group 223 divided into four shown in FIG. 6, there are variations in load when the first to fourth rendering processors are generating bit map data, and this is not effective. In the intermediate language group 235 divided into four in average shown in FIG. 23, however, since the number of the intermediate languages has been averaged as described above, the variations in load when bit map data is generated by the first to fourth rendering processors become low, and the bit map data can be generated effectively.

Figure 24:
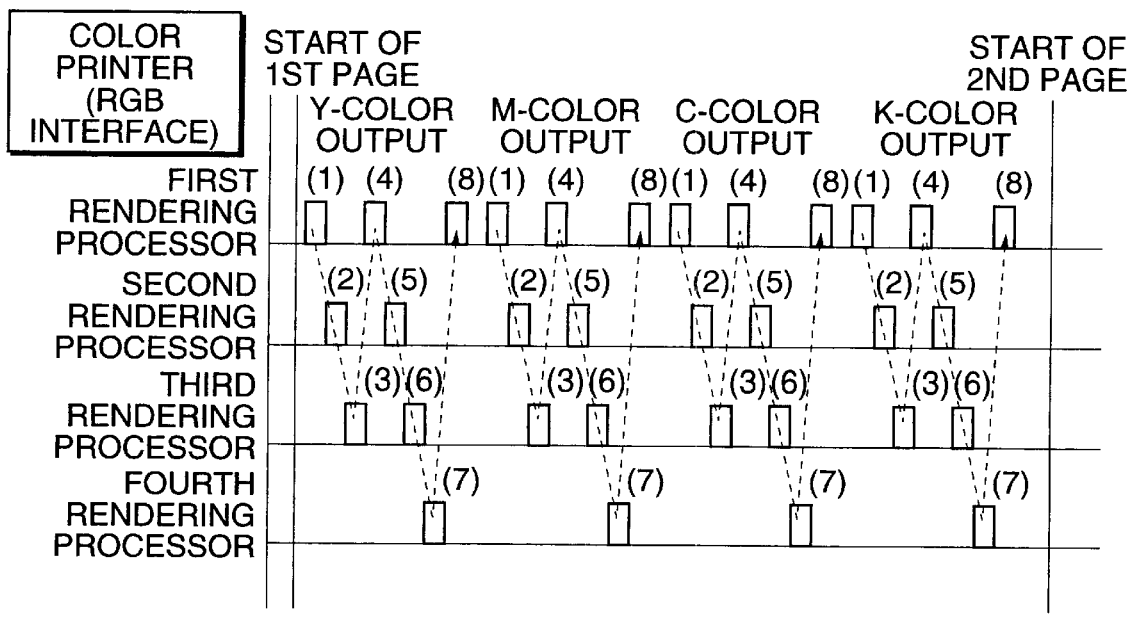
FIG. 24 is a timing chart showing an example of data output from each rendering processor when outputted to a 4-cycle color printer in the fifth embodiment of an image processing apparatus according to the present invention.

FIG. 24 is a timing chart showing an example of data output from each rendering processor when outputted to a 4-cycle color printer in the fifth embodiment of image processing apparatus according to the present invention. When the example of the intermediate language group 235 divided into four in average shown in FIG. 23 is processed, band (1), band (4) and band (8) are rendered in the first rendering processor 203, band (2) and band (5) are rendered in the second rendering processor 206, band (3) and band (6) are rendered in the third rendering processor 209, and band (7) is rendered in the fourth rendering processor 212. The fourth rendering processor 212, which takes charge of the band (7) having a heavy load on generating bit map data from the intermediate language, is given more rendering time than the other rendering processors.

The configuration control unit 202 switches the band buffer, from which the bit map is read out, in accordance with the output to the 4-cycle color printer 1. FIG. 24 shows timing of output at this time. While switching the output from the band buffer in the order of Y-color, M-color, C-color and K-color, the bit map data is outputted to the 4-cycle color printer 1 for printing.

Figure 25:
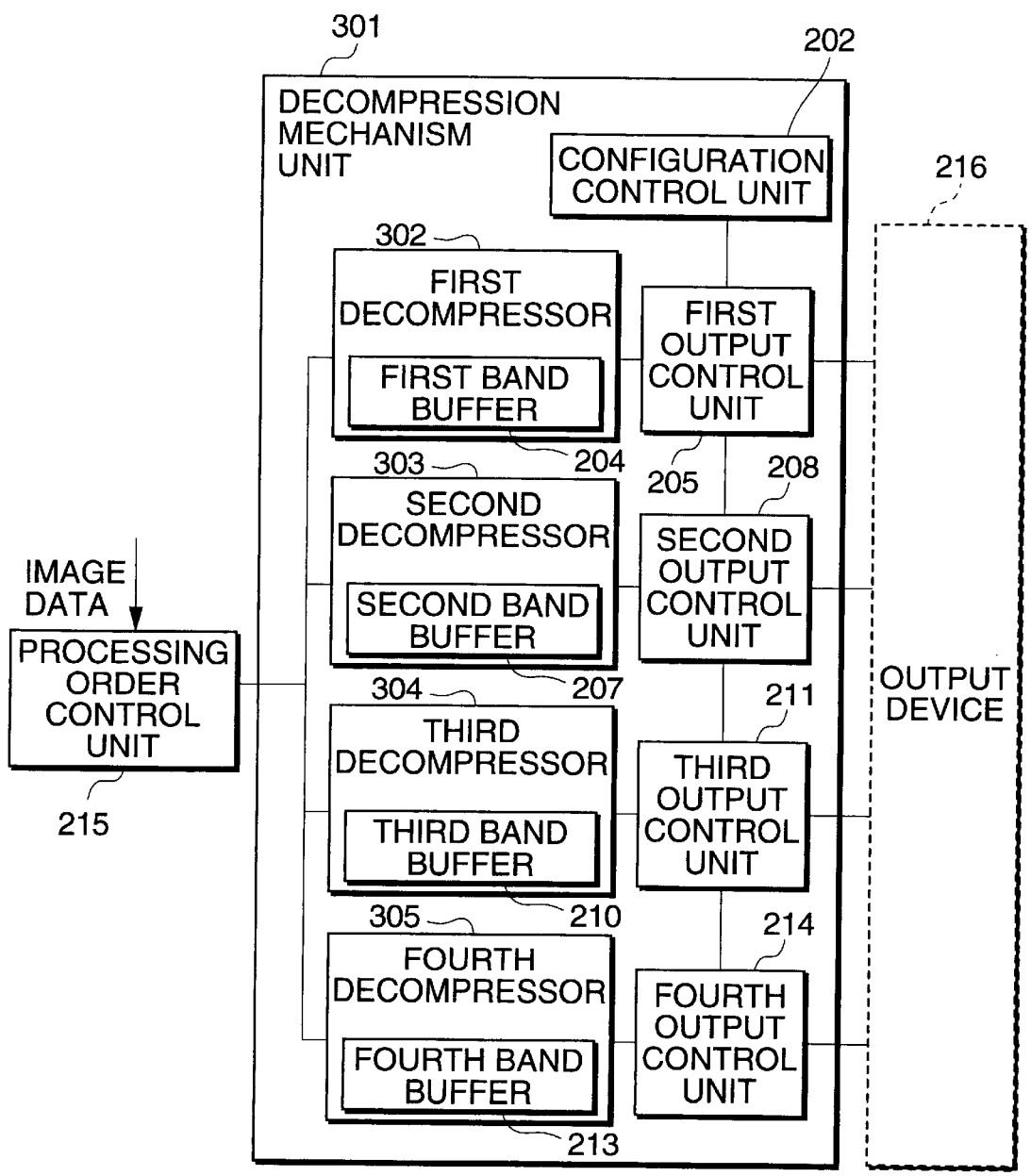
FIG. 25 is a block diagram showing a sixth embodiment of an image processing apparatus according to the present invention.

FIG. 25 is a block diagram showing a sixth embodiment of image processing apparatus according to the present invention. In FIG. 25, components equivalent to those in FIG. 1 are represented by the same reference numbers, and a description thereof will be omitted. A reference numeral 301 designates an decompression mechanism unit; 302, a first decompressor; 303, a second decompressor; 304, a third decompressor; and 305, a fourth decompressor. In the present embodiment, there are provided the first to fourth decompressors as plural image processing parts. Each decompressor shows an example in which it decompresses compressed data to bit map data having a designated color to output to the output device 216 through each output control unit.

The decompression mechanism unit 301 has a configuration control unit 202, the first decompressor 302, the second decompressor 303, the third decompressor 304, the fourth decompressor 305, a first output control unit 205, a second output control unit 208, a third output control unit 211, a fourth output control unit 214 and the like.

The first decompressor 302, the second decompressor 303, the third decompressor 304, and the fourth decompressor 305 convert compressed data into bit map data of a color designated.

The first decompressor 302, the second decompressor 303, the third decompressor 304, and the fourth decompressor 305 have a first band buffer 204, a second band buffer 207, a third band buffer 210 and a fourth band buffer 213 respectively, in each of which bit map data for at least two bands can be written.

The first output control unit 205, the second output control unit 208, the third output control unit 211 and the fourth output control unit 214 control when there are outputted, to the output device 216, bit map data, which have been extended in the first band buffer 204, the second band buffer 207, the third band buffer 210 and the fourth band buffer 213 in accordance with the configuration of the first to fourth decompressors 302, 303, 304 and 305 controlled by the configuration control unit 202 respectively.

The configuration control unit 202 sets connection patterns and output systems of the first to fourth output control units 205, 208, 211 and 214 depending upon the configuration, connecting method and compressed data of the output device 216. This configuration control unit 202 is also interlocked with the processing order control unit 215.

The processing order control unit 215 receives bit map data compressed for each band, and controls such that the compressed data are inputted into the first to fourth decompressors 302, 303, 304 and 305 in accordance with processing order of each compressed data.

Even in the configuration having a decompressor as an image processing part as described above, it is possible to arrange such various types of configuration as shown in the above first to five embodiments. Here, there is, as an example, shown a case where a 4-tandem color printer 21 is connected as an output device.

Figure 26:
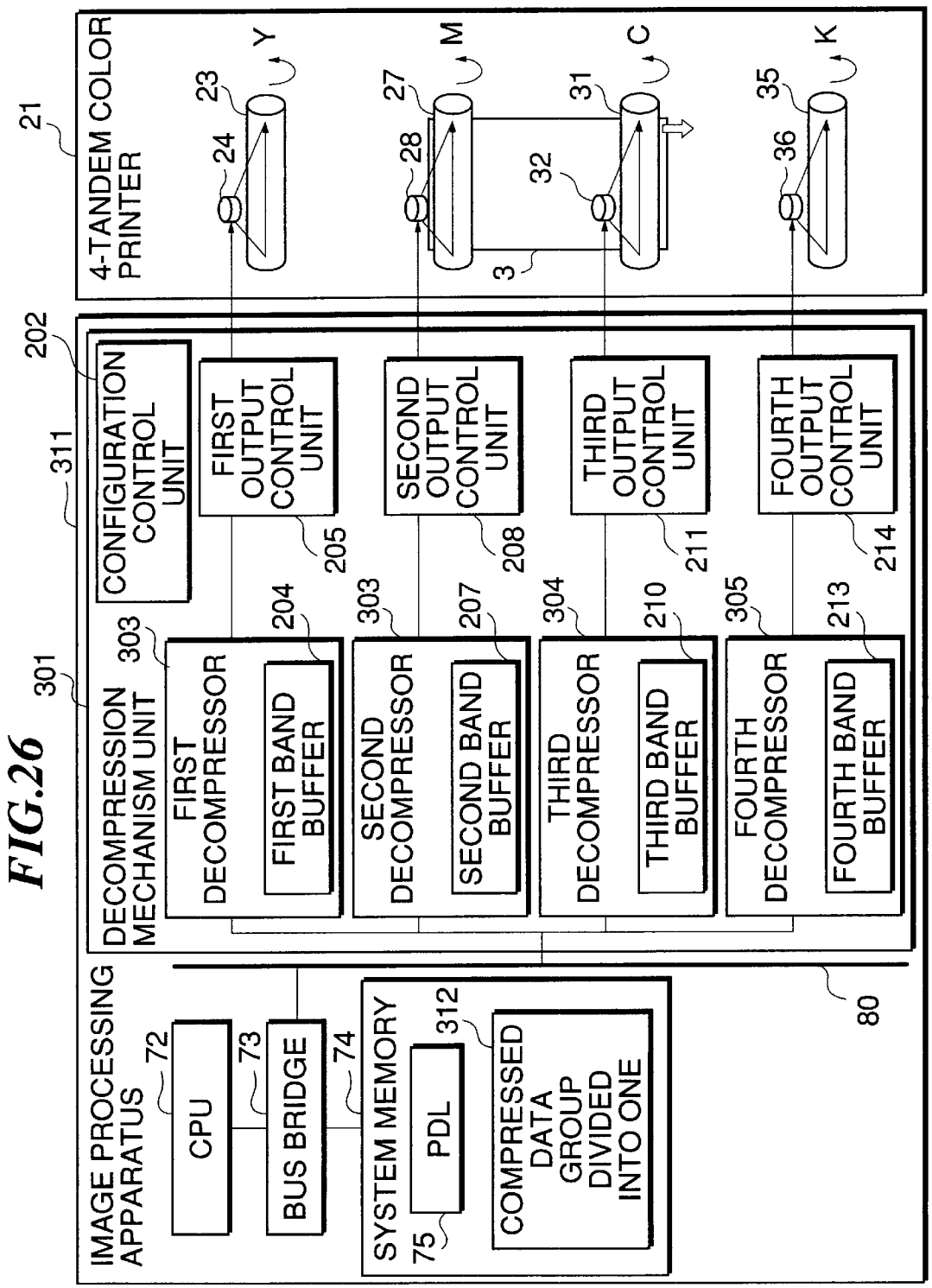
FIG. 26 is a block diagram showing a structural example when a 4-tandem color printer is connected as an output device in the sixth embodiment of an image processing apparatus according to the present invention.
Figure 27:
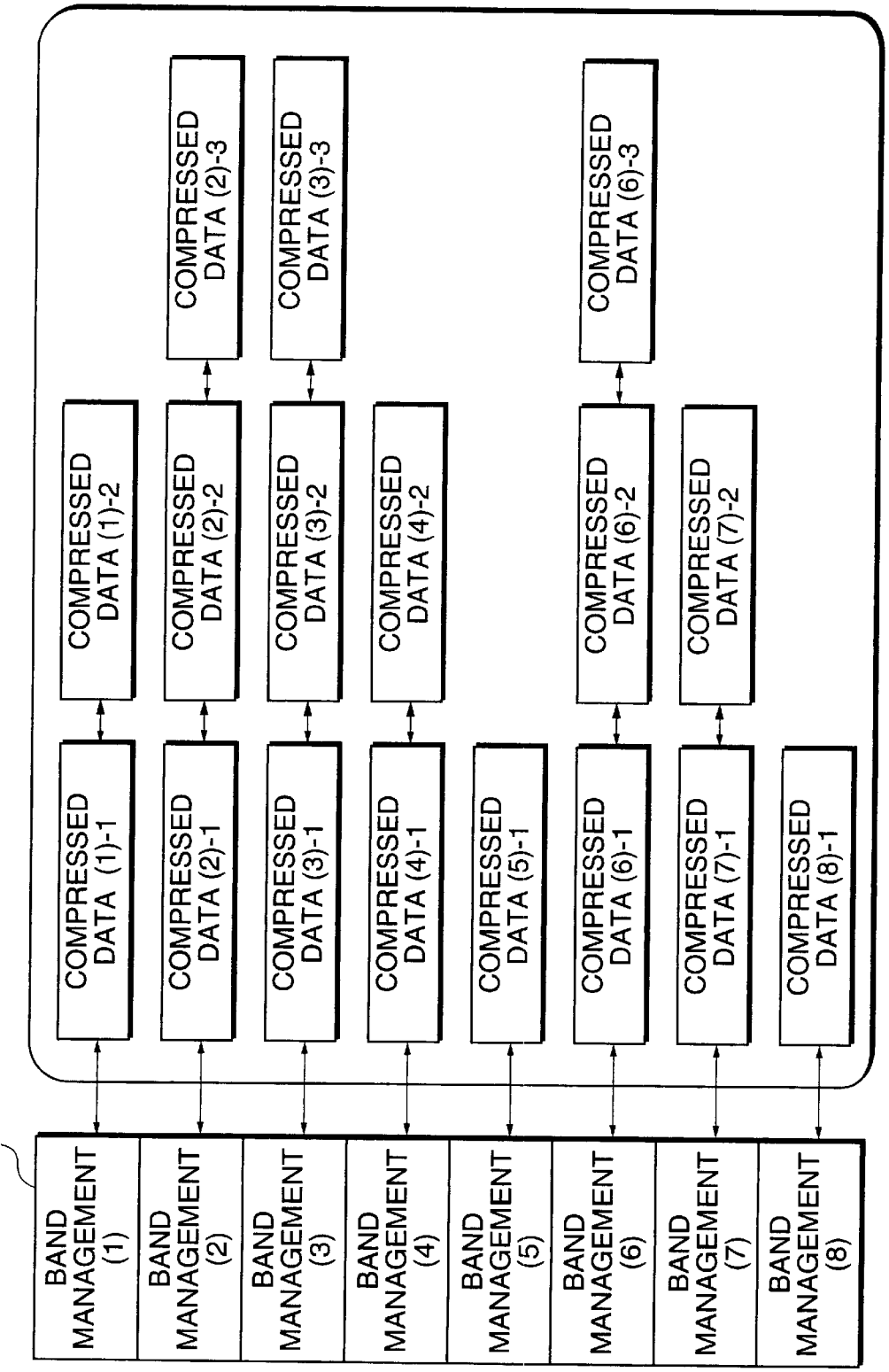
FIG. 27 is an explanatory view illustrating an example of compressed data in the sixth embodiment of an image processing apparatus according to the present invention.
Figure 28:
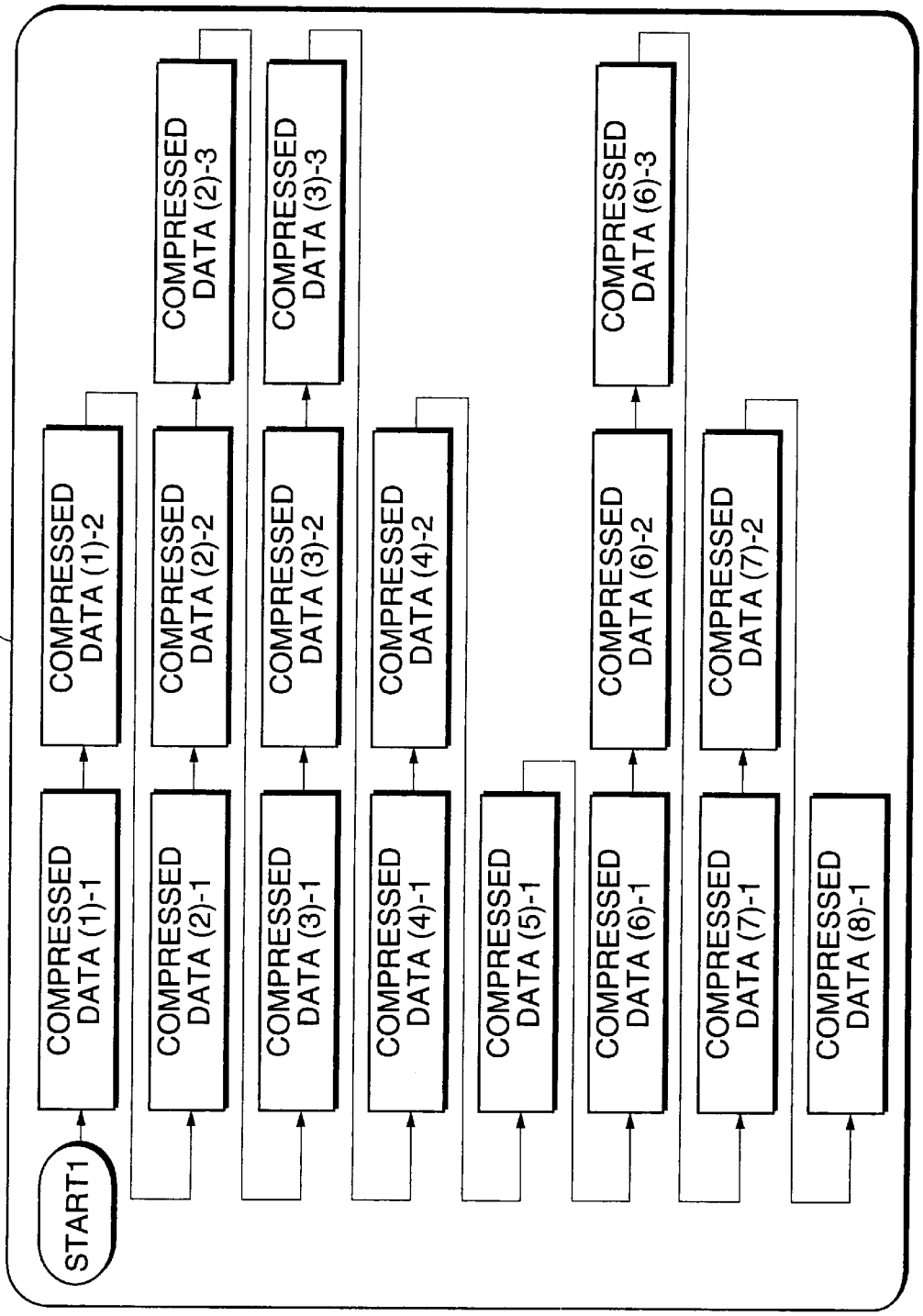
FIG. 28 is an explanatory view illustrating an example of a compressed data group divided into one when a 4-tandem color printer is connected as an output device in the sixth embodiment of an image processing apparatus according to the present invention.

FIG. 26 is a block diagram showing a structural example when a 4-tandem color printer is connected as an output device in the sixth embodiment of image processing apparatus according to the present invention, FIG. 27 is an explanatory view illustrating an example of compressed data, and FIG. 28 is likewise an explanatory view illustrating an example of compressed data group divided into one. In FIGS. 26 to 28, components equivalent to those in FIGS. 2 and 25 are represented by the same reference numbers, and a description thereof will be omitted. A reference numeral 311 designates an image processing apparatus; and 312, a compressed data group divided into one. In this respect, in this example, the function of the processing order control unit 215 is implemented by a CPU 72.

When the output device 216 is a 4-tandem color printer 21, the configuration control unit 202 performs the following setting and control. The first decompressor 302 generates Y-color bit map data from compressed data within the compressed data group 312 divided into one to render in the first band buffer 204, and outputs to the 4-tandem color printer 21 as Y-color bit map data under the control of the first output control unit 205. The second decompressor 303 generates M-color bit map data from compressed data within the compressed data group 312 divided into one to render in the second band buffer 207, and outputs to the 4-tandem color printer 21 as M-color bit map data under the control of the second output control unit 208. The third decompressor 304 generates C-color bit map data from compressed data within the compressed data group 312 divided into one to render in the third band buffer 210, and outputs to the 4-tandem color printer 21 as C-color bit map data under the control of the third output control unit 211. The fourth decompressor 305 generates K-color bit map data from compressed data within the compressed data group 312 divided into one to render in the fourth band buffer 213, and outputs to the 4-tandem color printer 21 as K-color bit map data under the control of the fourth output control unit 214.

Also, the compressed data are managed as a compressed data group for each band management as shown in FIG. 27. The CPU 72 synthesizes a compressed data group 312 as shown in FIG. 28, having new connection relationship from such compressed data groups in conformity with the settings of the configuration control unit 202. The compressed data group 312 divided into one is obtained by sequentially connecting together compressed data from band management (1) to band management (8) with the head address of compressed data (1) -1 as "Start 1", and is connected together in the order of compressed data (1) -1, compressed data (1) -2, compressed data (2) -1, compressed data (2) -2, compressed data (2) -3, compressed data (3) -1, compressed data (3) -2, compressed data (3) -3, compressed data (4) -1, compressed data (4) -2, compressed data (5) -1, compressed data (6) -1, compressed data (6) -2, compressed data (6) -3, compressed data (7) -1, compressed data (7) -2 and compressed data (8) -1. In this respect, this compressed data group 312 divided into one is retained within the system memory 74 in the image processing apparatus 311.

Before issuing an instruction to start printing to the 4-tandem color printer 21, the image processing apparatus 311 sets a "Start 1" address of the compressed data group 312 divided into one in the first decompressor 302, the second decompressor 303, the third decompressor 304 and the fourth decompressor 305 to instruct to start rendering. The first decompressor 302, the second decompressor 303, the third decompressor 304 and the fourth decompressor 305 access the compressed data group 312 divided into one within the system memory 74 by the use of, for example, DMA or the like for starting rendering.

When Y-color bit map data is generated within the first band buffer 204 by the first decompressor 302, the image processing apparatus 311 issues an instruction to start printing to the 4-tandem color printer 21, and the first output control unit 205 starts output of the Y-color bit map data to the 4-tandem color printer 21. The first decompressor 302 renders the next band while outputting the bit map data to the 4-tandem color printer 21 through the first output control unit 205, and generates the bit map data. It renders all the bands by the generation and output of the bit map by the use of the first band buffer 204 divided into two to complete the output of the Y-color bit map data.

The second decompressor 303 also accesses the compressed data group 312 divided into one by the use of, for example, DMA or the like for rendering the M-color bit map data in the second band buffer 207. On the receipt of a request from the 4-tandem color printer 21 to transfer the M-color bit map data, the second output control unit 208 starts to output the M-color bit map data. The second decompressor 303 renders the next band while outputting M-color bit map data to the 4-tandem color printer 21 through the second output control unit 208, and generates bit map data. By the use of the second band buffer 207 divided into two, the second decompressor 303 renders all the bands by the generation and output of the bit map to complete the output of the M-color bit map data.

The third decompressor 304 also accesses the compressed data group 312 divided into one by the use of, for example, DMA or the like to render C-color bit map data on the third band buffer 210. On the receipt of a request from the 4-tandem color printer 21 to transmit the C-color bit map data, the third output control unit 211 starts to output the C-color bit map data. The third decompressor 304 renders the next band while outputting C-color bit map data to the 4-tandem color printer 21 through the third output control unit 211, and generates bit map data. By the use of the third band buffer 210 divided into two, the third decompressor 304 renders all the bands by the generation and output of the bit map to complete the output of the C-color bit map data.

The fourth decompressor 305 also accesses the compressed data group 312 divided into one by the use of, for example, DMA or the like to render K-color bit map data on the fourth band buffer 213. On the receipt of a request from the 4-tandem color printer 21 to transmit the K-color bit map data, the fourth output control unit 214 starts to output the K-color bit map data. The fourth decompressor 305 renders the next band while outputting K-color bit map data to the 4-tandem color printer 21 through the fourth output control unit 214, and generates bit map data. By the use of the fourth band buffer 213 divided into two, the fourth decompressor 305 renders all the bands by the generation and output of the bit map to complete the output of the K-color bit map data. The above processing completes printing of one page.

In this respect, as an image processing part, there has been shown here an example in which a 4-tandem color printer 21 is connected to an image processing apparatus having a decompressor, and the 4-cycle color printer 1 or the 2-tandem color printer 41 can be connected in the same way as in the configuration shown in the above FIGS. 5 and 8. The operation in this case is the same as in a case where there is provided a rendering processor as an image processing part, the rendering processor becomes the decompressor, and the data to be processed changes from the intermediate language to the compressed data. Also, in these cases, the compressed data group shown in FIG. 27 is connected by the processing order control unit 215 (or CPU 72) so as to become a compressed data group divided into four of configuration as shown in FIG. 6 or a compressed data group divided into two of configuration as shown in FIG. 9.

Also, in the same way as in the above second embodiment, plural decompression mechanism units 301 can be provided. An image processing apparatus is configured as shown in FIGS. 11 to 13 by the use of, for example, two decompression mechanism units 301, whereby it is possible to correspond to the double-speed 4-cycle color printer 1*a*, the double-speed 4-tandem color printer 21*a* and the double-speed 2-tandem color printer 41*a*.

Further, as in the case of the above third embodiment, it is also possible to connect to, for example, a 4-tandem monochrome color printer 241 having higher printing speed during monochrome printing than that during color printing. It is also possible to extend compressed data by changing the settings of the configuration control unit in accordance with the operating conditions of the output device in this way. Further, as in the case of the above four th embodiment, it is possible to also connect to an output device having any interface other than YMCK. Also, as in the case of the above f if th embodiment, the processing order of each compressed data can also be changed in the processing order control unit 215 such that the throughput load in each decompressor is averaged.

In this respect, in the above first to f if th embodiments, there is shown an example in which rendering processors have been provided as an image processing part, and in the sixth embodiment, there is shown an example in which decompressors have been provided as an image processing part. The present invention is not restricted to these examples, but the image processing part can be constructed of a processor capable of processing various images.

Also, in each embodiment described above, for the rendering mechanism units 201, 232 and 233, there has been shown an example in which rendering processors and output control units are provided each in groups of four, but they can be provided in groups of any arbitrary number. Similarly, even in the decompression mechanism unit 301, the number of groups of the decompressors and output control units is not restricted to four but arbitrary.

Further, in each embodiment described above, processing in units of bands has been shown and the unit in processing is not restricted to units of bands, but it is possible to process in various processing units such as page units. Even when processing is made in units of bands, the number of divisions is not restricted to eight, but any number of divisions may be used.

As will be apparent from the foregoing description, according to the present invention, it becomes possible to connect an image processing apparatus of the same configuration to an output device having different configuration or performance. For example, even if a 4-cycle color printer, a 4-tandem color printer, a 2-tandem color printer or the like, which has different configuration at the same printing speed, is connected, it is possible to perform any processing suitable for the configuration. Also, even when the throughput speed is improved, it is possible to improve the performance by the use of plural image processing apparatuses. Since various types of output devices can be thus connected to an image processing apparatus according to the present invention, there is the effect that development cost of the image processing apparatus can be suppressed and the cost of an apparatus mounted with this image processing apparatus can also be suppressed.

What is claimed is:

1. An image processing apparatus for processing image data inputted to output to an output device, comprising: plural image processing parts that process image data inputted; a configuration congest part that controls configuration of the plural image processing parts in accordance with a mechanism of the output device; a processing order control part that controls the image data to be inputted into the plural image processing parts in accordance with the configuration of the image processing parts controlled by the configuration control part; and an output control part that controls the output to the output device from the image processing parts in accordance with the configuration of the plural image processing parts controlled by the configuration control part.

2. The image processing apparatus according to claim 1, wherein the image processing part receives an intermediate language as the image data, and performs a process that expands from the intermediate language into bit map data.

3. The image processing apparatus according to claim 1, wherein the image processing part receives compressed data as the image data, and decompresses the compressed data into bit map data.

4. The image processing apparatus according to claim 2, wherein the image processing part receives image data in units of bands obtained by dividing an image corresponding to one page into plural pieces, and outputs bit map data in units of bands.

5. The image processing apparatus according to claim 1, wherein the configuration control part controls configuration of the plural image processing parts in accordance with an output speed of the output device.

6. The image processing apparatus according to claim 1, wherein the configuration control part controls the configuration of the plural image processing parts in accordance with a pattern of transmission of the output data to the output device.

7. The image processing apparatus according to claim 1, wherein the configuration control part controls the configuration of the plural image processing parts in accordance with characteristics of the image data inputted, and wherein the processing order control part controls the image data to be inputted into the plural image processing parts in accordance with the characteristics of the image data.

8. The image processing apparatus according to claim 1, wherein the plural output control parts are provided correspondingly to the image processing parts, and control the output from the image processing parts corresponding to the configuration of the plural image processing parts controlled by the configuration control part respectively.

9. The image processing apparatus according to claim 1, wherein the plural configuration control parts are provided, each of which corresponding to the plural image processing parts for controlling the configurations thereof.

10. The image processing apparatus according to claim 1, wherein when the output device has one port, through which output data is to be received, the configuration control part controls the plural image processing parts such that they are configured to perform sequential processing in parallel, the processing order control part inputs image data to be outputted to the output device in order into the plural image processing parts respectively, and the output control part sequentially transmits output data to be outputted from each of the image processing parts to the output part.

11. The image processing apparatus according to claim 1, wherein when the output device has as many ports, through each of which the output data is to be received, as the image processing parts, the configuration control part controls the plural image processing parts such that they are configured to perform the processing in parallel, the processing order control part inputs image data to be in parallel outputted to the output device into the plural image processing parts, and the output control part transmits the output data to be outputted from each of the image processing parts to the output part in parallel.

12. The image processing apparatus according to claim 1, wherein when the output device has ports, through each of which the output data is to be received, by at least one and as many as less than a number of the image processing parts, the configuration control part controls the plural image processing parts such that they are configured in plural groups, which perform parallel processing, the processing order control part inputs image data to be in parallel outputted to the output device into each of groups of the image processing parts, the output control part transmits output data from the group of the image processing parts to the output parts in parallel, and sequentially transmits output data to be outputted from the plural image processing parts within the group to the output parts.

* * * * *